United States Patent
Lee et al.

(10) Patent No.: US 11,373,332 B2
(45) Date of Patent: Jun. 28, 2022

(54) POINT-BASED OBJECT LOCALIZATION FROM IMAGES

(71) Applicant: QUALCOMM Incorporated, San Diego, CA (US)

(72) Inventors: Jeong-Kyun Lee, Seoul (KR); Young-Ki Baik, Namyangju-si (KR); Hankyu Cho, Seoul (KR); Dongju Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/142,195

(22) Filed: Jan. 5, 2021

(65) Prior Publication Data

US 2021/0209797 A1 Jul. 8, 2021

Related U.S. Application Data

(60) Provisional application No. 62/957,627, filed on Jan. 6, 2020.

(51) Int. Cl.
*G06T 7/73* (2017.01)
*G06T 7/50* (2017.01)
*G06T 17/00* (2006.01)

(52) U.S. Cl.
CPC .............. *G06T 7/75* (2017.01); *G06T 7/50* (2017.01); *G06T 17/00* (2013.01); *G06T 2207/30244* (2013.01); *G06T 2207/30252* (2013.01); *G06T 2210/12* (2013.01)

(58) Field of Classification Search
CPC .... G06T 7/50; G06T 7/70; G06T 7/73; G06T 7/75; G06T 17/00; G06T 2207/30244; G06T 2207/30252; G06T 2210/12
See application file for complete search history.

(56) References Cited

FOREIGN PATENT DOCUMENTS

GB 2589843 A * 6/2021 ............... G06T 7/75

OTHER PUBLICATIONS

Chaya et al., "Monocular Reconstruction of Vehicles: Combining SLAM with Shape Priors", IEEE International Conference on Robotics and Automation (ICRA), Stockholm, Sweden, May 16-21, 2016 (Year: 2016).*
Zia et al, "Towards Scene Understanding with Detailed 3D Object Representations", Springer Science+Business Media, New York, 2014 (Year: 2014).*

* cited by examiner

*Primary Examiner* — Diane M Wills
(74) *Attorney, Agent, or Firm* — Polsinelli LLP

(57) ABSTRACT

Techniques and systems are provided for determining features of one or more objects in one or more images. For example, an image of an object and a three-dimensional model associated with the object can be obtained. From the image, a sample point on the object can be determined. A depth and an angle of the sample point of the object can be determined. A pose and a shape of the three-dimensional model associated with the object can be determined based on the depth and the angle.

30 Claims, 43 Drawing Sheets

Image 100

Image 101

Image 102

Image 103

Image 100

Image 101

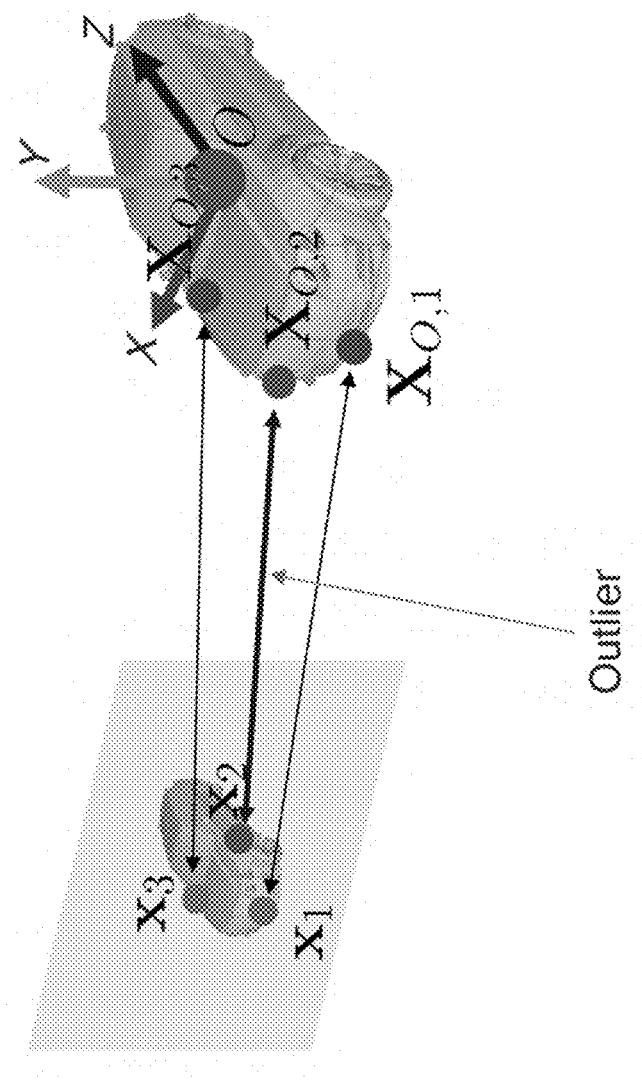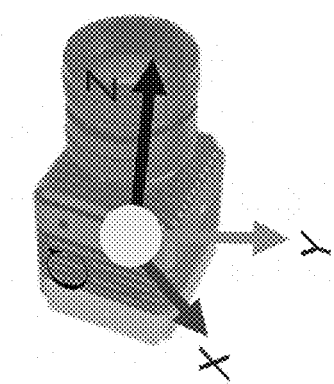
FIG. 6

Algorithm 1 Pose estimation using RANSAC and P$n$P algorithms

Require: $C$
Ensure: $T$

1: $n_{best} \leftarrow 0, T \leftarrow \emptyset$
2: for $i = 1$ to $N$ do
3:    Randomly sample $n$ 2D-3D keypoint correspondences.
4:    Compute $T_{cand}$ using the $n$ samples.
5:    $n_{cand} \leftarrow$ Count the number of inliers using $T_{cand}$.
6:    if $n_{cand} > n_{best}$ then
7:       $T \leftarrow T_{cand}, n_{best} = n_{cand}$
8:    end if
9: end for
10: if $T \neq \emptyset$ then
11:    Optimize $T$ using the inlier points.
12: end if

FIG. 7

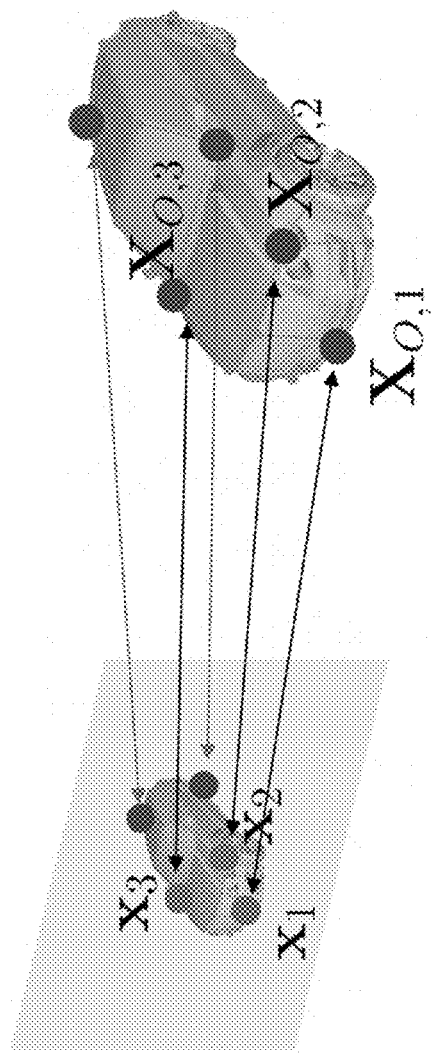
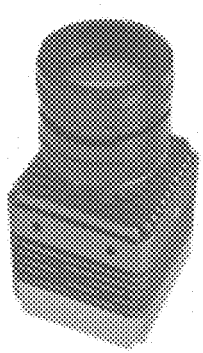
FIG. 8A

X-Y-Z axes of the 3D CAD model and sample points (keypoints)

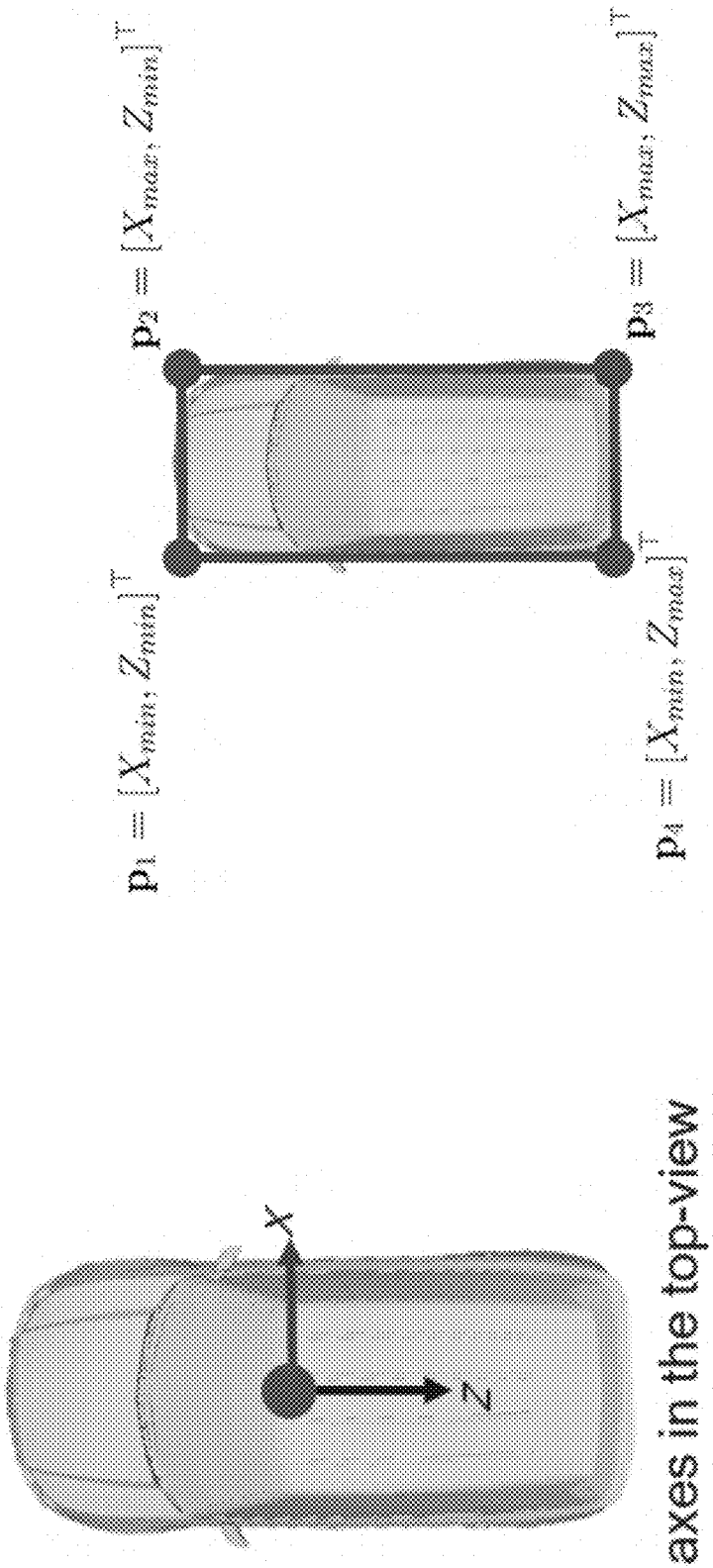

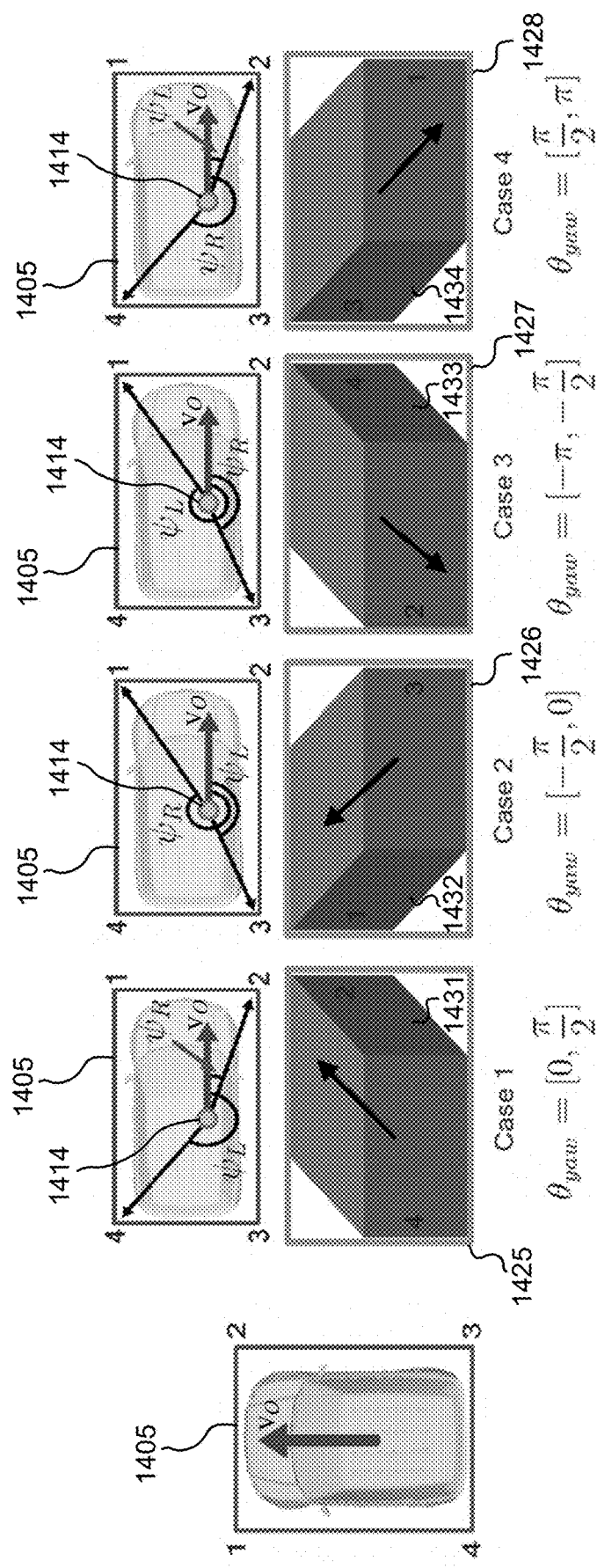

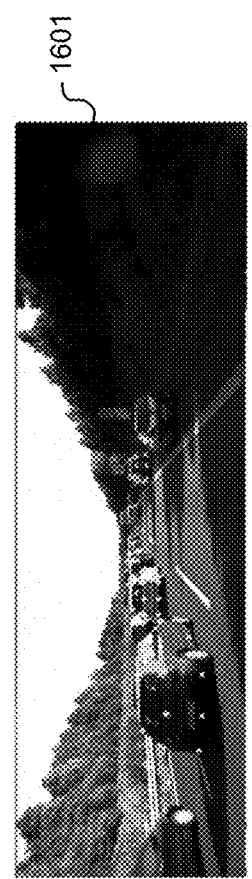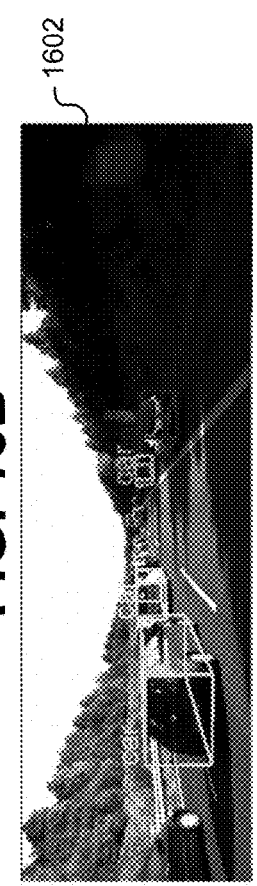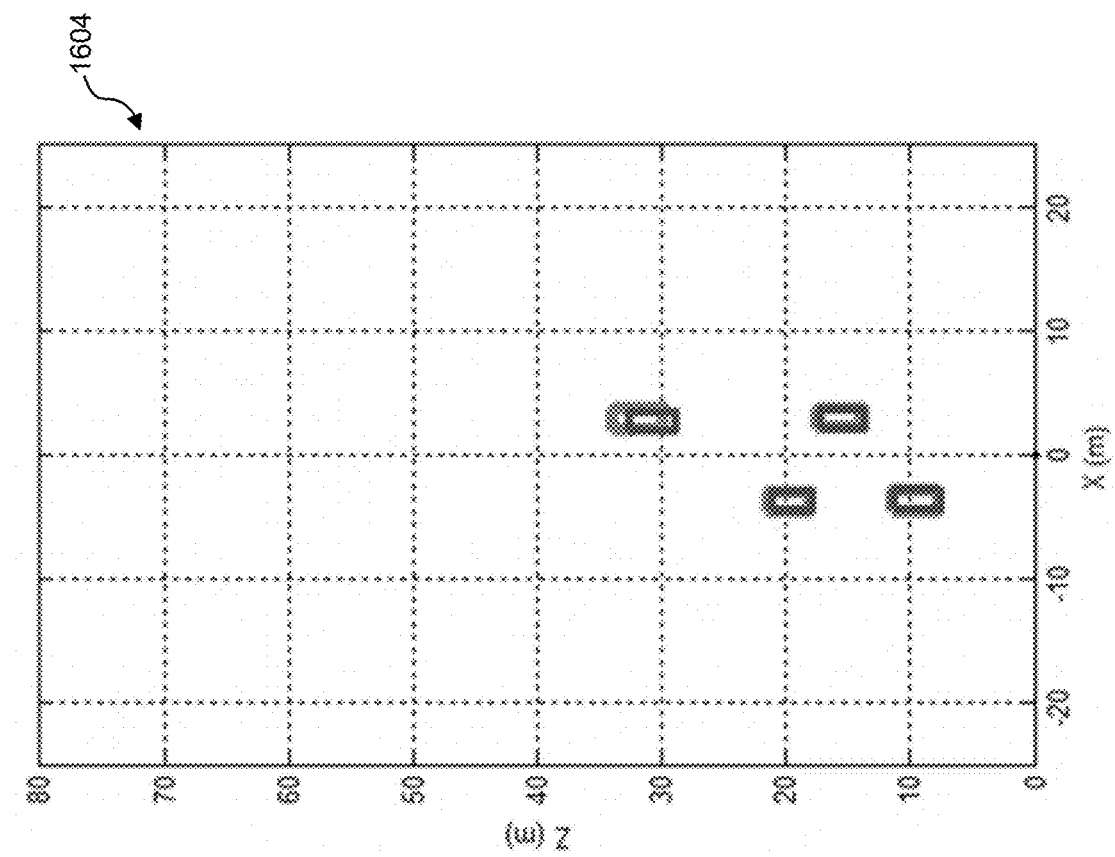

Image with GT Boxes 8 x 8 Feature Map 4 x 4 Feature Map loc : $\Delta(cx, cy, w, h)$
conf : $(c_1, c_2, \ldots, c_p)$

POINT-BASED OBJECT LOCALIZATION FROM IMAGES

CROSS-REFERENCE TO RELATED APPLICATIONS

This application claims the benefit of, and priority to, U.S. Provisional Patent Application No. 62/957,627, filed on Jan. 6, 2020, entitled "POINT-BASED OBJECT LOCALIZATION FROM IMAGES," the contents of which are hereby expressly incorporated by reference in its entirety.

FIELD

The present disclosure generally relates to performing object localization, and more specifically to techniques and systems for performing point-based object localization to determine the pose of an object in an image.

BACKGROUND

Systems are available for determining objects that are present in real images and attributes of those objects. In some cases, object localization can be performed to localize an object in a scene. For example, a digital image or a video frame of a video sequence can be processed using object localization to determine a pose of the object in three-dimensional space.

Object localization for pose estimation is useful for many applications and systems, including augmented reality (AR), virtual reality (VR), mixed reality (MR), robotic systems, manufacturing systems, quality assurance, automotive and aviation (e.g., manufacturing, autonomous driving or navigation, etc.), three-dimensional scene understanding, object grasping, object tracking, video analytics, security systems, among many others. For instance, a three-dimensional model can be determined for representing an object in an image, and can be used to facilitate effective operation of various systems. In AR environments, as an illustrative example, a user may view images that include an integration of virtual content with the user's natural surroundings. AR applications allow real images to be processed to add virtual objects to the images and to align the virtual objects to the image in multiple dimensions. For instance, a real-world object that exists in reality can be represented using a model that resembles or is an exact match of the real-world object. The user may be able to manipulate the model while viewing the real-world scene. In another illustrative example, an autonomous vehicle can determine shapes and poses of other vehicles driving on a road in order to navigate through traffic.

Inferring three-dimensional information (e.g., localization (pose) and shape) of an object from a single two-dimensional image can be challenging, due in part to the lack of geometric cues for objects in single images.

SUMMARY

Systems and techniques are described herein for determining poses of objects in images using point-based object localization. For example, the systems and techniques described herein provide an efficient way to estimate a six degrees of freedom (6-DoF) object pose and the shape of the object from an image (e.g., a single image) including the object. In some cases, the systems and techniques can determine the pose (and in some cases the shape) of the object using one sample point from the data, greatly reducing the complexity of performing the point-based objection localization.

According to one illustrative example, a method of determining features of one or more objects in one or more images is provided. The method includes: obtaining an image of an object; obtaining a three-dimensional model associated with the object; determining, from the image, a sample point on the object; determining a depth and an angle of the sample point of the object; and determining, based on the depth and the angle, a pose and a shape of the three-dimensional model associated with the object.

In another example, an apparatus for determining features of one or more objects in one or more images is provided that includes a memory configured to store at least one image and one or more processors implemented in circuitry and coupled to the memory. The one or more processors are configured to and can: obtain an image of an object; obtain a three-dimensional model associated with the object; determine, from the image, a sample point on the object; determine a depth and an angle of the sample point of the object; and determine, based on the depth and the angle, a pose and a shape of the three-dimensional model associated with the object.

In another example, a non-transitory computer-readable medium is provided that has stored thereon instructions that, when executed by one or more processors, cause the one or more processor to: obtain an image of an object; obtain a three-dimensional model associated with the object; determine, from the image, a sample point on the object; determining a depth and an angle of the sample point of the object; and determine, based on the depth and the angle, a pose and a shape of the three-dimensional model associated with the object.

In another example, an apparatus for determining features of one or more objects in one or more images is provided. The apparatus includes: means for obtaining an image of an object; means for obtaining a three-dimensional model associated with the object; means for determining, from the image, a sample point on the object; means for determining a depth and an angle of the sample point of the object; and means for determining, based on the depth and the angle, a pose and a shape of the three-dimensional model associated with the object.

In some aspects, the depth and the angle of the object in the image are determined using the sample point and no other sample points of the object.

In some aspects, the angle indicates an orientation of the object relative to a directional vector from a center of a camera used to capture the image to the sample point. In some cases, the angle includes a yaw angle.

In some aspects, the depth includes distance from a center of a camera used to capture the image to the sample point.

In some aspects, the method, apparatuses, and computer-readable medium described above further comprise: obtaining a two-dimensional bounding region for the object in the image; and determining the sample point from within the two-dimensional bounding region in the image.

In some aspects, the method, apparatuses, and computer-readable medium described above further comprise: obtaining a two-dimensional bounding region for the object in the image; and aligning a projection of a three-dimensional bounding region to back-projected rays of at least two sides of the two-dimensional bounding region of the object.

In some aspects, the method, apparatuses, and computer-readable medium described above further comprise: determining a first three-dimensional vector defining a forward direction of a camera used to capture the image; determining a second three-dimensional vector from the camera to a first corner point of the two-dimensional bounding region; determining a third three-dimensional vector from the camera to a second corner point of the two-dimensional bounding region; and determining a fourth three-dimensional vector from the camera to the sample point.

In some examples, the first corner point includes a top-left corner point of the two-dimensional bounding region, and the second corner point includes a bottom-right corner point of the two-dimensional bounding region. In some examples, the first corner point includes a bottom-left corner point of the two-dimensional bounding region, and the second corner point includes a top-right corner point of the two-dimensional bounding region.

In some aspects, the method, apparatuses, and computer-readable medium described above further comprise: obtaining a pitch angle relative to the camera, the pitch angle indicating an angle between a ground plane and a forward direction of a camera used to capture the image; determining, using the pitch angle, a first two-dimensional directional vector for the first three-dimensional vector; determining, using the pitch angle, a second two-dimensional directional vector for the second three-dimensional vector; determining, using the pitch angle, a third two-dimensional directional vector for the third three-dimensional vector; and determining, using the pitch angle, a fourth two-dimensional directional vector for the fourth three-dimensional vector.

In some aspects, the method, apparatuses, and computer-readable medium described above further comprise: determining, using the pitch angle, a first rotation matrix from the ground plane to a coordinate system of the camera; wherein the first two-dimensional directional vector, the second two-dimensional directional vector, the third two-dimensional directional vector, and the fourth two-dimensional directional vector are determined using the first rotation matrix.

In some aspects, the method, apparatuses, and computer-readable medium described above further comprise: determining a first angle between the first two-dimensional directional vector and the fourth two-dimensional directional vector; determining a second angle between the second two-dimensional directional vector and the fourth two-dimensional directional vector; determining a third angle between the third two-dimensional directional vector and the fourth two-dimensional directional vector; determining a fourth angle between the first corner point of the two-dimensional bounding region and a forward direction of the object; determining a fifth angle between the second corner point of the two-dimensional bounding region and a forward direction of the object; determining a first distance from the first corner point of the two-dimensional bounding region to the sample point; and determining a second distance from the second corner point of the two-dimensional bounding region to the sample point.

In some aspects, the method, apparatuses, and computer-readable medium described above further comprise: determining the depth and an angle of the object in the image using the first angle, the second angle, the third angle, the fourth angle, the fifth angle, the first distance, and the second distance.

In some aspects, determining, based on the depth and the angle, the pose of the three-dimensional model associated with the object includes: determining a second rotation matrix using the angle of the sample point; determining a three-dimensional location of the sample point; computing a pose parameter for the three-dimensional model using the depth of the sample point, the first rotation matrix, the second rotation matrix, and the three-dimensional location of the sample point.

In some aspects, the method, apparatuses, and computer-readable medium described above further comprise: determining, based on the pose and the shape, a three-dimensional bounding region for the object; and outputting the three-dimensional bounding region for display with the image.

In some aspects, the apparatus is, is part of, and/or includes a vehicle or a computing device or component of a vehicle (e.g., an autonomous vehicle), a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 5-FIG. 8D are diagrams illustrating a perspective-n-point (PnP) technique, in accordance with some examples;

FIG. 12B-FIG. 12J are diagrams illustrating an example of determining various parameters from a three-dimensional model, in accordance with some examples;

FIG. 14A-FIG. 14E are diagrams illustrating examples of four solutions that can be determined and selected using the techniques described herein, in accordance with some examples;

FIG. 16A-FIG. 16D are images and FIG. 16E is a diagram illustrating an example of results of keypoint-based vehicle pose estimation using an image from a front-facing camera of a vehicle, in accordance with some examples;

DETAILED DESCRIPTION

Figure 1C:
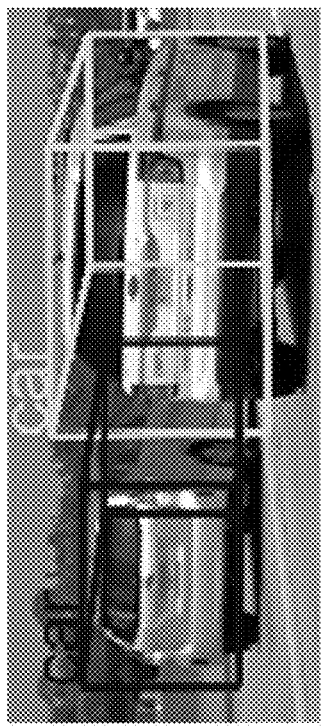
FIG. 1C and FIG. 1D are images illustrating another example of object detection and object localization results on the images, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Object detection can be used to detect objects in images, and in some cases various attributes of the detected objects. For instance, object localization is a technique that can be performed to localize an object in a digital image or a video frame of a video sequence capturing a scene or environment. Using object localization, a pose of the object can be determined in three-dimensional (3D) space. For instance, object localization can be performed on a single, monocular image to estimate a six-dimensional (6D) pose parameter (including a 3D translation vector and a 3D rotation vector, providing the six dimensions) in the camera coordinate system of an object in the image.

Object localization for pose estimation is useful for many applications and systems, such as extended reality (XR) systems (e.g., augmented reality (AR) systems, virtual reality (VR) systems, mixed reality (MR) systems, and/or other XR systems), robotic systems, manufacturing systems, quality assurance systems, automotive and aviation systems (e.g., for manufacturing, for autonomous driving or navigation for autonomous vehicles and/or unmanned aerial vehicles, etc.), three-dimensional scene understanding systems, object grasping systems, object tracking systems, video analytics systems, security systems, among others. In some examples, a 3D model can be determined for representing an object in an image, and can be used to facilitate effective operation of one or more of the systems noted above. In one illustrative example, AR systems and/or applications can process images and can add virtual objects to the images, in some cases aligning the virtual objects to the image in multiple dimensions. For instance, a real-world object that exists in reality can be represented using a model that resembles or is an exact match of the real-world object. The user may be able to manipulate the model while viewing the real-world scene. In another example, in object tracking systems (e.g., used in an autonomous vehicle, robotics system, or other system), an object (referred to as a tracking object) tracking other objects (referred to as target objects) in an environment can determine poses and sizes of the other objects. Determining the poses and sizes of target objects in the environment allows the tracking object to accurately navigate through the environment by making intelligent motion planning and trajectory planning decisions.

Systems, apparatuses, methods (also referred to as processes), and computer-readable media are described herein for determining poses of objects in images using point-based object localization techniques. The systems and techniques described herein provide an efficient way to estimate a 6-degrees-of-freedom (6-DoF) object pose and the shape of the object from an image including the object (e.g., from a single image of the object). For instance, the systems and techniques can solve a Perspective-n-Point (PnP) problem in a more efficient manner as compared to existing point-based localization techniques (described below).

In some cases, the systems and techniques can implement a keypoint-based solution to determine an initial pose (and in some cases the shape) of an object in an image using one sample point (e.g., a 1-point Random sample consensus (RANSAC)-based method) from the input data. In one illustrative example (e.g., using the 1-point RANSAC-based method), only one sample point from the input data is needed for the systems and techniques to compute an object pose hypothesis. In addition to the one point needed to compute a pose candidate, other information can also be used, such as a two-dimensional (2D) bounding box of an object (e.g., determined using object detection) and a pitch angle of the camera. For instance, if it is assumed that an object is on the ground and the relationship (e.g., the pitch angle) between the ground and a camera used to capture an image is pre-calibrated, the pose parameterization for the PnP problem is reduced to 1-degrees-of-freedom (1-DoF) parameterization (e.g., including a yaw angle and/or a depth of an object). As described in more detail below, a pose hypothesis can be computed per a point correspondence sample. A best sample consensus can be determined using a RANSAC process (or other suitable process) with a computational complexity of O(m) (with m being the number of points sampled in the RANSAC process). Because only one sample point is needed in such an example, the number of required iterations of the RANSAC process is at most m times or less than m times, which reduces the computational complexity of performing the point-based objection localization from $O(m^3)$ or greater (up to $O(m^n)$) to $O(m)$.

Figure 1D:
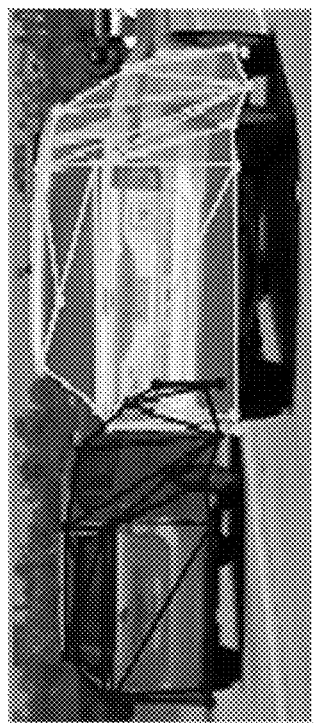
Figure 1A:
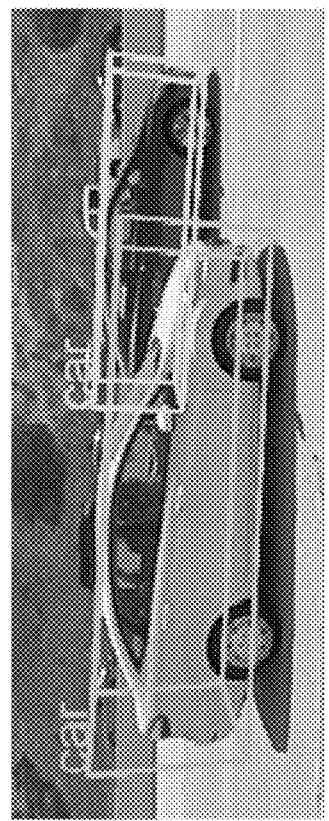
FIG. 1A and FIG. 1B are images illustrating an example of object detection and object localization results on the images, in accordance with some examples.
Figure 1B:
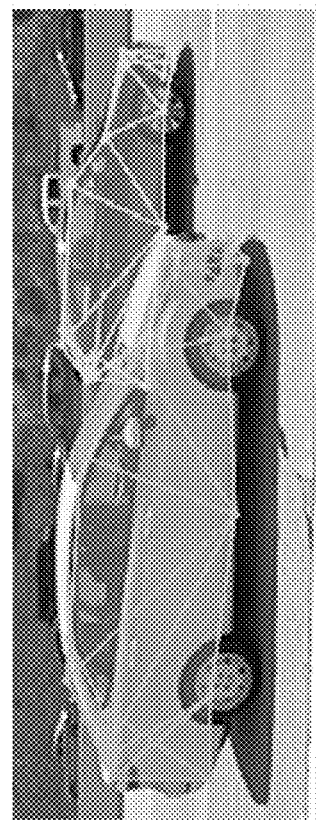

Various aspects of the application will be described with respect to the figures. One example of a field where a tracking object needs to be able to determine the pose of target objects is autonomous driving by autonomous driving systems (e.g., of autonomous vehicles). For instance, an autonomous driving system of an autonomous vehicle (a tracking vehicle) can determine the shapes and poses of other vehicles (target vehicles) on a road in order to successfully navigate itself through traffic. FIG. 1A and FIG. 1B are images 100 and 101 (from a side-facing camera of a tracking vehicle) illustrating an example of object detection and object localization results of objects in images. As shown in the image 100 of FIG. 1A, two cars are detected with respective 3D bounding boxes and classification (class) or category labels of "car." A 3D mesh (of a respective 3D model) is shown for each of the cars in the image 101 of FIG. 1B. To generate the 3D bounding boxes and the 3D meshes with an accurate pose and shape, object localization can be performed on the underlying image shown in FIG. 1A and FIG. 1B. The object localization can be used to estimate a 6D pose parameter (3D translation vector and 3D rotation vector) of the two cars in the camera coordinate system. FIG. 1C and FIG. 1D are images 102 and 103 (from a rear-facing camera of a tracking vehicle) illustrating another example of object detection and object localization results, with 3D bounding boxes shown in the image 102 and the 3D meshes shown in image 103.

Various techniques can be used to perform 3D object localization. In some examples, direct localization methods can use neural networks (e.g., convolutional neural networks (CNNs) or other neural network based system or algorithm) to regress the road object state. Examples of such techniques include ROI-10D (described in Fabian Manhardt et al., "ROI-10D: Monocular Lifting of 2D Detection to 6D Pose and Metric Shape," Computer Vision and Pattern Recognition (CVPR), 2019) and 3D-RCNN (described in Abhijit Kundu et al., "3D-RCNN: Instance-level 3D Object Reconstruction via Render-and-Compare," CPVR, 2018).

Figure 2:
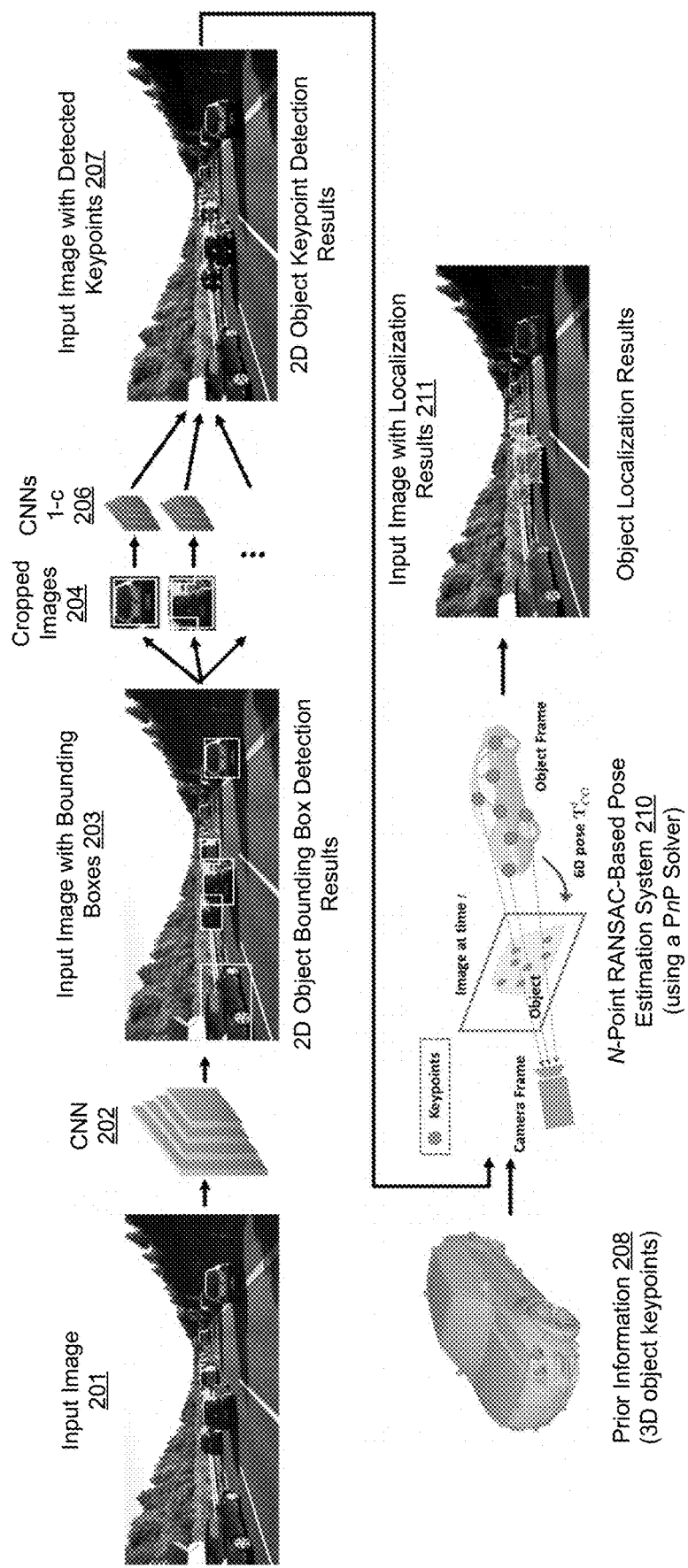
FIG. 2 is a diagram illustrating an example of a point-based object localization technique using multiple sample points, in accordance with some examples.

Some techniques solve a Perspective-n-Point (PnP) problem to estimate object poses. In some cases, when a pose is estimated from data that contains many outliers, a Random sample consensus (RANSAC) technique can be performed for robust model fitting. For instance, keypoint-based systems can use a PnP solver and RANSAC to perform 3D object localization. Keypoint-based systems can estimate 6D poses using extracted keypoints (also referred to herein as sample points) and 3D prior models. FIG. 2 is a diagram illustrating an example of a keypoint-based object localization system using multiple keypoints. As shown in FIG. 2, an input image 201 captured by a front-facing camera of a tracking vehicle is input to a convolutional neural network (CNN) 202. The CNN 202 is designed to perform 2D object detection on the input image 201 to generate a 2D bounding box representing each detected object. The input image is shown as image 203 with the 2D bounding boxes generated by the CNN 202. The input image 201 can then be cropped using the 2D bounding boxes. For example, the region of the input image 201 inside each bounding box can be cropped to produce individually cropped images 204.

Each of the cropped images 204 is input to a separate CNN, shown in FIG. 2 as CNNs 1-c 206, where c has a value greater than or equal to 0 (where if c=0, a single CNN is present for processing a single detected object). For instance, a first cropped image can be input to a first CNN, a second cropped image can be input to a second CNN, and so on. The CNNs 1-c 206 are designed to process the cropped images 204 to detect 2D object keypoints. The input image is shown as image 207 with the 2D object keypoint detection results generated by the CNNs 1-c 206. Each of the keypoints is represented in the image 207 by a dot, with dots having different colors being associated with different vehicles.

The 2D object keypoint detection results and prior information 208 (including a 3D object model and associated 3D keypoints) are provided as input to an N-Point RANSAC-based pose estimation system 210. The N-Point RANSAC-based pose estimation system 210 can use a PnP solver along with RANSAC to remove outliers. The object localization results from the N-Point RANSAC-based pose estimation system 210 are shown in the input image shown as image 211.

Figure 3:
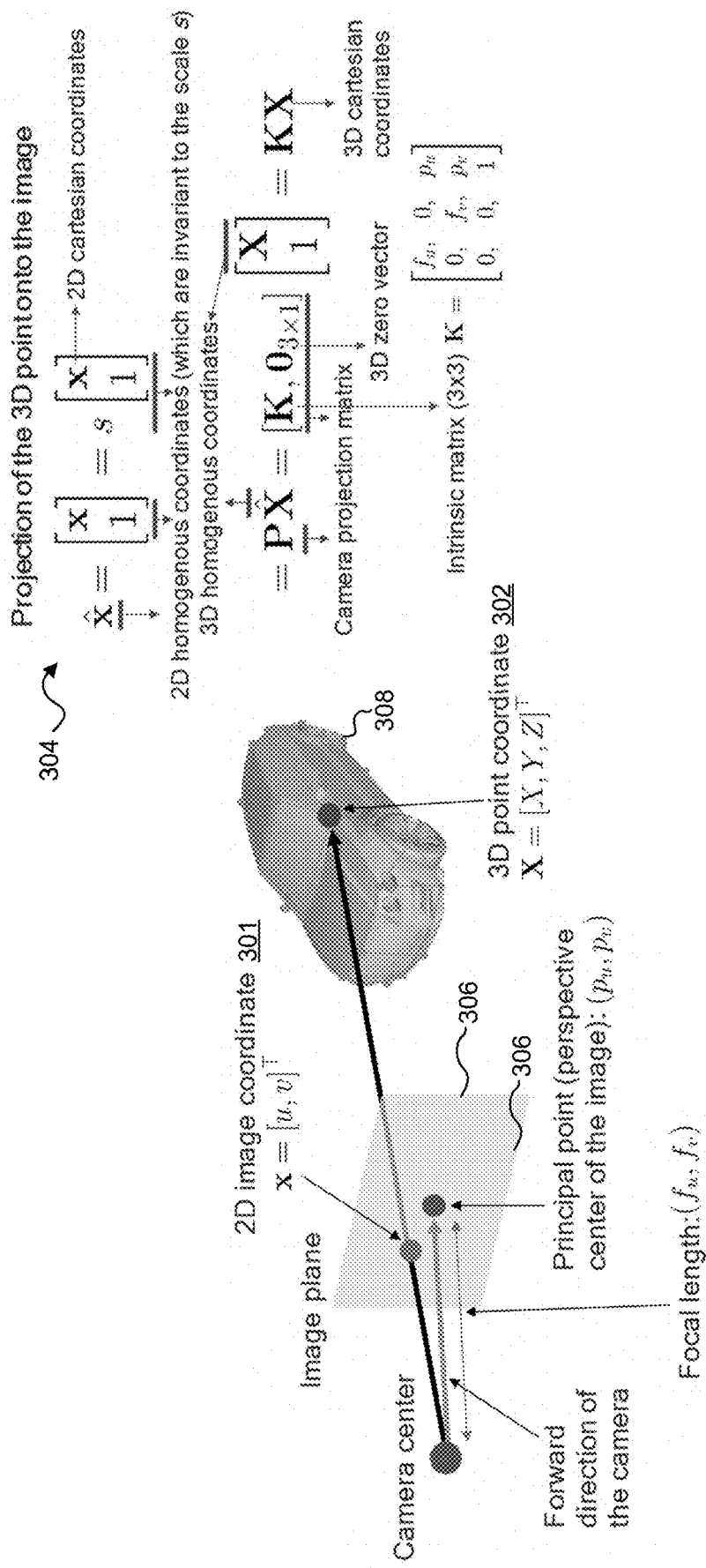
FIG. 3 is a diagram illustrating a geometric relationship between two-dimensional coordinates of an object in an image and a three-dimensional point of the object in a the three-dimensional real-world space, in accordance with some examples.

Knowledge of the general camera geometry can be utilized for performing PnP and other techniques. In the pinhole camera model, a scene view is formed by projecting 3D points into the image plane using a perspective transformation. FIG. 3 is a diagram illustrating an example of the pinhole camera model. The geometric relationship between 2D coordinates on an image (including 2D image coordinate 301) and the corresponding 3D points (including 3D point coordinate 302) in the 3D real-world space (here, the camera coordinate system) are shown. A set of formulas 304 are also shown in FIG. 3, which can be used for projection of the 3D point coordinate 302 (and/or other 3D point coordinates on the 3D object 308) onto the image plane 306 of a 2D image. As shown, a 2D homogenous image coordinate x (or point) is equal to the product of a camera projection matrix P and a 3D homogenous world coordinate X (or point).

Coordinate transformations can be used to transform coordinates from one coordinate system to another coordinate system. In one illustrative example, a coordinate system and points within the coordinate system can be transformed onto another coordinate system using the following 4×4 transformation matrix comprised of a 3×3 rotational matrix R and a 3D translational vector t:

$$T = \begin{bmatrix} R, & t \\ 0_{1 \times 3} & 1 \end{bmatrix} \qquad \text{Equation (1)}$$

Figures 4A, 4B, 4C:
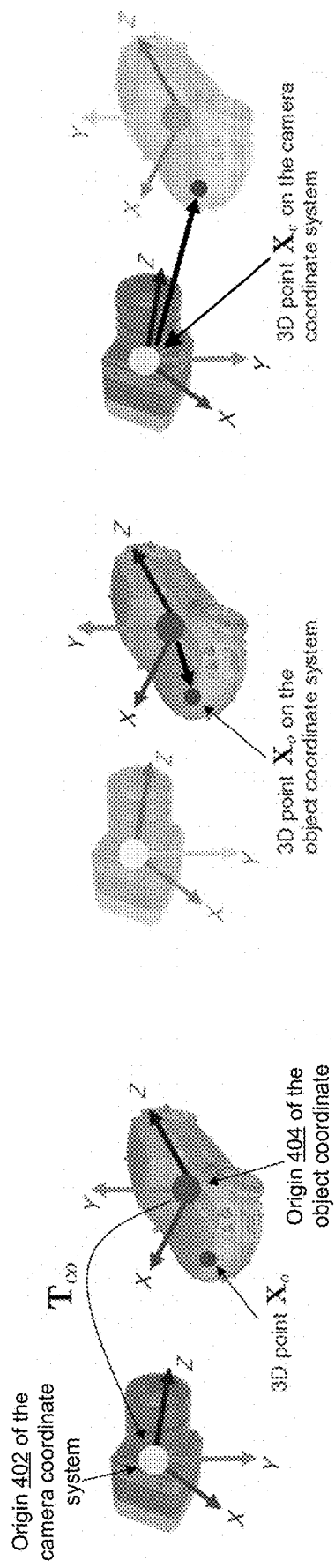
FIG. 4A-FIG. 4C are diagrams illustrating an example of coordinate transformations from an object coordinate system to a camera coordinate system, in accordance with some examples.

FIG. 4A-FIG. 4C are diagrams illustrating an example of coordinate transformations from an object coordinate system to a camera coordinate system. FIG. 4A illustrates the origin 402 of the camera coordinate system (also referred to as the camera center), a 3D point $X_O$ from a plurality of 3D points in an object coordinate system, and the origin 404 of the object coordinate system. A transformation matrix $T_{co}$ is also shown. As illustrated in FIG. 4A, FIG. 4B, and FIG. 4C, the points (including the point $X_O$) on the object coordinate system are transformed into points (including point $X_C$) on the camera coordinate system. In some examples, the following equation can be used to compute the transformation:

$$\hat{X}_c = \begin{bmatrix} X_c \\ 1 \end{bmatrix} = T_{co}\hat{X}_o = T_{co}\begin{bmatrix} X_o \\ 1 \end{bmatrix} = \begin{bmatrix} R_{co}X_o + t_{co} \\ 1 \end{bmatrix} \qquad \text{Equation (2)}$$

Figure 4D:
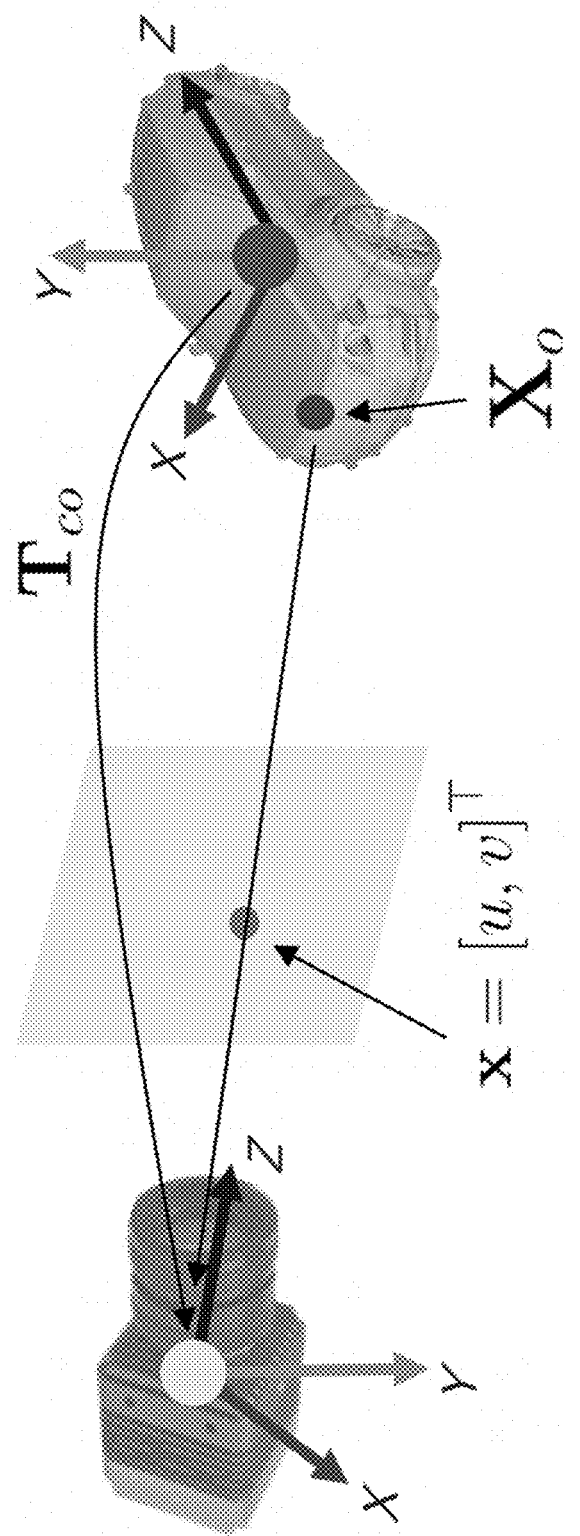
FIG. 4D is a diagram illustrating an example of a projection of a three-dimensional point on an object coordinate system to a two-dimensional point on an image, in accordance with some examples.
Figure 4E:
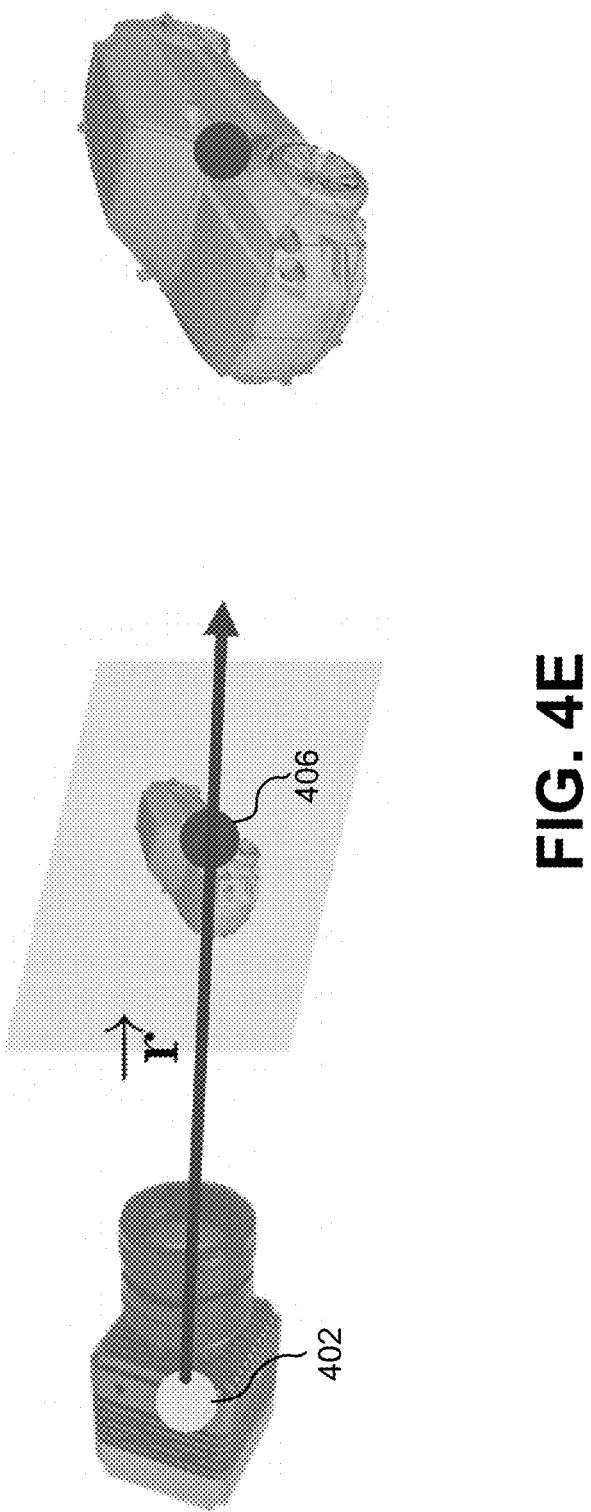
FIG. 4E is a diagram illustrating an example of back-projection of a two-dimensional point on an image to a camera coordinate system, in accordance with some examples.

FIG. 4D is a diagram illustrating an example of a projection of the 3D point $X_O$ on the object coordinate system (from FIG. 4A-FIG. 4C) to a 2D point on the image. The 3D point $X_O$ on the object coordinate system can include a vertex on a 3D model of the object illustrated in the image. In some examples, the 3D point $X_O$ can projected to a 2D point on the image using the following equation:

$$PT_{co}\hat{X}_o = PT_{co}\begin{bmatrix} X_o \\ 1 \end{bmatrix} = P\begin{bmatrix} R_{co}X_o + t_{co} \\ 1 \end{bmatrix} = P\hat{X}_c = P\begin{bmatrix} X_c \\ 1 \end{bmatrix} = KX_c = \begin{bmatrix} \hat{x} \\ \hat{y} \\ \hat{z} \end{bmatrix} = \hat{x} \qquad \text{Equation (3)}$$

$$x = \begin{bmatrix} u \\ v \end{bmatrix} = \begin{bmatrix} \frac{\hat{x}}{\hat{z}} \\ \frac{\hat{y}}{\hat{z}} \end{bmatrix}$$

The relationship between a 6D pose vector and a 4×4 transformation matrix can be defined and used to determine the 6D pose of an object in an image. For instance, a 4×4 transformation matrix belongs to the Special Euclidean group SE(3) and has six degrees of freedom (6-DoF). The real space SE(3) is a six-dimensional manifold, with the six dimensions corresponding to the number of degrees of freedom of a free-floating rigid body in space. The 4×4 transformation matrix belongs to SE(3). The 4×4 transformation matrix can be converted into a 6D vector (belonging to se(3) and comprised of a 3D rotational vector and a 3D translational vector) using a logarithmic map, in which case the 4×4 transformation matrix is identical to the 6D vector under SE(3). For instance, se(3) denotes a group of the 6D vectors and SE(3) denotes a group of the 4×4 transformation matrices. An example of the 6-DoF pose parameter definition is as follows (with $w_x$, $w_y$, and $w_z$ being the 3D rotational vector and $t_x$, $t_y$, and $t_z$ being the 3D translational vector that make up the 6D pose parameter):

$$T = \begin{bmatrix} R & t \\ 0_{1 \times 3} & 1 \end{bmatrix} \in SE(3) \quad \text{Equations (4)}$$

$$\xi = \begin{bmatrix} \omega \\ t \end{bmatrix} \in se(3),$$

$$\text{where } w = \begin{bmatrix} w_x \\ w_y \\ w_z \end{bmatrix} \in so(3), t = \begin{bmatrix} t_x \\ t_y \\ t_z \end{bmatrix} \in \mathbb{R}^3,$$

and the pose parameter conversion can be formulated using the transformation matrix T as follows:

$$\ln(T) \longmapsto \xi$$

$$e^\xi \longmapsto T \quad \text{Equations (5)}$$

Continuing with the examples from FIG. 4A-FIG. 4D, FIG. 4E is a diagram illustrating an example of back-projection of a 2D point on an image to a camera coordinate system. Given a 2D image, the ray direction from each pixel can be determined. However, the depth (a distance from the origin 402 (or camera center) to a 3D point) is not known. Back-projection of a 2D pixel point (a directional vector) can be computed and used when performing PnP, as discussed below. For instance, back-projection of a 2D pixel point 406 can be computed as a directional vector as follows:

$$\vec{r} = K^{-1} \hat{x} \quad \text{Equation (6)}$$

Figure 4F:
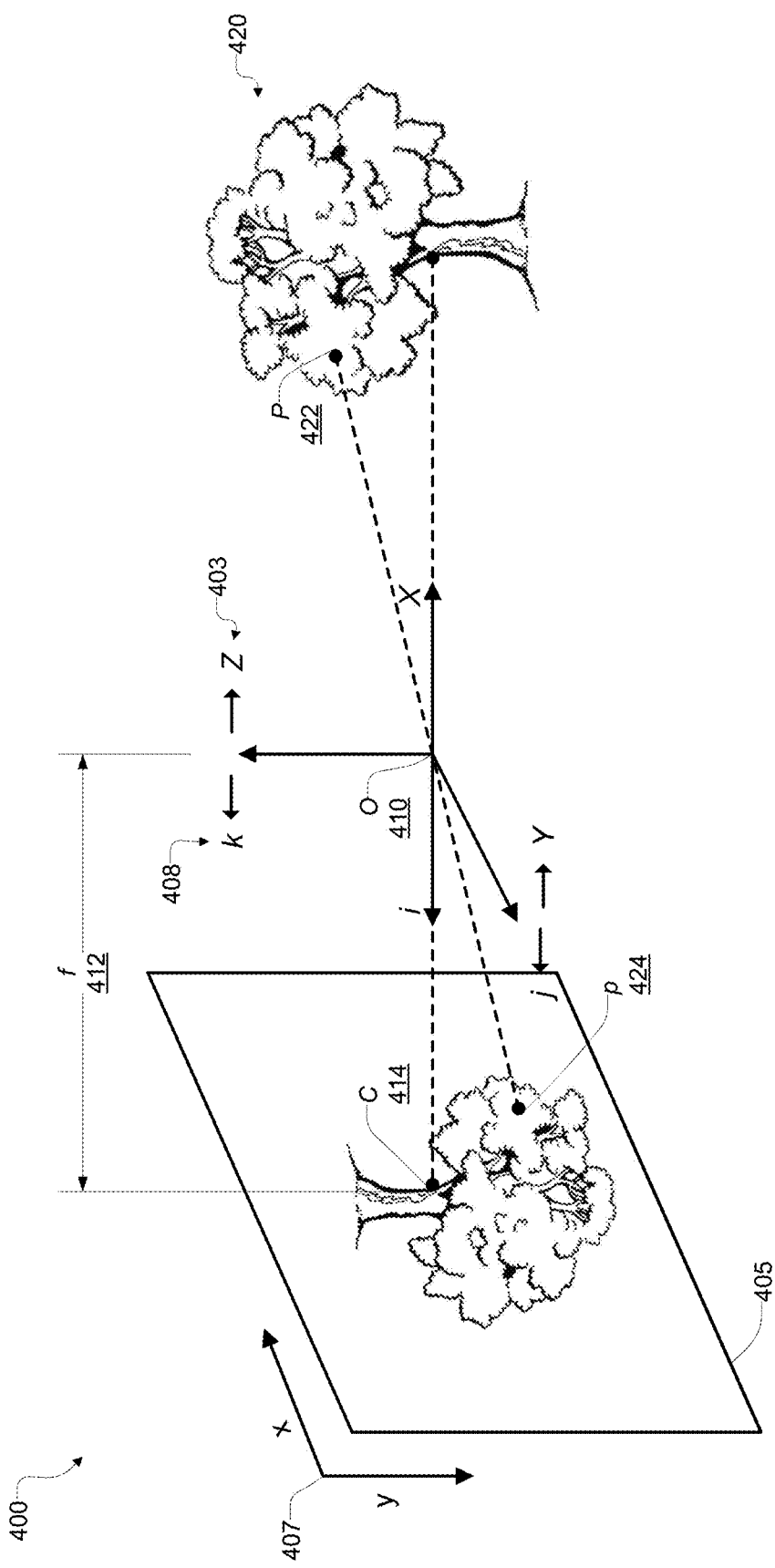
FIG. 4F is a conceptual diagram illustrating an example of a pinhole camera model, in accordance with some examples.

FIG. 4F is another diagram providing an illustration of the pinhole camera model 400. The pinhole camera is conceptualized as a simple camera without a lens and with a single small aperture. Light rays pass through the aperture and project an inverted image on the opposite side of the camera. The image can be captured onto photographic film. The surface where film would be placed is commonly called the image plane 405 or the retinal plane. The aperture is called the pinhole or center of the camera (shown as O 410). The distance between the image plane 405 and O 410 is the focal length (f) 412 (shown as f 412).

The pinhole camera model 400 can be used to map three-dimensional, real-world coordinates to the two-dimensional coordinate system 407 of the image plane. For example, a point P 422 on an object 420 in the real world can have 3D coordinates [X, Y, Z]. The point P 422 can be projected or mapped to a point p 424, whose 2D coordinates within the image plane are [x, y]. Note that, for convenience and clarity, capital letter variables (e.g., [X, Y, Z]) will be used herein to express three-dimensional real-world coordinates, and lower-case variables (e.g., [x, y]) will be used to express two-dimensional coordinates within the image plane 405.

As illustrated in this example, the pinhole camera model includes three coordinate references systems: the three-dimensional real-world coordinate system 403 centered at O 410, the three-dimensional (3D) camera reference system 408 [i, j, k] centered at O 410, and the two-dimensional image plane reference system 407, centered at one corner of the image plane 405. Transforming the 3D location of P 422 to P'=[X', Y' Z'] in the 3D camera reference system 408 can be accomplished using the following equation:

$$P' = \begin{bmatrix} X' \\ Y' \\ Z' \\ 1 \end{bmatrix} = \begin{bmatrix} R & t \\ 0 & 1 \end{bmatrix} \begin{bmatrix} X \\ Y \\ Z \\ 1 \end{bmatrix} \quad \text{Equation (7)}$$

In this equation, R includes the rotational parameters of the camera (e.g., pitch, yaw, and/or roll), and t is a translation vector (e.g., the physical location of the camera). Rotation and translation are intrinsic parameters of the camera. The rotational parameters R can be expressed using the following equation:

$$R = \begin{bmatrix} 1 & 0 & 0 \\ 0 & \cos\gamma & -\sin\gamma \\ 0 & \sin\gamma & \cos\gamma \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\alpha & -\sin\alpha & 0 \\ \sin\alpha & \cos\alpha & 0 \\ 0 & 0 & 1 \end{bmatrix} \quad \text{Equation (8)}$$

In the above equation, $\alpha$ is the yaw (horizontal rotation), $\beta$ is the pitch (up-and-down rotation), and $\gamma$ is the roll (side-to-side rotation). The pitch, roll, and yaw relative to a camera can be conceptualized as the yaw being the camera's horizontal rotation relative to the ground (e.g., left-to-right relative to the horizontal axis), the pitch being the camera's vertical rotation relative to the ground (e.g., up and down relative to the horizontal axis), and the roll being the camera's side-to-side rotation relative to the horizon (e.g., side-to-side relative to the horizontal axis). The translation vector t can be expressed as:

$$t = \begin{bmatrix} X_T \\ Y_T \\ Z_T \end{bmatrix} \quad \text{Equation (9)}$$

The camera's intrinsic parameters, K, can next be used to map P' from the 3D camera reference system 408 to the image plane 405. This mapping is also referred to as a projective transformation. The camera's intrinsic parameters can be expressed as follows:

$$K = \begin{bmatrix} f_x & S & x_c \\ 0 & f_y & y_c \\ 0 & 0 & 1 \end{bmatrix} \quad \text{Equation (10)}$$

In the above matrix, $f_x$ and $f_y$ are the focal length of the camera along the x and y axis, respectively; ($x_c$, $y_c$) is the center of the image plane 405; and S is a skew factor. Skew occurs when the 3D camera reference system 408 is not precisely perpendicular to the image plane 405.

Using the camera matrix, the 2-D location of p can now be determined from the 3D coordinates of P' in the 3D camera reference system 408, using the following equation:

$$p \begin{bmatrix} x \\ y \\ 1 \end{bmatrix} = \begin{bmatrix} f_x & s & x_0 \\ 0 & f_y & y_0 \\ 0 & 0 & 1 \end{bmatrix} \begin{bmatrix} X' \\ Y' \\ Z' \end{bmatrix} \quad \text{Equation (11)}$$

The above group of equations (7)-(11) provide a mapping for a point P 422 in the real world to a point p 424 in the image plane. A mapping from the 2D image plane to the 3D real world coordinate system (for example, to identify where an object in a video frame is positioned) can also be accomplished using these equations, when the extrinsic parameters are known.

FIG. 5-FIG. 8D are diagrams illustrating a perspective-n-point (PnP) technique. PnP can be used to estimate the 6-DoF pose parameter (defined by a transformation matrix T), given a set of n 3D points in the world space (or the object coordinate system) and the 2D projection points in the image that correspond to the set of n 3D points. The transformation matrix T defining the 6-DoF pose parameter includes a 3D rotational vector (including angles for pitch along the transverse axis, roll along the longitudinal axis, and yaw along the normal axis) and a 3D translational vector (including translation in the horizontal (x) direction, vertical (y) direction, and depth (z) direction)). As noted above, the yaw is the camera's horizontal rotation relative to the ground (e.g., left-to-right relative to the horizontal axis), the pitch is the camera's vertical rotation relative to the ground (e.g., up and down relative to the horizontal axis), and the roll is the camera's side-to-side rotation relative to the horizon (e.g., side-to-side relative to the horizontal axis).

Figure 5:
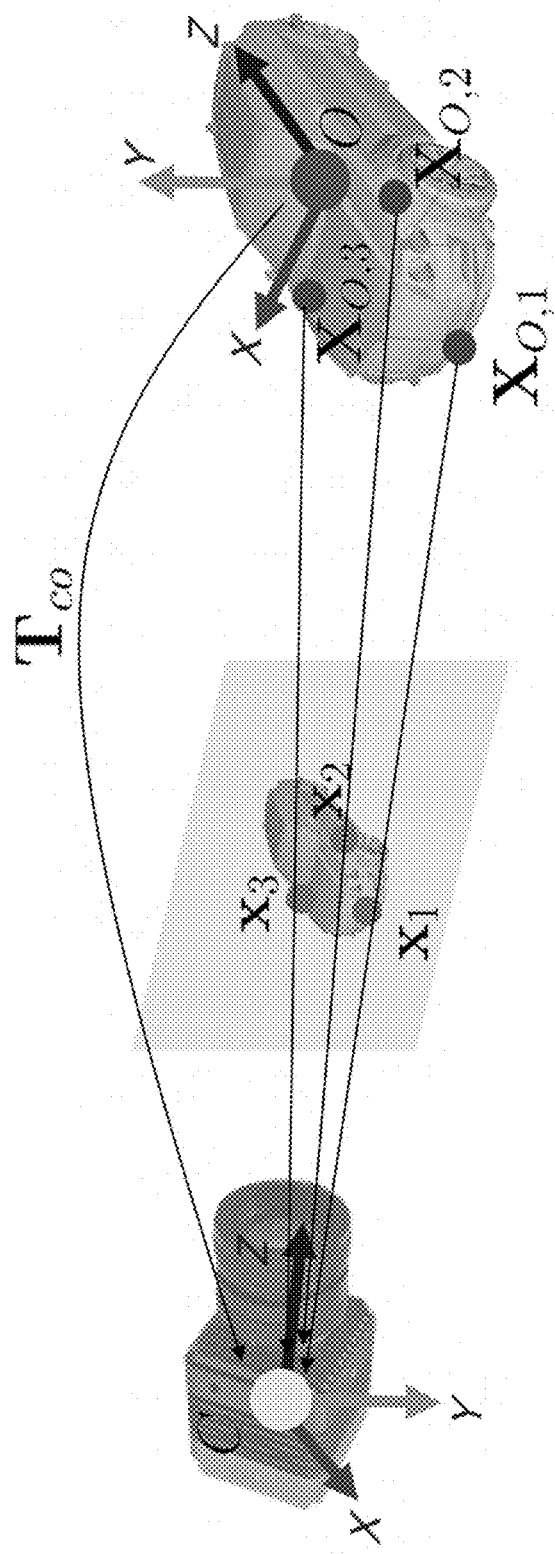

When performing PnP, it can be assumed that the camera is calibrated (the intrinsic parameters K are known). PnP requires three or more point correspondences (between three 3D points and three corresponding 2D projection points). For example, as shown in FIG. 5, a first 3D point $X_{O,1}$ and corresponding 2D projection point $x_1$, a second 3D point $X_{O,2}$ and corresponding 2D projection point $x_2$, and a third 3D point $X_{O,3}$ and corresponding 2D projection point $x_3$ can be identified for use in the PnP algorithm. A transformation matrix $T_{co}$ is also shown in FIG. 5.

In some cases, there can be outliers in the 2D-to-3D point correspondences. For example, as shown in FIG. 6, the point correspondence between the second 3D point $X_{O,2}$ and the corresponding 2D projection point $x_2$ can be considered an outlier. When outliers are present, they can produce an incorrect pose estimate. It can thus be beneficial to filter out any outliers that are present. One illustrative technique that can be used to filter out outliers is Random sample consensus (RANSAC). RANSAC is an algorithm that can be used to estimate (or fit) a model in the existence of outlier point correspondences.

FIG. 7 illustrates an example of a pose estimation using RANSAC and PnP algorithms. For example, given a set of 2D-3D sample point (also referred to as keypoints) correspondences, C, n sample point (or keypoint) correspondences are sampled. Such sampling can be denoted as a set of sample point correspondences $\{(x_1, X_1), \ldots, (x_n, X_n)|(x_i, X_i) \in C\}$. A pose hypothesis $T_{cand}$ can be computed using a PnP technique. Reprojection errors can be computed for all the sample point correspondences and the sample points with reprojection errors that are within an outlier threshold value are regarded as inliers. This process is repeated N times and the pose with the maximum number of inliers is selected as the best pose estimate. The maximum number of iteration can be reduced by considering a inlier probability in some cases. The pose estimate can be optimized by minimizing the reprojection errors of the inlier sample points.

Figure 8B:
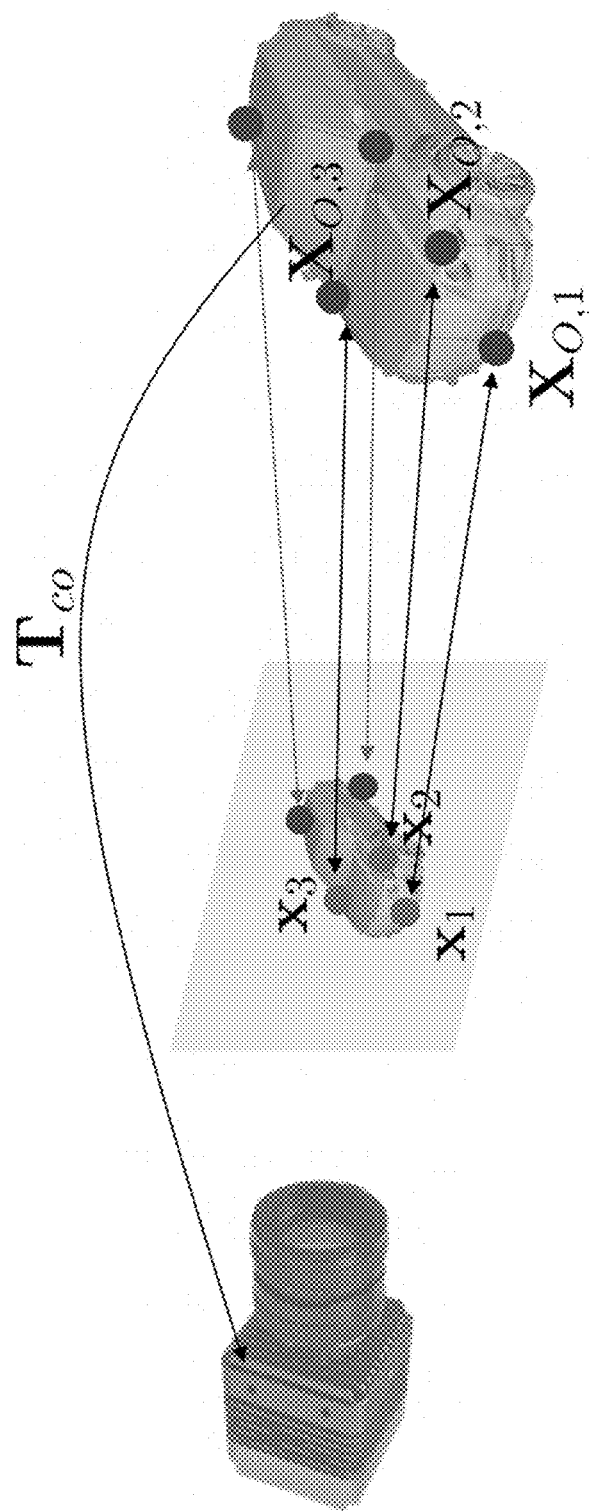
Figure 8D:
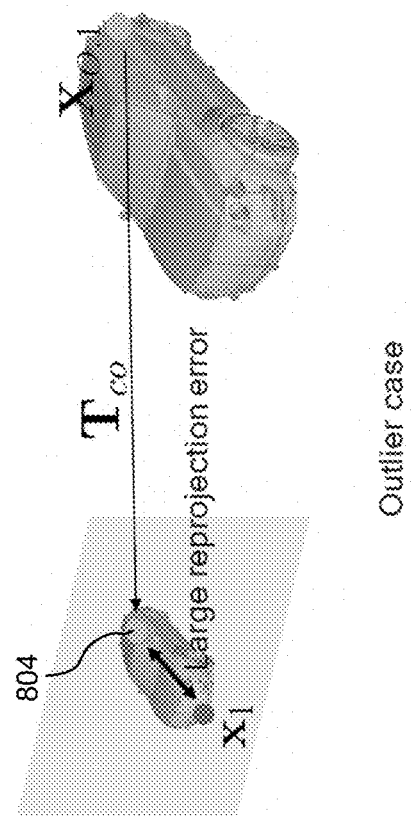
Figure 8C:
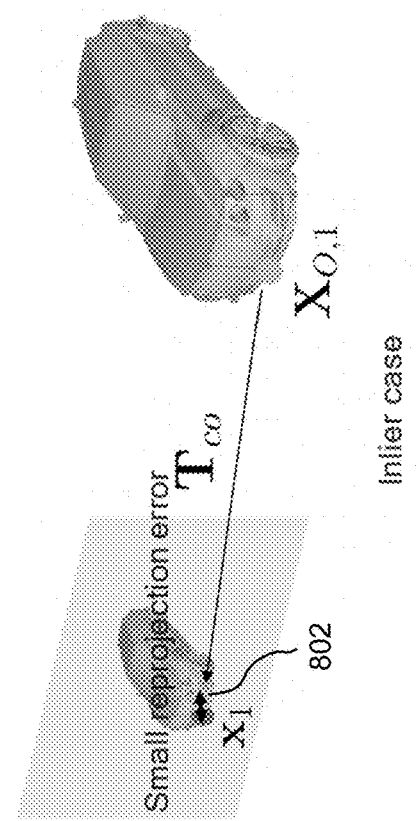

FIG. 8A illustrates a first step of RANSAC. Given m 2D-3D point correspondences, the RANSAC algorithm randomly samples three 2D-3D point correspondences among the m correspondences. For example, as shown in FIG. 8A, three points (n=3, labeled $X_{O,1}$, $X_{O,2}$, and $X_{O,3}$) are sampled out of five total 2D-3D point correspondences (m=5). FIG. 8B illustrates a second step of RANSAC, where a pose parameter $T_{co}$ is computed using the PnP solver (with n=3 in the example of FIG. 8B), as described above. FIG. 8C and FIG. 8D illustrates a third step of RANSAC. For example, the algorithm can check whether each point correspondence is an inlier or an outlier. A point correspondence can be determined to be an inlier if a reprojection error is within an outlier threshold value. The outlier threshold value can be set to any suitable value, and in some cases is a user-defined value. The threshold value can vary depending on the camera configuration (e.g. image resolution, a focal length, the size of the 2D bounding box, etc.). In one illustrative example, the threshold value can be defined as 0.03~0.1 times the width and/or height of the 2D object bounding box (e.g., outlier threshold=$0.03*BB_{Width}$ or outlier threshold=$0.03*BB_{Height}$, with BB referring to the bounding box). The reprojection error can include any suitable distance or error metric, such as Euclidean distance, Manhattan distance, or other suitable metric. For instance, the reprojection error can be defined as a Euclidean distance between the 2D image point and the projection point of the corresponding 3D point onto the image using the computed pose parameter T (e.g., $T_{co}$), as follows:

$$e_{reproj}(x, X \mid T) = \|x - \bar{x}\| = \sqrt{(u - \bar{u})^2 + (v - \bar{v})^2} \quad \text{Equation (12)}$$

$$\text{where } \bar{x} = \begin{bmatrix} \bar{u} \\ \bar{v} \end{bmatrix} = \begin{bmatrix} \frac{x}{z} \\ \frac{y}{z} \end{bmatrix} \text{ and } \begin{bmatrix} x \\ y \\ z \end{bmatrix} = PT\hat{X} \quad \text{Equation (13)}$$

The projection error shown in FIG. 8A is a small projection error (below the outlier threshold) between the actual 2D image point $x_1$ and the projection point 802 of the 3D point $X_{O,1}$, in which case the projection point 802 of the 3D point $X_{O,1}$ is considered an inlier. The projection error shown in FIG. 8B is a large projection error (above the outlier threshold) between the actual 2D image point $x_1$ and the projection point 804 of the 3D point $X_{O,1}$, in which case the projection point 802 of the 3D point $X_{O,1}$ is considered an outlier.

In a fourth step of RANSAC, the first three steps can be repeated N times, and the pose parameter T with the maximum number of inliers among the N pose parameter candidates can be selected. In some cases, post-processing can be performed in the PnP technique. For example, after filtering out the outliers, the best pose parameter can be optimized using all the inliers. The optimal pose parameter minimizing the reprojection errors of all the inliers can be found as:

$$T_{co} = \underset{T_{co}}{\mathrm{argmin}} \sum_i e_{reproj}^2(x_i, X_i \mid T_{co}) \quad \text{Equation (14)}$$

Various optimization methods can be used, such as the Gauss-Newton method, the Levenberg-Marquardt method, among others.

Inferring 3D information (e.g., pose and shape) of an object from a single two-dimensional image can be challenging, due at least to the problem being inherently ill-posed due to the lack of geometric cues in a single image. Keypoint-based techniques have been shown to achieve superior performance in terms of localization accuracy as opposed to other methods. As described above, keypoint-based approaches assume an object shape is defined by a 3D model (which can be a parametric deformable model) that is statistically modeled from prior shape models (e.g., active shape models (ASM)). Such approaches simultaneously optimize the 6-DoF pose and deformable model parameters by minimizing re-projection errors for 2D-3D point correspondences of the object. Most keypoint-based methods initialize an object pose by solving a perspective-n-point (PnP) problem. In cases for which the data contains many outliers, RANSAC can be used to filter out outlier correspondences and to initialize an object pose.

In general, the computational complexity of the RANSAC process for the PnP problem has a complexity of $O(m^n)$ (where m is the number of 2D-3D point correspondences), and at least $O(m^3)$ because at least three points (n=3) need to be sampled for algebraic pose computation (e.g., as at least three points should be sampled to initialize a pose candidate in the RANSAC process). Accordingly, limitations of existing keypoint-based pose determination systems that use PnP solvers include that they require at least three points to compute a pose candidate, in which case the pose computation is repeated at most $m^3$ times (e.g., usually at least hundreds of times) in the RANSAC process. The high computational complexity of keypoint-based techniques can make real-time performance difficult in real-world scenarios. In many cases, the high complexity of such techniques reduces the maximum number of objects that can be localized (with pose and/or shape determinations) in a real-time system, imposing a severe strain on devices and systems that estimate multiple object poses in real-time scenarios (e.g., in manufacturing systems, autonomous driving systems of autonomous vehicles and/or aviation systems, robotics systems, augmented reality (AR) systems, virtual reality (VR) systems, among others).

As noted above, systems and techniques are described herein for determining poses of objects in images using point-based object localization techniques. The systems and techniques described herein provide an efficient way to estimate a 6-degrees-of-freedom (6-DoF) object pose and the shape of the object from an image including the object (e.g., from a single image of the object). For instance, the systems and techniques can solve the PnP problem noted above in a more efficient manner as compared to existing point-based localization techniques. In some examples, the systems and techniques can implement a keypoint-based solution to determine an initial pose (and in some cases the shape) of an object in an image using one sample point (e.g., a 1-point RANSAC-based method) from the input data.

For example (e.g., using the 1-point RANSAC-based method), one sample point from the input data is needed for the systems and techniques to compute an object pose hypothesis. In addition to the one point needed to compute a pose candidate, additional information can also be used. For instance, the additional information can include a 2D bounding box of an object (from object detection) and a pitch angle of the camera. If it is assumed that an object is on the ground and the relationship (e.g., the pitch angle) between the ground and a camera used to capture an image is pre-calibrated, the pose parameterization for the PnP problem is reduced to 1-DoF parameterization (a yaw angle and/or a depth of an object).

In some examples, a pose hypothesis can be computed for each point correspondence sample. In such examples, the best sample consensus can be determined using a RANSAC process (or other suitable process) with a computational complexity of $O(m)$ (with m being the number of points sampled in the RANSAC process). Because only one sample point is needed, the number of required iterations of the RANSAC process the systems and techniques described herein is at most m times or less than m times, reducing the computational complexity of performing the point-based objection localization from $O(m^3)$ or greater (up to $O(m^n)$), as noted above, to $O(m)$.

Figure 9:
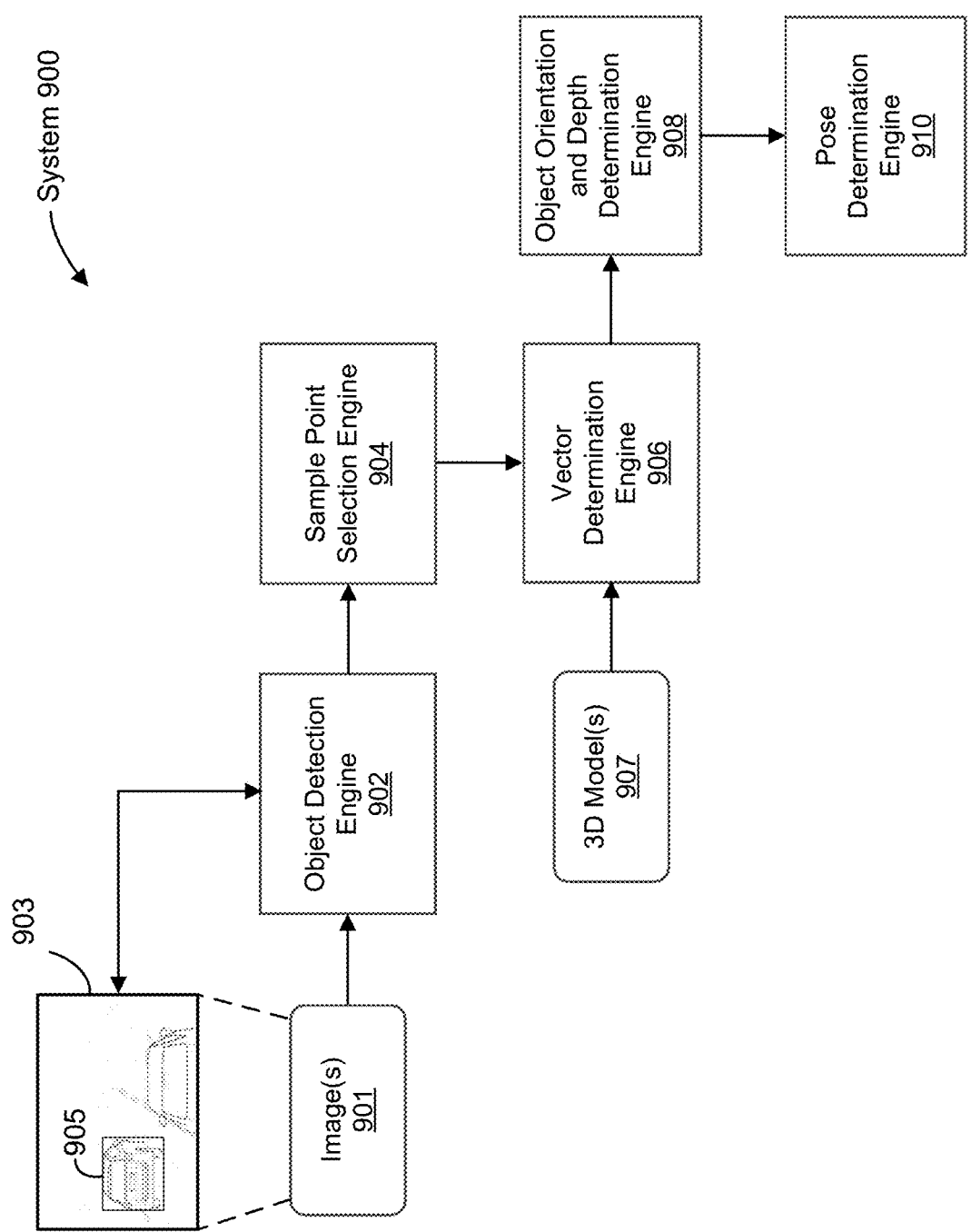
FIG. 9 is a diagram illustrating an example of a system for determining poses (and in cases shapes) of objects in images, in accordance with some examples.

FIG. 9 is a diagram illustrating an example of a system 900 for determining poses (and in cases shapes and/or sizes) of objects in images. Given a 3D model (e.g., including a set of vertices) out of one or more 3D models 907, the system 900 can be used to estimate a 6D pose hypothesis (and in some cases the shapes and/or sizes) of an object (or multiple objects) in an environment using a sample point (also referred to as a keypoint sample) and a two-dimensional bounding box (2D bounding box). The 2D bounding box can be generated by the object detection engine 902 from an input image (out of the one or more images 901) of the environment.

The system 900 includes various components, including an object detection engine 902, a sample point selection engine 904, a vector determination engine 906, an object orientation and depth determination engine 908, and a pose determination engine 910. In some cases, the system 900 can include one or more cameras (not shown) that can be used to capture the one or more images 901. In some cases, the system 900 can receive, retrieve, or otherwise obtain the one or more images 901 from other sources (e.g., from another device, from storage, from a network-based location such as a server over the Internet, or other source). The components of the system 900 can include software, hardware, or both. For example, in some implementations, the components of the system 900 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the system 900.

While the system 900 is shown to include certain components, one of ordinary skill will appreciate that the system 900 can include more or fewer components than those shown in FIG. 9. For example, the system 900 can include, or can be part of a computing device that includes, one or more input devices and one or more output devices (not shown). In some implementations, the system 900 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 9.

As noted above, the system 900 can be implemented by and/or included in a computing device or other object. In some cases, multiple computing devices can be used to implement the system 900. For example, a computing device used to implement the system 900 can include a computer or multiple computers that are part of a device or object, such as a vehicle, a robotic device, a surveillance system, and/or any other computing device or object with the resource capabilities to perform the techniques described herein. In other examples, a computing device used to implement the system 900 can include a personal computer, a tablet computer, a mobile device (e.g., a mobile phone or other mobile device), a wearable device (e.g., a smart watch, a virtual reality headset, an augmented reality headset, and/or other wearable device), a server or multiple servers (e.g., in a software as a service (SaaS) system or other server-based system), and/or any other computing device with the resource capabilities to perform the techniques described herein.

In some implementations, the system 900 can be integrated with (e.g., integrated into the software, added as one or more plug-ins, included as one or more library functions, or otherwise integrated with) one or more software applications, such as a modeling software application, an autonomous driving or navigation software application, or suite of software applications. The one or more software applications can be installed on the computing device or object implementing the system 900. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the system 900 can be implemented in a suite of software applications.

Figure 10:
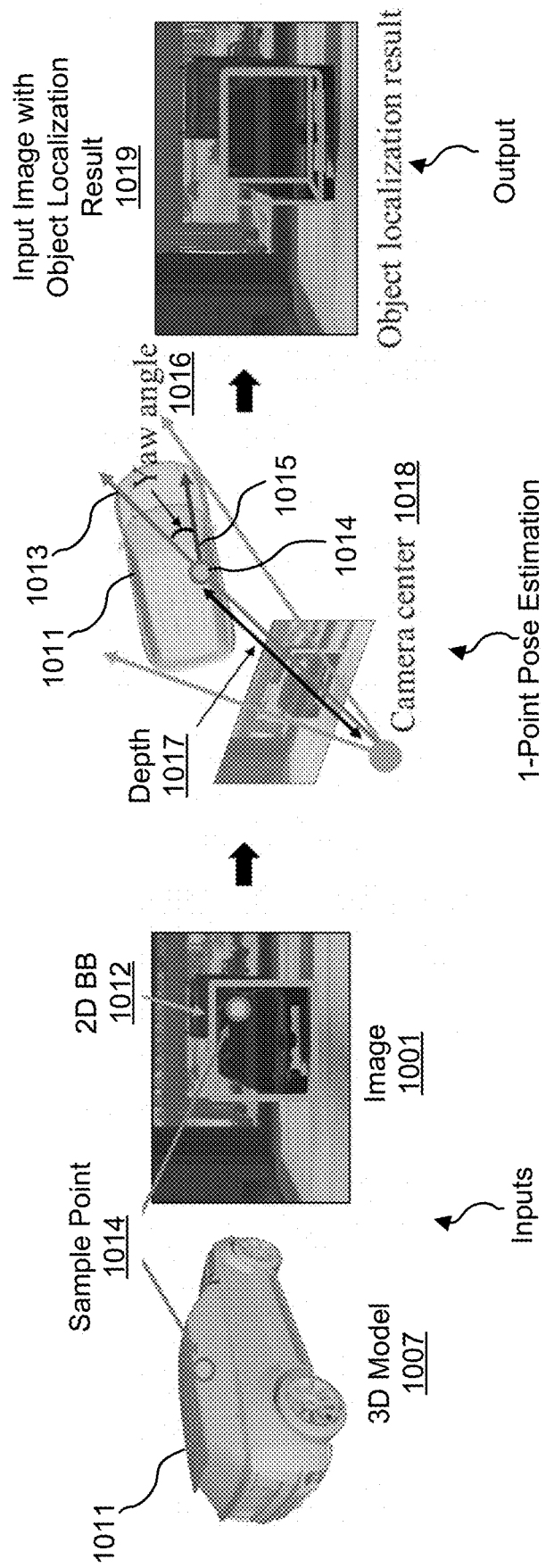
FIG. 10 is a diagram illustrating a high level overview of a process that can be performed by the system shown in FIG. 9, in accordance with some examples.

FIG. 10 is a diagram illustrating a high level overview of a process that can be performed by the system 900 shown in FIG. 9. The process of FIG. 10 illustrates a 1-Point RANSAC-based pose estimation technique. For example, given a 3D model 1007 of a vehicle 1011 (from the one or more 3D models 907) including a set of vertices, the system 900 can compute a 6-dimensional (e.g., having 6-degrees-of-freedom or 6-DoF) pose hypothesis of the object in an image 1001 using a sample point 1014 (selected by sample point selection engine 904) and a 2D bounding box 1012 shown in the image 1001. The 2D bounding box 1012 can be generated by the object detection engine 902. As shown in FIG. 10, and as described in greater detail below, using information determined by the vector determination engine 906, the object orientation and depth determination engine 908 determines a depth 1017 and a yaw angle 1016 relative to the camera center 1018 of the camera used to capture the image. The yaw angle 1016 is the angle between a direction (represented by directional vector 1013) of the sample point 1014 from the camera center 1018 and the forward direction (represented by directional vector 1015) of the vehicle 1011. The forward direction of the camera is perpendicular to the image plane of the camera. As can be seen from FIG. 10, the yaw angle 1016 represents the orientation of the object relative to the direction (shown by directional vector 1013) of the sample point 1014. The pose determination engine 910 can determine the best 6D pose hypothesis from among a plurality of 6D pose hypotheses using RANSAC or other suitable technique. The final object localization result for a detected object includes best 6D pose hypothesis selected using RANSAC or other technique. The 6D pose hypothesis is shown in image 1019, which is the input image with object localization result illustrated thereon.

In some aspects, prior-known information can be used to reduce the number of points required for computing an object pose hypothesis. For example, it can be assumed that the 3D model 1007 (and the 2D-3D sample point or keypoint correspondences of the 3D model) and a pitch angle (the angle from the camera center to the ground plane or horizontal plane) are already known as prior information. With respect to the pitch angle, it can be assumed that the tilt of the camera to the ground where an object of interest is placed is given as the pitch angle $\theta_p$. Given the prior information, a 2D bounding box is obtained by the object detection engine 902 and one sample point (also referred to as a keypoint sample) is obtained by the sample point selection engine 904. For instance, from the pitch angle $\theta_p$, a rotation transformation $R_{cg} \in SO(3)$ from the ground to the camera is defined as $R_{cg} = e^{\omega_p}$, where $\omega_p = [-\theta_p, 0, 0]^T \in so(3)$ and $e: so(3) \mapsto SO(3)$ is an exponential map. In one example, if an object is fronto-parallel to the image plane, $R_{cg} = I_3$ where $I_3$ is a 3×3 identity matrix. Further, in addition to the 3D model 1007 of the object and its 2D-3D sample point (or keypoint) correspondences, which are provided as input by default in the PnP problem, the 2D bounding box of the detected object is provided as input to the vector determination engine 906. The vector determination engine 906 can project the rays of both sides of the 2D bounding box on a horizontal plane (e.g., a road surface). The sample point can be redefined as an origin in the object coordinate system of the 3D model 1007.

The object orientation and depth determination engine 908 can compute the yaw angle 1016 and the depth 1017 of the sample point relative to the direction of the sample point (shown by directional vector 1013). In one illustrating example, the object orientation and depth determination engine 908 can compute the yaw angle 1016 and the depth 1017 of the sample point relative to the direction of the sample point by solving an equation which is derived from the Sine rule or other rule. For instance, using the prior information, the problem can be redefined as aligning the projection of a 3D bounding box of the object into the back-projected rays of both sides of the 2D bounding box in a bird-eye view (BEV) of the object (i.e., from directly above the object), after which the yaw angle 1016 of the vehicle 1011 and the depth 1017 of the sample point 1014 are computed, as shown in FIG. 10. As described in more detail below, an equation can be formulated (e.g., based on the Sine rule) that computes the pose of the object of interest by 1-DOF parameterization. As noted above and described further below, a unique pose hypotheses per sample point can be obtained by solving the equation. The RANSAC process (e.g., the algorithm shown in FIG. 7) or other suitable technique can be used to determine the optimal pose parameter with the maximum number of inliers among those hypotheses. In some cases, the determined pose can then be optimized.

Returning to FIG. 9, the one or more images 901 can include still images or video frames. The one or more images 901 each contain images of a scene or environment. An example of an image 903 is shown in FIG. 9. The image 903 illustrates an example of an image captured by a camera of a tracking vehicle (as an example of a tracking object). The image 903 can include one or multiple target vehicles (as an example of target objects). When video frames are captured, the video frames can be part of one or more video sequences. As noted above, in some cases, the one or more images 901 can be captured by one or more cameras included in the system 900 or included outside of the system 900 in the computing device comprising the system 900. In some cases, the one or more images 901 can be stored in a storage device (not shown), and the one or more images 901 can be retrieved or otherwise obtained by the system 900 from the storage device. The one or more images 901 can be raster images composed of pixels (or voxels) optionally with a depth map, vector images composed of vectors or polygons, or a combination thereof. The one or more images 901 may include one or more two-dimensional representations of a scene along one or more planes (e.g., a plane in a horizontal or x-direction and a plane in a vertical or y-direction), or one or more three dimensional representations of the scene.

The object detection engine 902 can obtain and process the one or more images 901 to detect and/or track one or more objects in the one or more images 901. The object detection engine 902 can generate and output bounding regions (e.g., a bounding region 905) as detected and tracked objects. In some cases, the object detection engine 902 can determine a classification (referred to as a class) or category of each object detected in an image. As noted above, a bounding region can be generated for identifying each object detected in an image. For instance, an object can be detected in an image, and a bounding region and in some cases a class label (also referred to as a category label) can be output by the object detection engine 902 for the detected object. The bounding region can be used by other components of the system 900 to identify a region of the image that includes the detected object (e.g., bounding region identifying a target vehicle). In some cases, the dimensions of a bounding region (e.g., the width and/or height, the length of a diagonal, such as from a bottom-left corner to a top-right corner of from a top-left corner to a top-right corner, or other dimensions) can also be output by the object detection engine 902. A bounding region assigned to a detected object can include a bounding box, a bounding circle, a bounding ellipse, or any other suitably-shaped region representing a detected object. While examples are described herein using bounding boxes for illustrative purposes, the techniques and systems described herein can also apply using other suitably shaped bounding regions. A bounding box associated with a detected object can have a rectangular shape, a square shape, or other suitable shape. In some cases, the object detection engine 902 can output multiple classes for a detected object, along with a confidence score indicating a confidence that the object belongs to each of the classes (e.g., a confidence score of 0.85 that the object is a car, a confidence score of 0.14 that the object is a truck, and a confidence score of 0.01 that the object is a motorcycle).

Any suitable object detection and/or classification technique can be performed by the object detection engine 902. In some cases, the object detection engine 902 can use a machine learning based object detector, such as using one or more neural networks. For instance, a deep learning-based object detector can be used to detect and classify objects in the one or more images 901. One illustrative example of a neural network based detector is described below with respect to FIG. 20. In another illustrative example, a Cifar-10 neural network based detector can be used to perform object classification to classify objects. In some cases, the Cifar-10 detector can be trained to classify only certain objects, such as vehicles. Further details of the Cifar-10 detector are described below with respect to FIG. 21.

Another illustrative example of a deep learning based detector is a fast single-shot object detector (SSD) including a neural network and that can be applied for multiple object categories. A feature of the SSD model is the use of multi-scale convolutional bounding box outputs attached to multiple feature maps at the top of the neural network. Such a representation allows the SSD to efficiently model diverse bounding box shapes. It has been demonstrated that, given the same VGG-16 base architecture, SSD compares favorably to its state-of-the-art object detector counterparts in terms of both accuracy and speed. An SSD deep learning detector is described in more detail in K. Simonyan and A. Zisserman, "Very deep convolutional networks for large-scale image recognition," CoRR, abs/1409.1556, 2014, which is hereby incorporated by reference in its entirety for all purposes. Further details of the SSD detector are described below with respect to FIG. 22A-FIG. 22C.

Another illustrative example of a deep learning-based detector that can be used to detect and classify objects in the one or more images 901 includes the You only look once (YOLO) detector. The YOLO detector, when run on a Titan X, processes images at 40-90 fps with a mAP of 78.6% (based on VOC 2007). A YOLO deep learning detector is described in more detail in J. Redmon, S. Divvala, R. Girshick, and A. Farhadi, "You only look once: Unified, real-time object detection," arXiv preprint arXiv: 1506.02640, 2015, which is hereby incorporated by reference in its entirety for all purposes. Further details of the YOLO detector are described below with respect to FIG. 23A-FIG. 23C. While certain object detectors are provided as illustrative examples, one of ordinary skill will appreciate that any other suitable object detection and classification can be performed by the object detection engine 902.

The object detection engine 902 can provide a 2D bounding box for an object detected in an image to the sample point selection engine 904. In one illustrative example, the 2D bounding box can be represented by at least two points of the bounding box, such as the top-left-most point and the bottom-right-most point of the bounding box, the top-right-most point and the bottom-left-most point of the bounding box, a center point of the bounding box, or other points. The following can be used to represent a bounding box using the top-left-most point and the bottom-right-most point of the bounding box:

$$(x_{lt},x_{rb})=([u_{lt},v_{lt}]^T,[u_{rb},v_{rb}]^T)$$

In some cases, the number of sample points (keypoints) and their locations can be defined by a user in advance, as shown in FIG. 25. 3D sample points can be manually annotated by a user in advance and used as prior information. 2D sample points can be obtained by CNNs (e.g., the CNNs 1-c 206 from FIG. 2) implemented by the sample point selection engine 904. The CNNs are trained using image datasets with 2D keypoint annotations, which can be annotated manually by users. Once the CNNs are trained using the image datasets, given an input image, the CNNs provide a 2D coordinate and a confidence value of each sample point (or keypoint). If the confidence value is more than a threshold value (e.g., a threshold value of 0.6, 0.7, 0.8, or other threshold value), the sample point is regarded as a detected sample point. For instance, referring FIG. 25 as an illustrative example, if 53 sample points are defined, the CNNs can provide 53 2D coordinates and 53 confidence values from a cropped image of an object.

For the detected object detected by the object detection engine 902 in an image, the sample point selection engine 904 can select a sample point (or keypoint) from the image.

In some examples, the sample point selection engine 904 can randomly sample a sample point from within the region of the image that is contained in the 2D bounding box (which includes the pixels of the image representing the object). In one illustrative example of random sampling, assuming that 20 sample points (or keypoints) are detected among 53 sample points, one keypoint can be randomly sampled among the 20 sample points.

A sample point $x_K$ selected by the sample point selection engine 904 can be represented as follows:

$$x_K = [u_K, v_K]^T$$

Figure 11B:
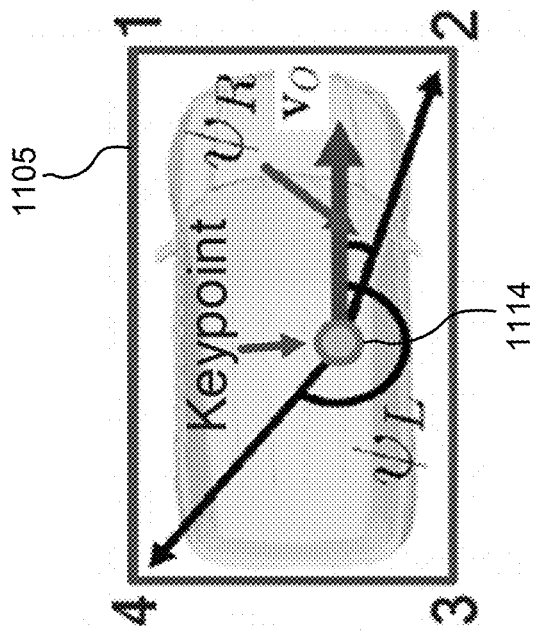
FIG. 11A and FIG. 11B are diagrams illustrating an example of a relationship between an object and a camera, in accordance with some examples.
Figure 11A:
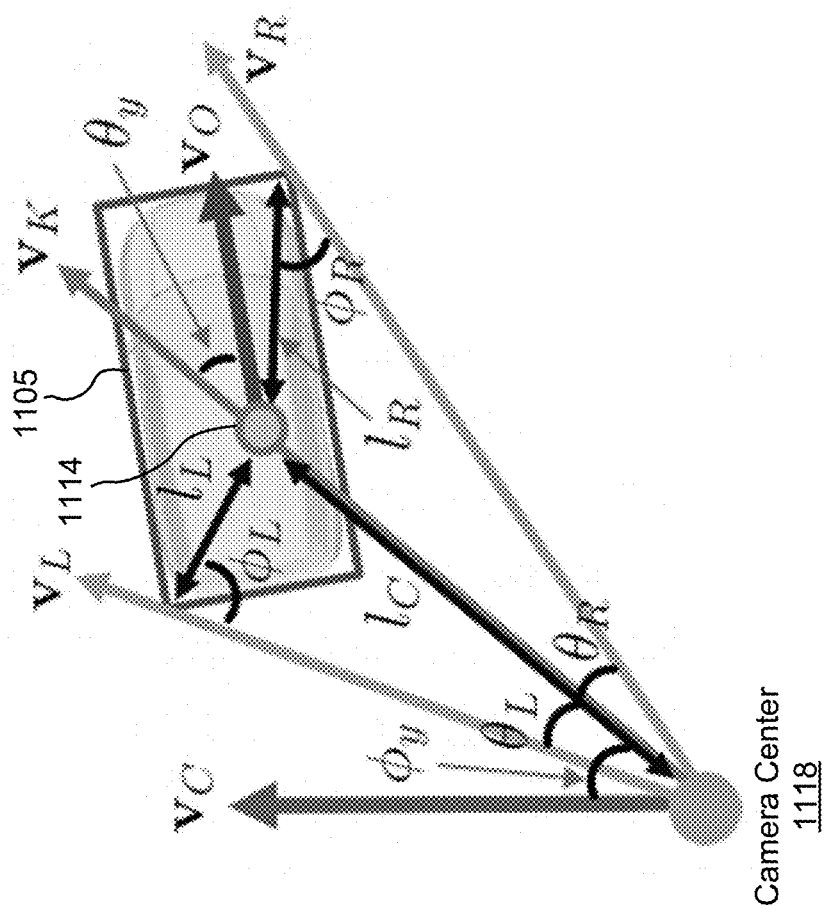

FIG. 11A and FIG. 11B are diagrams illustrating an example of a relationship between a 3D bounding box 1105 of a model obtained for an object detected in an image, a selected sample point 1114, a 2D bounding box generated for the object, the forward direction (represented by 3D directional vector denoted as $V_C$) of the camera used to capture the image, and the forward direction (represented by 3D directional vector denoted as $V_O$) of the object. The 2D bounding box of the object is represented in FIG. 11A by the 3D directional vectors $V_L$ and $V_R$, which are back-projected rays of the left (L) and right (R) sides of the 2D bounding box in a bird-eye view (BEV) of the object. The camera is represented in FIG. 11A by camera center 1118.

The vector determination engine 906 can compute the various 3D directional vectors shown in FIG. 11A. For example, the forward direction (3D directional vector $V_C$) of the camera center 1118 can be determined as follows:

$$V_C = K^{-1}[p_u, p_v, 1]^T \qquad \text{Equation (15)}$$

The back-projection rays (3D directional vectors $V_L$ and $V_R$) of the top-left point and the bottom-right points of the 2DBB shown in FIG. 11A can be determined as follows:

$$V_L = K^{-1}[p_u, p_v, 1]^T \qquad \text{Equation (16)}$$

$$V_R = K^{-1}\hat{x}_{r,b} \qquad \text{Equation (17)}$$

The back-projection ray of the sample point 1114 (shown in FIG. 11A as 3D directional vector $V_K$) can be determined as follows:

$$V_K = K^{-1}\hat{x}_K \qquad \text{Equation (18)}$$

Figure 12A:
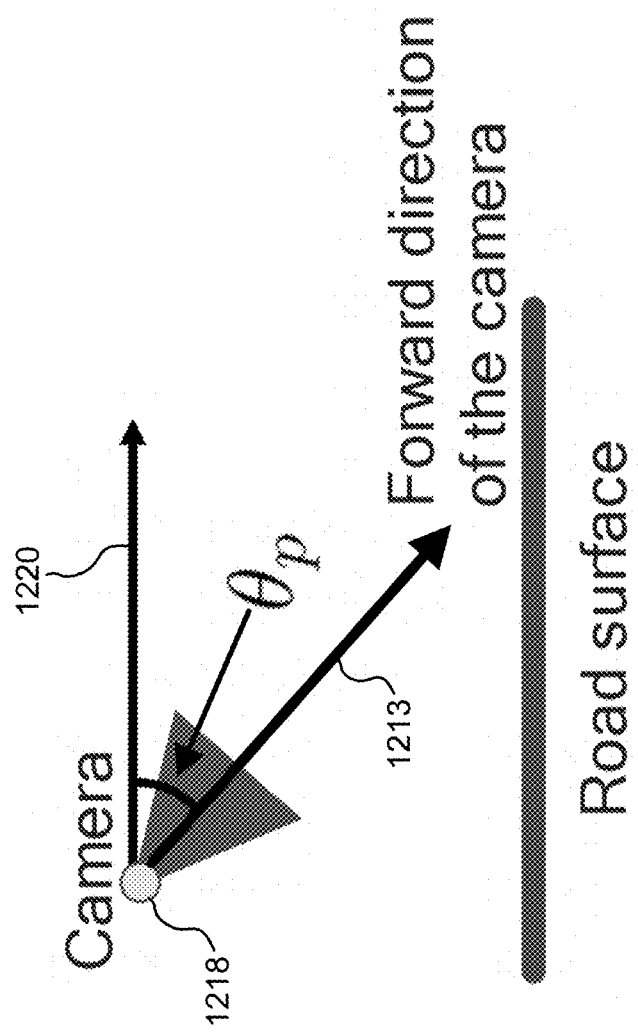
FIG. 12A is a diagram illustrating an example of pitch angle of a camera relative to a ground plane, in accordance with some examples.

To simplify the problem, the vector determination engine 906 can approximate the 3D directional vectors noted above to 2D directional vectors in the BEV corresponding to the top-view. As noted above, the pitch angle $\theta_p$ between the camera and the road surface (or other horizontal reference point or ground plane) is known. FIG. 12A is a diagram illustrating an example showing a pitch angle $\theta_p$ of a camera relative to a road surface acting as a ground plane. The direction of the ground plane is represented by directional vector 1220, and the forward direction of the camera from the camera center 1218 is represented by directional vector 1213. Because the pitch angle $\theta_p$ between the camera and the road surface is known, the vector determination engine 906 can compute a 2D directional vector (denoted generically as $v_i$) as follows:

$$v_i = \begin{bmatrix} V_X \\ V_Z \end{bmatrix}, \text{where} \begin{bmatrix} V_X \\ V_Y \\ V_Z \end{bmatrix} = R_{cg}^{-1} V_i \qquad \text{Equation (19)}$$

The term $R_{cg}$ denotes a rotation matrix from the road surface coordinate system (the ground surface) to the camera coordinate system, which can be determined as follows:

$$R_{cg} = e^{\omega_p} \text{ where } \omega_p = [-\theta_p, 0, 0]^T \in so(3) \qquad \text{Equation (20)}$$

The rotation matrix $R_{cg}$ can be used by the vector determination engine 906 to determine the respective 2D directional vector $v_C$, $v_L$, $v_R$, $v_K$, and $v_O$ for each of the 3D directional vectors $V_C$, $V_L$, $V_R$, $V_K$, and $V_O$ shown in FIG. 11A.

Using the 2D directional vectors, the vector determination engine 906 can compute the angular vectors and the lengths of the angular vectors. For example, the angle $\theta_y$ between the 2D vector $v_C$ representing the forward direction of the camera and the 2D vector $v_K$ representing the back-projection ray of the sample point 1114 can be computed as:

$$\phi_y = \arcsin v_C \cdot v_K \qquad \text{Equation (21)}$$

The angle $\theta_L$ between the 2D vector $v_K$ of the sample point 1114 and the 2D vector $V_L$ representing the back-projection ray of the top-left point of the 2DBB can be computed as:

$$\theta_L = \arccos v_K \cdot v_L \qquad \text{Equation (22)}$$

The angle $\theta_R$ between the 2D vector $v_K$ of the sample point 1114 and the 2D vector $V_R$ representing the back-projection ray of the bottom-right point of the 2DBB can be computed as:

$$\theta_R = \arccos v_K \cdot v_R \qquad \text{Equation (23)}$$

The angles $\phi_y$, $\theta_L$, and $\theta_R$ are shown in FIG. 11A. Other angles shown in FIG. 11B, including the angle $\psi_L$ between the top-left corner of the 3D bounding box 1105 and the 2D vector $v_O$ (the forward direction of the object) and the angle $\psi_R$ between the bottom-right corner of the 3D bounding box 1105 and the 2D vector $v_O$, can be computed by the vector determination engine 906 from the 3D model obtained for the detected object, as illustrated in and described below with respect to FIG. 12B-FIG. 12J. The vector determination engine 906 can also determine the length $l_R$ from the sample point 1114 to the top-left corner of the 3D bounding box 1105 (marked as corner number 4) and the length $l_L$ from the sample point 1114 to the bottom-right corner (marked as corner number 2) of the 3D bounding box 1105 from the 3D model, as illustrated in and described below with respect to FIG. 12B-FIG. 12J.

Figure 12B:
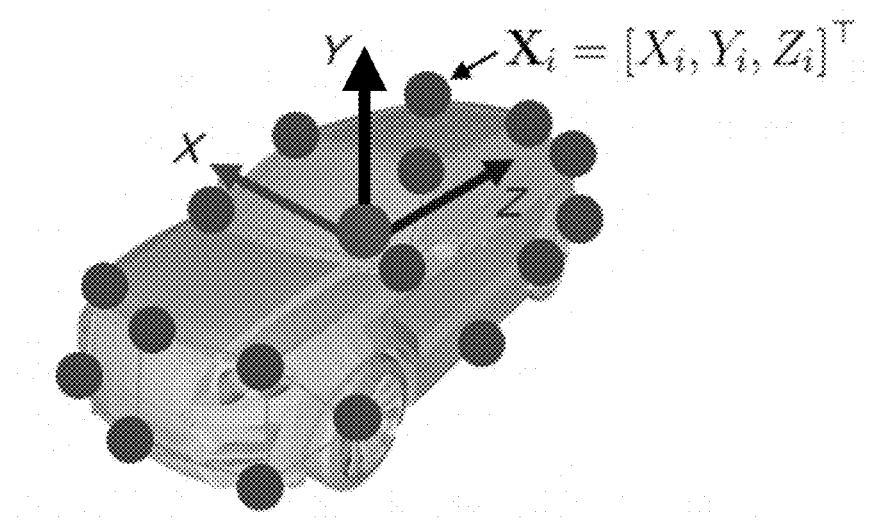
Figure 12C:
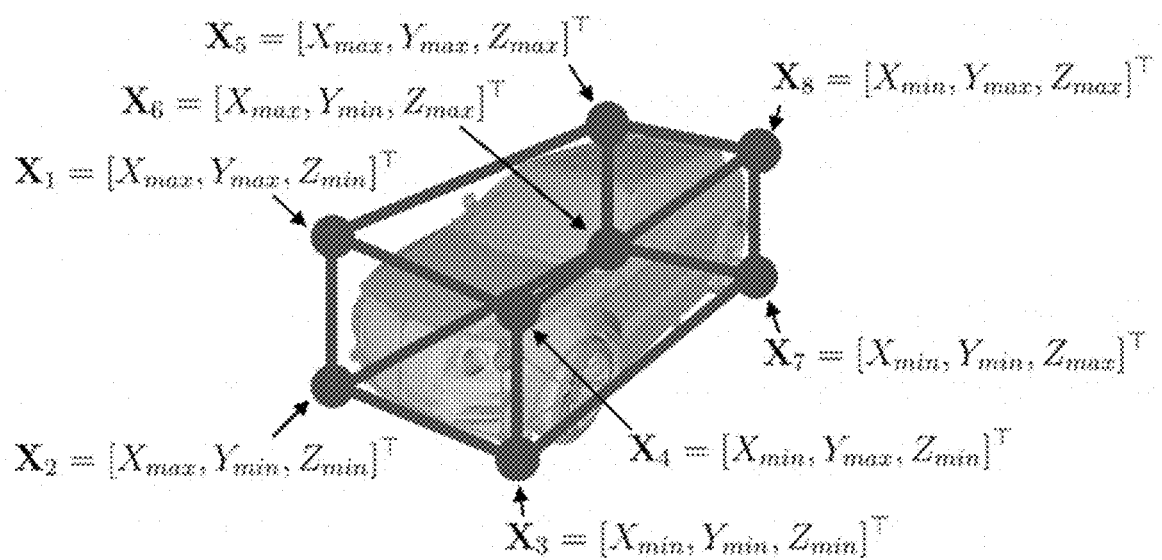

FIG. 12B-FIG. 12J are diagrams illustrating an example of determining various parameters from a 3D model. For example, the diagrams in FIG. 12B and FIG. 12C illustrate 3D bounding box computation. It can be assumed that the 3D model has a set of n sample points (or keypoints) denoted as:

$$X = \{X_1, \ldots, X_n\}$$

One of the sample points is denoted in FIG. 12B as $X_i = [X_i, Y_i, Z_i]^T$. The horizontal axis (x-axis), the vertical axis (y-axis), and the depth axis (z-axis) are also shown in FIG. 12B. The vector determination engine 906 can compute the minimum X, Y, and Z coordinates ($X_{min}$, $Y_{min}$, $Z_{min}$) and the maximum X, Y, and Z coordinates ($X_{max}$, $Y_{max}$, $Z_{max}$) from the X set of n sample points, and can compute the coordinates of the eight corners of the 3DBB using the formulas shown in FIG. 12C.

The vector determination engine 906 can compute the coordinates of the four corners of the 3D bounding box in the top-view (the bird-eye view (BEV) from directly above the object) as shown in FIG. 12D and FIG. 12E. FIG. 12D shows a vehicle (as an object) in the top-view, with the X-axis and Z-axis being shown. The four corners of the 3D bounding box in the top-view are shown in FIG. 12E, including corners $p_1$, $p_2$, $p_3$, and $p_4$. The point $p_1$ is determined as $p_1=[X_{min},Z_{min}]^T$, the point $p_2$ is determined as $p_2=[X_{max}, Z_{min}]^T$, the point $p_3$ is determined as $p_3=[X_{max}, Z_{max}]^T$, and the point $p_4$ is determined as $p_4=[X_{min}, Z_{max}]^T$.

Figure 12F:
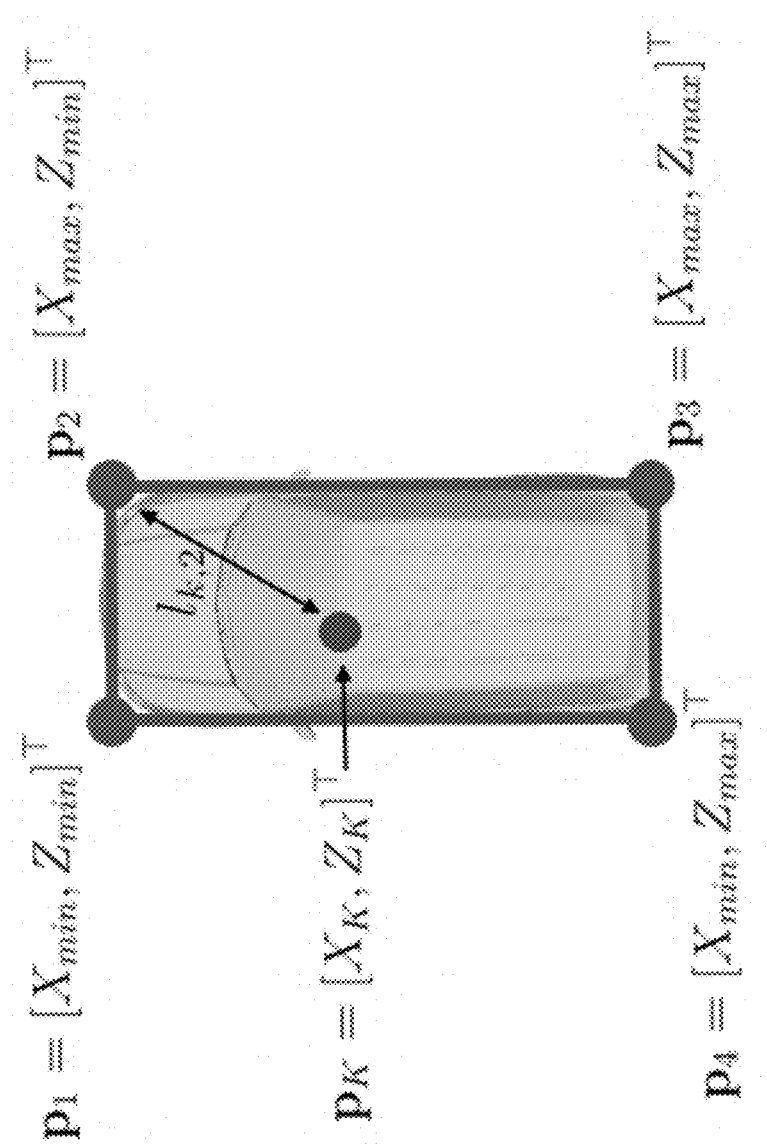
Figures 12G, 12H, 12I, 12J:
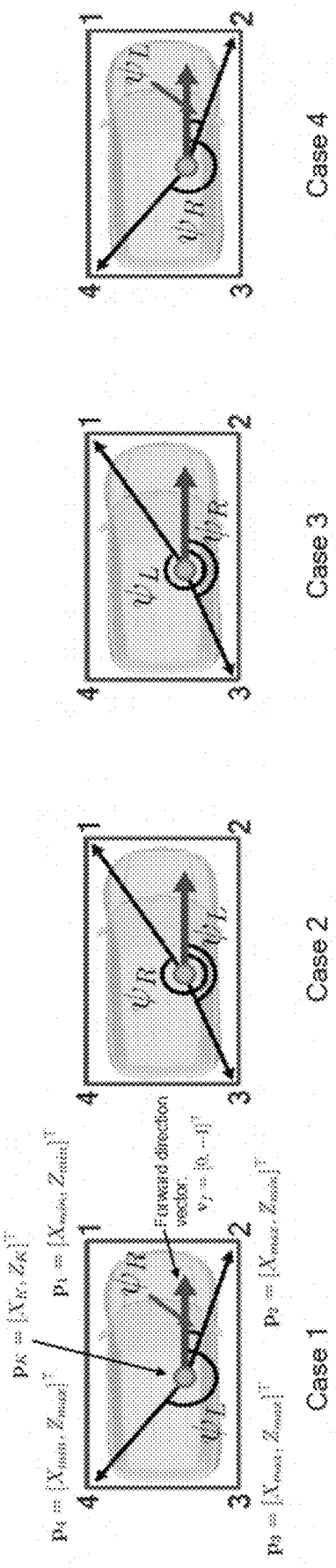

The vector determination engine 906 can also determine the distance from a particular sample point (or keypoint) to each corner in the top-view of the object, as shown in FIG. 12F. In one illustrative example, the vector determination engine 906 can compute the Euclidean distance (or other suitable distance) from a sample point to each corner point in the top-view. An example point is shown in FIG. 12F as $p_K$, defined with X-coordinate $X_K$ and Z-coordinate $Z_K$ ($p_K=[X_K,Z_K]^T$). For instance, the distance from the sample point $p_K$ to the top-right corner (denoted in FIG. 12F as corner number 2) can be computed as follows:

$$l_{k,2} = \|p_K - p_2\| = \sqrt{(X_K - X_{max})^2 + (Z_K - Z_{min})^2} \quad \text{Equation (24)}$$

Figure 13:
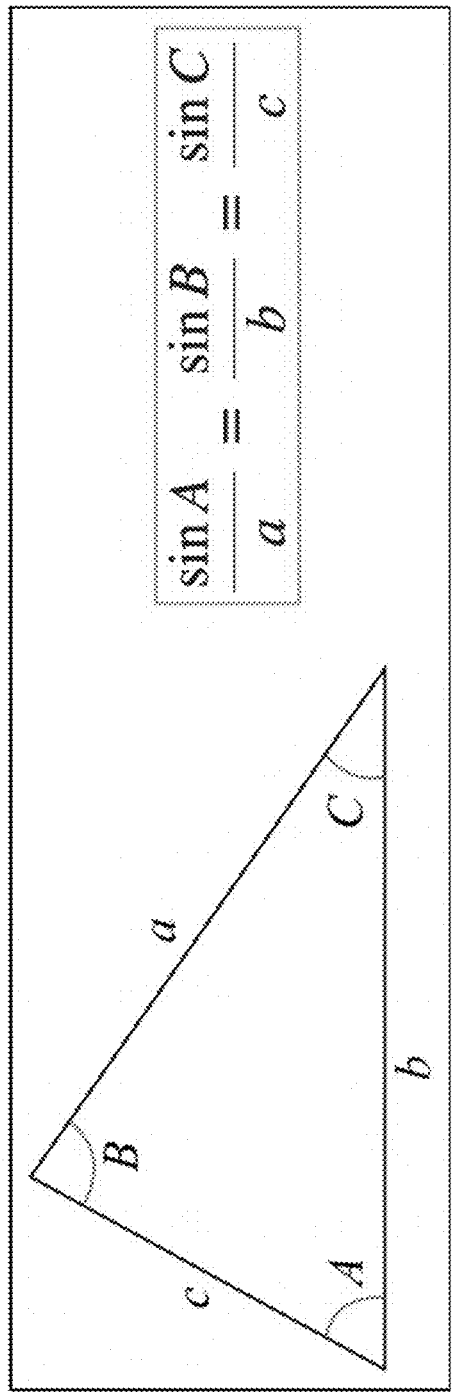
FIG. 13 is a diagram illustrating the Sine rule, in accordance with some examples.

The object orientation and depth determination engine 908 can determine a pose of the object detected in an image using the information determined by the vector determination engine 906. In some cases, the object orientation and depth determination engine 908 can use the Sine rule to derive a formulation or equation that can be used to determine the yaw angle $\theta_y$ and the depth or length (represented in FIG. 11A as $l_C$) from the camera center 1118 to the sample point 1114. FIG. 13 is a diagram illustrating an example of the Sine rule. As shown, the Sine rule requires that:

$$\frac{Sine\ A}{a} = \frac{Sine\ B}{b} = \frac{Sine\ C}{c} \quad \text{Equation (25)}$$

with the angles A, B, and C and the sides of a triangle being shown in FIG. 13. The object orientation and depth determination engine 908 can derive the following from the Sine rule:

$$\frac{l_L}{\sin\theta_L} = \frac{l_C}{\sin\phi_L}, \quad \text{Equation (26)}$$

$$\frac{l_L}{\sin\theta_L} = \frac{l_C}{\sin\phi_L} \rightarrow \frac{l_L \sin\phi_L}{\sin\theta_L} = \frac{l_R \sin\phi_R}{\sin\theta_R},$$

where for the case shown in FIG. 11A and FIG. 11B (denoted as Case 1 below, represented in FIG. 14B), $\phi_R = \theta_y + \psi_R - \theta_R$ and $\theta_L = -\theta_y - \psi_L - \theta_L$. Other cases are described below with respect to FIG. 14C-FIG. 14E. The object orientation and depth determination engine 908 can compute the yaw angle $\theta_y$ and the depth $l_C$ parameters from Equation (26). For example, from Equation (26), the object orientation and depth determination engine 908 can derive the yaw angle $\theta_y$ as:

$$\theta_y = \arctan\left(\frac{t_y}{t_x}\right), \quad \text{Equations (27)}$$

where $$t_y = -\frac{l_R \sin(\psi_R - \theta_R)}{\sin\theta_R} - \frac{l_L \sin(\psi_L + \theta_L)}{\sin\theta_L} \text{ and}$$

-continued $$t_x = \frac{l_R \cos(\psi_R - \theta_R)}{\sin\theta_R} + \frac{l_L \cos(\psi_L + \theta_L)}{\sin\theta_L}.$$

The depth $l_C$ of the sample point 1114 relative to the camera center 1118 can be calculated by the object orientation and depth determination engine 908 using Equation (26) as:

$$l_C = \frac{l_R \sin\phi_R}{\sin\theta_R}, \text{ or} \quad \text{Equations (28)}$$

$$l_C = \frac{l_L \sin\phi_L}{\sin\theta_L}.$$

Using the yaw angle $\theta_y$ and the depth $l_C$ determined by the object orientation and depth determination engine 908, the pose determination engine 910 can compute a pose parameter that defines a 3D rotational vector (including an angle for pitch representing the camera's vertical rotation relative to the ground plane, an angle for roll representing the camera's side-to-side rotation relative to the horizon, and an angle for yaw representing the camera's horizontal rotation relative to the ground plane) and a 3D translational vector (including translation in the horizontal (x) direction, vertical (y) direction, and depth (z) direction)). The pose parameter is defined by a transformation matrix $T_{co}$ mapping from the object coordinates to the camera coordinates.

For example, the pose determination engine 910 can determine a transformation matrix $T_{co}$ defining a pose parameter using $\theta_y$ and $l_C$ as follows:

$$T_{co} = \begin{bmatrix} R_{cg} & O_3 \\ O_3^T & 1 \end{bmatrix} \begin{bmatrix} e^{\omega_y} & l_C d_x \\ O_3^T & 1 \end{bmatrix} \begin{bmatrix} I_3 & -X \\ O_3^T & 1 \end{bmatrix}, \quad \text{Equation (29)}$$

where $e^{\omega_y}$ is a rotation matrix for the angular vector $\omega_y$, (where $\omega_y = [0, \phi_y + \theta_y, 0]^T$, with $\phi_y + \theta_y$ being the sum of the local and global yaw angles, respectively), X is a 3D location of the selected 2D sample point (or keypoint) in the object coordinate system (of the 3D model), and $d_x$ is a normalized directional vector that the 2D sample point on the image is back-projected. The directional vector $d_x$ is derived by back-projecting the sample point x to a 3D ray, and can be computed as follows:

$$d_x = \frac{K^{-1}\hat{x}}{\sqrt{\hat{x}^T K^{-T} S K^{-1} \hat{x}}}, \quad \text{Equation (30)}$$

where $$S = \begin{bmatrix} 1 & 0 & 0 \\ 0 & 0 & 0 \\ 0 & 0 & 1 \end{bmatrix} \quad \text{Equation (31)}$$

in Equation (30), the term K is a camera intrinsic matrix and $\hat{x}$ is the homogeneous coordinate of x.

As noted above, there are other cases of the 1-point object pose estimation, depending on the forward direction (and thus the yaw angle $\theta_y$) of the object. FIG. 14A-FIG. 14E illustrate the various cases with a sample point (or keypoint) 1414 being shown in FIG. 14B-FIG. 14E. In FIG. 14A, the forward direction of the object (represented by 2D directional vector $v_O$) and the 3D bounding box 1405 in the birds-eye view (BEV) are shown. The four corners of the 3D bounding box 1405 are denoted with number 1 for the top-left corner, number 2 for the top-right corner, number 3 for the bottom-right corner, and number 4 for the bottom-left corner. As used here, the terms top-left, top-right, bottom-right, and bottom-left are relative to the forward direction of the object (as indicated by $v_O$).

In FIG. 14B, the 2D bounding box 1425 of the object and the 3D bounding box 1431 (shown as a projection of the 3D bounding box to an image) are shown. Similarly, the 2D bounding box 1426 of the object and the 3D bounding box 1432, the 2D bounding box 1427 of the object and the 3D bounding box 1433, and the 2D bounding box 1428 of the object and the 3D bounding box 1434 are shown in FIG. 14C, FIG. 14D, and FIG. 14E, respectively. The different $\psi_R$ and $\psi_L$ parameters for each case in the 3D model coordinate system are also shown in FIG. 14B-FIG. 14E.

As shown in FIG. 14B-FIG. 14E, the left and right edges of the 2D bounding box are adjacent to two of the corners of the respective 3D bounding box, depending on the yaw angle $\theta_y$ of the object. For example, in Case 1 shown in FIG. 14B, the left and right edges of the 2D bounding box 1425 are paired with corner 4 and corner 2 of the 3D bounding box 1431, respectively. In Case 2 shown in FIG. 14C, the left and right edges of the 2D bounding box 1426 are paired with corner 1 and corner 3 of the 3D bounding box 1432, respectively. In Case 3 shown in FIG. 14D, the left and right edges of the 2D bounding box 1427 are paired with corner 2 and corner 4 of the 3D bounding box 1433, respectively. In Case 4 shown in FIG. 14E, the left and right edges of the 2D bounding box 1428 are paired with corner 3 and corner 1 of the 3D bounding box 1434, respectively. Using the relationship of the edges of the 2D bounding box with the corners of the respective 3D bounding box, the four cases for the 1-point pose estimation can be identified.

As noted above, with reference to FIG. 11A, the directional vector $V_K$ is the vector from the camera center 1118 to the sample point 1114, and directional vectors $v_L$ and $v_R$ are the back-projected rays of the left and right edges of the 2D bounding box. It is assumed that the side edges of the 2D bounding box 1105 are back-projected to the planes perpendicular to the ground, and thus that the projections of the planes into the ground become the rays passing through the camera center 1118 and the corners of the corresponding 3D bounding box. Again referring to FIG. 11A, the directional vector $v_O$ is the forward direction of the object, the directional vector $v_C$ is the forward direction of the camera, and the angles $\theta_y$, $\theta_L$, and $\theta_R$ are the angles between $v_C$ and $V_K$, $V_K$ and $V_L$, and $V_K$ and $V_R$, respectively. The length $l_C$ is the length between the camera center 1118 point and the sample point 1114, the lengths $l_L$ and $l_R$ are the lengths between the sample point 1114 and the corners of the 3D bounding box 1105, and the angles $\phi_L$ and $\phi_R$ are the angles between $\psi_L$ and $\psi_L$, and $\psi_R$ and $\psi_R$, respectively. As shown in FIG. 11B and in FIG. 14B-FIG. 14E, the angles $\psi_L$ and $\psi_R$ are the angles between the forward direction of the object and the corners of the 3D bounding box. As described above, the system 900 can compute a local yaw angle $\theta_y$ of the object (the angle between $V_K$ and $v_O$), and the depth $l_C$ from the camera center 1118 to the sample point 1114.

The pose determination engine 910 can determine the parameters for the four solutions shown in FIG. 14B-FIG. 14E from one sample point, and can select a unique solution by considering a range of the angles shown in Table 1 below. The poses $T_{co}$ in the other cases can be computed (e.g., using Equation (29)) in a similar way as that described above for Case 1, with a difference for each case being that definitions of $\psi_L$ and $\psi_R$ are different as shown in FIG. 14C, FIG. 14D, and FIG. 14E. The four pose solutions for the four cases (Case 1 in FIG. 14B, Case 2 in FIG. 14C, Case 3 in FIG. 14D, and Case 4 in FIG. 14E) can be determined based on the sign inside of the arctangent function of Equation (27).

As shown in Table 1 below, the ranges of $\theta_y$, $\psi_L$, and $\psi_R$ can be considered for each of the Cases 1-4, and unreliable solutions can be filtered out to obtain a unique solution from the one sample point.

TABLE 1

| Range of angle parameters for the four cases 1-4 | | | | |
|---|---|---|---|---|
| Parameter | Case 1 | Case 2 | Case 3 | Case 4 |
| $\theta_y$ | $[0, \frac{\pi}{2}]$ | $[\frac{\pi}{2}, \pi]$ | $[-\frac{\pi}{2}, 0]$ | $[-\pi, -\frac{\pi}{2}]$ |
| $\psi_L$ | $[-\pi, -\frac{\pi}{2}]$ | $[\frac{\pi}{2}, \pi]$ | $[-\frac{\pi}{2}, 0]$ | $[0, \frac{\pi}{2}]$ |
| $\psi_R$ | $[0, \frac{\pi}{2}]$ | $[-\frac{\pi}{2}, 0]$ | $[\frac{\pi}{2}, \pi]$ | $[-\pi, -\frac{\pi}{2}]$ |

Based on the ranges shown in Table 1 as an illustrative example, if one or more of the angles $\theta_y$, $\psi_L$, and/or $\psi_R$ is outside of the specified range, the solution for that given case can be removed from consideration in determining the final pose for the object detected in the image.

Figure 15A:
FIG. 15A-FIG. 15D are images illustrating examples of keypoint-based vehicle pose estimation, in accordance with some examples.
Figure 15B:
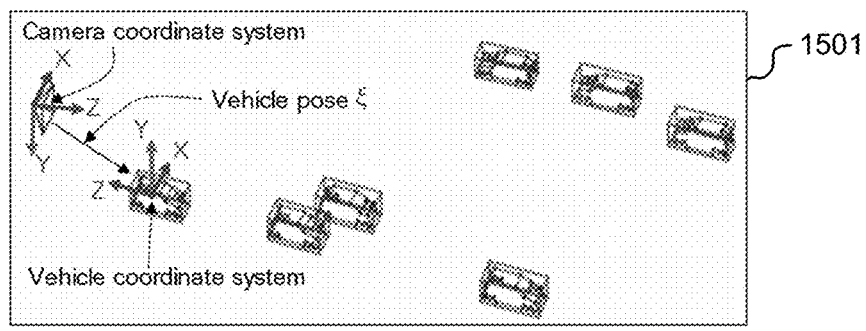
Figure 15C:
Figure 15D:
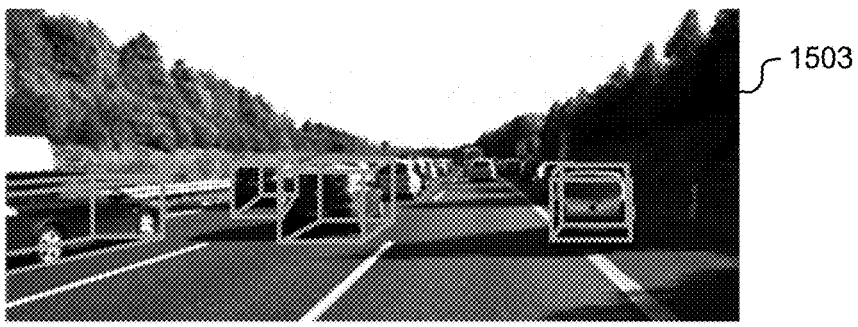

FIG. 15A-FIG. 15D are images illustrating an example of a keypoint-based vehicle pose estimation. 2D sample points (or keypoints) are shown in the image 1500 of FIG. 15A. In FIG. 15B, the locations of 3D bounding boxes and 3D sample points (or keypoints) in the camera coordinate system are shown in the image 1501. As shown in the image 1502 of FIG. 15C, mesh objects are drawn over the image using the 2D sample points and vertex identification (ID) pairs. The image 1503 of FIG. 15D illustrates 3D bounding boxes around the various vehicles.

FIG. 16A-FIG. 16D are images illustrating an example of results of keypoint-based vehicle pose estimation using an image from a front-facing camera of a tracking vehicle tracking various target vehicles (as target objects). 2D bounding boxes are shown in the image 1600 of FIG. 16A, and 2D sample points (keypoint) detection is shown in the image 1601 of FIG. 16B. In FIG. 16C, 3D bounding boxes computed from aligned 3D computer-aided design (CAD) models are shown in the image 1602. In the image 1603 of FIG. 16D, triangle meshes of aligned 3D CAD models are shown. FIG. 16E is a diagram illustrating the horizontal (X) and depth (Z) positions of the vehicle objects shown in the images 1600, 1601, 1602, and 1603 relative to the tracking vehicle (in meters) at a given point in time.

Figure 17A:
FIG. 17A-FIG. 17D are images and FIG. 17E is a diagram illustrating an example of results of keypoint-based vehicle pose estimation using an image from a rear-facing camera of a vehicle, in accordance with some examples.
Figure 17B:
Figure 17C:
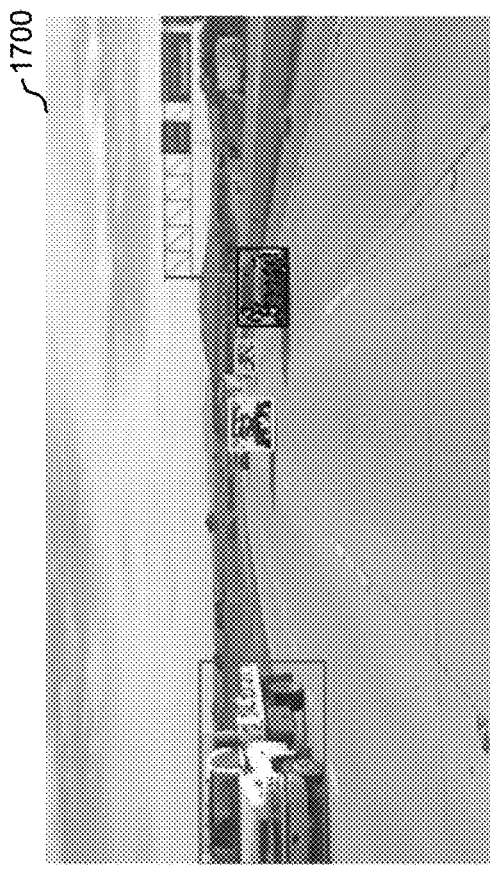
Figure 17D:
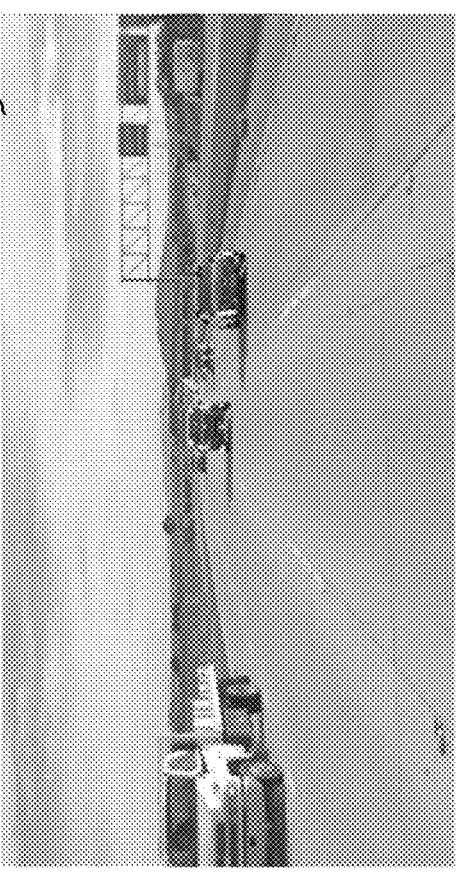
Figure 17E:
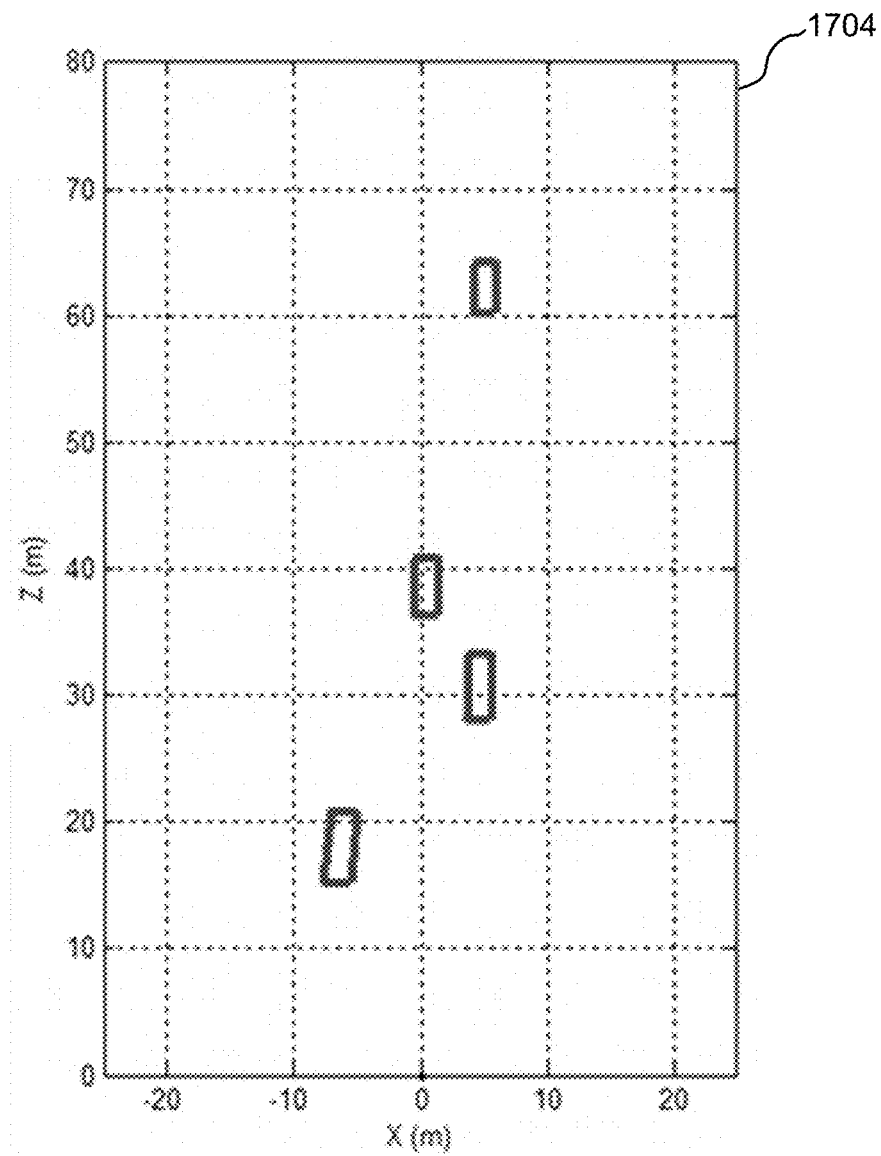

FIG. 17A-FIG. 17D are images illustrating an example of results of keypoint-based vehicle pose estimation using an image from a rear-facing camera of a tracking vehicle tracking various target vehicles. In FIG. 17A, 2D bounding boxes are shown in the image 1700. In FIG. 17B, detected 2D sample points (keypoints) are shown in the image 1701. In FIG. 17C, 3D bounding boxes computed from aligned 3D CAD models are shown in the image 1702. In the image 1703 of FIG. 17D, triangle meshes of aligned 3D CAD models are shown. FIG. 17E is a diagram 1704 illustrating the horizontal (X) and depth (Z) positions of the vehicle objects shown in the images 1700, 1701, 1702, and 1703 relative to the tracking vehicle (in meters) at a given point in time.

As described above with respect to the object detection engine 902, various models using neural network-based detectors can be used to detect objects in images. Illustrative examples of neural networks that can be used by object detectors include convolutional neural networks (CNNs), autoencoders, deep belief nets (DBNs), Recurrent Neural Networks (RNNs), Generative Adversarial Networks (GANs), or any other suitable neural network.

Figure 18:
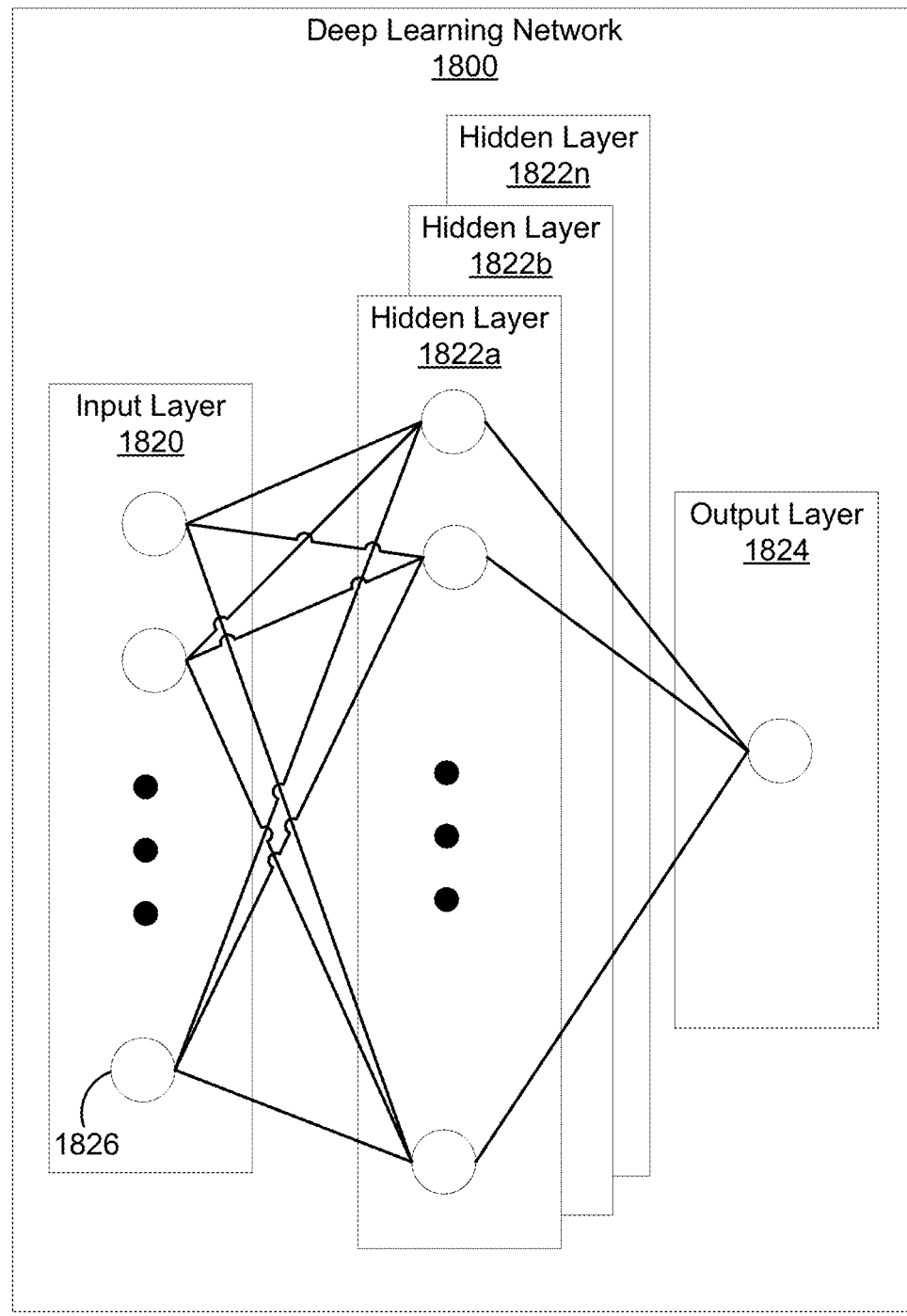
FIG. 18 is a block diagram illustrating an example of a deep learning network, in accordance with some examples.

FIG. 18 is an illustrative example of a deep learning neural network 1800 that can be used by the object detection engine 902. An input layer 1820 includes input data. In one illustrative example, the input layer 1820 can include data representing the pixels of an input video frame. The neural network 1800 includes multiple hidden layers 1822a, 1822b, through 1822n. The hidden layers 1822a, 1822b, through 1822n include "n" number of hidden layers, where "n" is an integer greater than or equal to one. The number of hidden layers can be made to include as many layers as needed for the given application. The neural network 1800 further includes an output layer 1824 that provides an output resulting from the processing performed by the hidden layers 1822a, 1822b, through 1822n. In one illustrative example, the output layer 1824 can provide a classification for an object in an input video frame. The classification can include a class identifying the type of object (e.g., a person, a dog, a cat, or other object).

The neural network 1800 is a multi-layer neural network of interconnected nodes. Each node can represent a piece of information. Information associated with the nodes is shared among the different layers and each layer retains information as information is processed. In some cases, the neural network 1800 can include a feed-forward network, in which case there are no feedback connections where outputs of the network are fed back into itself. In some cases, the neural network 1800 can include a recurrent neural network, which can have loops that allow information to be carried across nodes while reading in input.

Information can be exchanged between nodes through node-to-node interconnections between the various layers. Nodes of the input layer 1820 can activate a set of nodes in the first hidden layer 1822a. For example, as shown, each of the input nodes of the input layer 1820 is connected to each of the nodes of the first hidden layer 1822a. The nodes of the hidden layers 1822a, 1822b, through 1822n can transform the information of each input node by applying activation functions to these information. The information derived from the transformation can then be passed to and can activate the nodes of the next hidden layer 1822b, which can perform their own designated functions. Example functions include convolutional, up-sampling, data transformation, and/or any other suitable functions. The output of the hidden layer 1822b can then activate nodes of the next hidden layer, and so on. The output of the last hidden layer 1822n can activate one or more nodes of the output layer 1824, at which an output is provided. In some cases, while nodes (e.g., node 1826) in the neural network 1800 are shown as having multiple output lines, a node has a single output and all lines shown as being output from a node represent the same output value.

In some cases, each node or interconnection between nodes can have a weight that is a set of parameters derived from the training of the neural network 1800. Once the neural network 1800 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1800 to be adaptive to inputs and able to learn as more and more data is processed.

The neural network 1800 is pre-trained to process the features from the data in the input layer 1820 using the different hidden layers 1822a, 1822b, through 1822n in order to provide the output through the output layer 1824. In an example in which the neural network 1800 is used to identify objects in images, the neural network 1800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1800 is trained well enough so that the weights of the layers are accurately tuned.

For the example of identifying objects in images, the forward pass can include passing a training image through the neural network 1800. The weights are initially randomized before the neural network 1800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target} - \text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 1800 can include any suitable deep network. One example includes a convolutional neural network (CNN), which includes an input layer and an output layer, with multiple hidden layers between the input and out layers. An example of a CNN is described below with respect to FIG. 14. The hidden layers of a CNN include a series of convolutional, nonlinear, pooling (for downsampling), and fully connected layers. The neural network 1800 can include any other deep network other than a CNN, such as an autoencoder, a deep belief nets (DBNs), a Recurrent Neural Networks (RNNs), among others.

Figure 19:
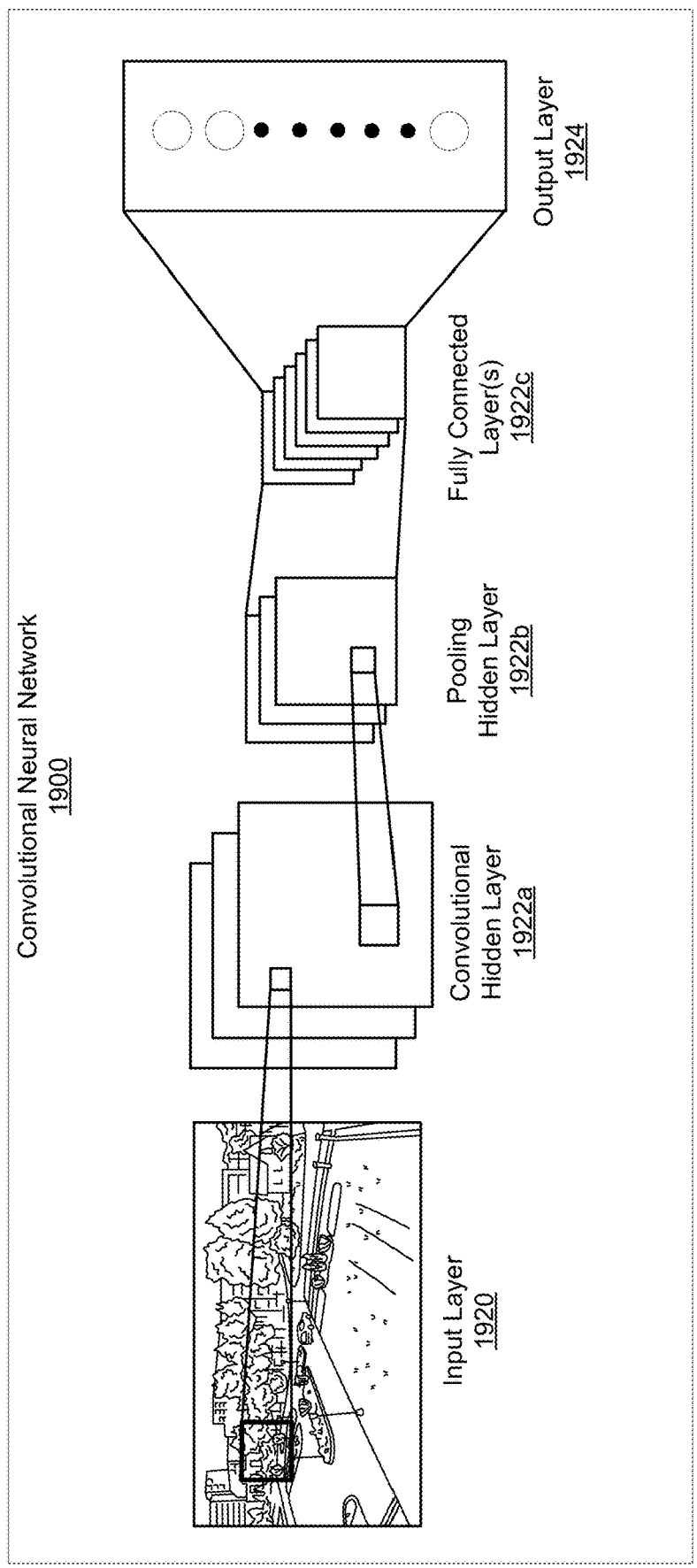
FIG. 19 is a block diagram illustrating an example of a convolutional neural network, in accordance with some examples.

FIG. 19 is an illustrative example of a convolutional neural network 1900 (CNN 1900). The input layer 1920 of the CNN 1900 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1922a, an optional non-linear activation layer, a pooling hidden layer 1922b, and fully connected hidden layers 1922c to get an output at the output layer 1924. While only one of each hidden layer is shown in FIG. 19, one of ordinary skill will appreciate that multiple convolutional hidden layers, non-linear layers, pooling hidden layers, and/or fully connected layers can be included in the CNN 1900. As previously described, the output can indicate a single class of an object or can include a probability of classes that best describe the object in the image.

The first layer of the CNN 1900 is the convolutional hidden layer 1922a. The convolutional hidden layer 1922a analyzes the image data of the input layer 1920. Each node of the convolutional hidden layer 1922a is connected to a region of nodes (pixels) of the input image called a receptive field. The convolutional hidden layer 1922a can be considered as one or more filters (each filter corresponding to a different activation or feature map), with each convolutional iteration of a filter being a node or neuron of the convolutional hidden layer 1922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1922a. Each connection between a node and a receptive field for that node learns a weight and, in some cases, an overall bias such that each node learns to analyze its particular local receptive field in the input image. Each node of the hidden layer 1922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1922a is due to each node of the convolutional layer being applied to its corresponding receptive field. For example, a filter of the convolutional hidden layer 1922a can begin in the top-left corner of the input image array and can convolve around the input image. As noted above, each convolutional iteration of the filter can be considered a node or neuron of the convolutional hidden layer 1922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1922a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1922a.

The mapping from the input layer to the convolutional hidden layer 1922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1922a can include several activation maps in order to identify multiple features in an image. The example shown in FIG. 19 includes three activation maps. Using three activation maps, the convolutional hidden layer 1922a can detect three different kinds of features, with each feature being detectable across the entire image.

In some examples, a non-linear hidden layer can be applied after the convolutional hidden layer 1922a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1900 without affecting the receptive fields of the convolutional hidden layer 1922a.

The pooling hidden layer 1922b can be applied after the convolutional hidden layer 1922a (and after the non-linear hidden layer when used). The pooling hidden layer 1922b is used to simplify the information in the output from the convolutional hidden layer 1922a. For example, the pooling hidden layer 1922b can take each activation map output from the convolutional hidden layer 1922a and generates a condensed activation map (or feature map) using a pooling function. Max-pooling is one example of a function performed by a pooling hidden layer. Other forms of pooling functions be used by the pooling hidden layer 1922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1922a. In the example shown in FIG. 19, three pooling filters are used for the three activation maps in the convolutional hidden layer 1922a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1922a having a dimension of 24×24 nodes, the output from the pooling hidden layer 1922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1900.

The final layer of connections in the network is a fully-connected layer that connects every node from the pooling hidden layer 1922b to every one of the output nodes in the output layer 1924. Using the example above, the input layer includes 28×28 nodes encoding the pixel intensities of the input image, the convolutional hidden layer 1922a includes 3×24×24 hidden feature nodes based on application of a 5×5 local receptive field (for the filters) to three activation maps, and the pooling layer 1922b includes a layer of 3×12×12 hidden feature nodes based on application of max-pooling filter to 2×2 regions across each of the three feature maps. Extending this example, the output layer 1924 can include ten output nodes. In such an example, every node of the 3×12×12 pooling hidden layer 1922b is connected to every node of the output layer 1924.

The fully connected layer 1922c can obtain the output of the previous pooling layer 1922b (which should represent the activation maps of high-level features) and determines the features that most correlate to a particular class. For example, the fully connected layer 1922c layer can determine the high-level features that most strongly correlate to a particular class, and can include weights (nodes) for the high-level features. A product can be computed between the weights of the fully connected layer 1922c and the pooling hidden layer 1922b to obtain probabilities for the different classes. For example, if the CNN 1900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1924 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 20:
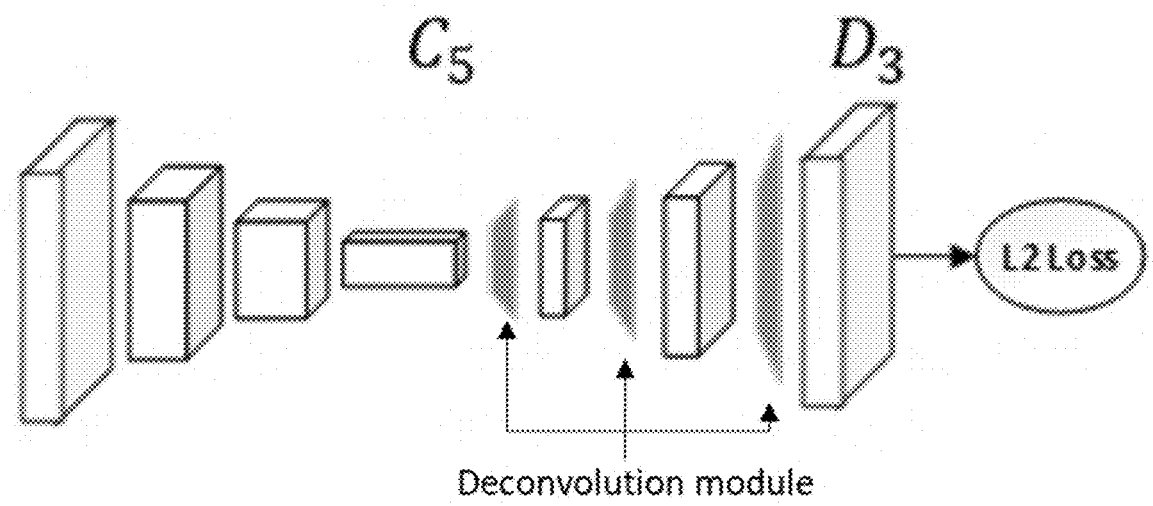
FIG. 20 is a diagram illustrating an example of a neural network used for keypoint detection, in accordance with some examples.

FIG. 20 is a diagram illustrating a specific example of a neural network based keypoint detector that can be used by the object detection engine 902. The ResNet neural network is used as a backbone network, and deconvolutional layers over the last convolution stage (called C5) in the ResNet are added. The deconvolutional model includes three deconvolutional layers with batch normalization, ReLU, and 256 filters. A 1×1 convolutional layer is also added to generate predicted heatmaps {$H_1, \ldots, H_k$} for all k sample points (or keypoints), resulting in k heatmaps for k sample points.

Figure 21:
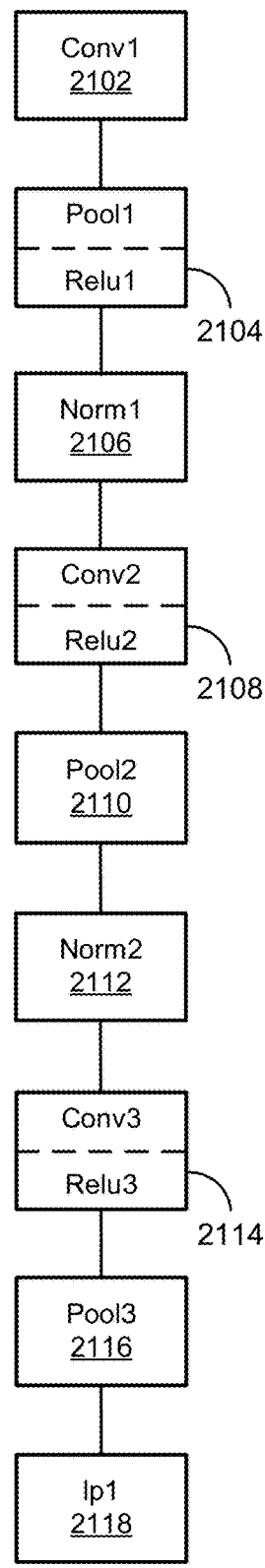
FIG. 21 is a diagram illustrating an example of the Cifar-10 neural network, in accordance with some examples.

Another example of a neural network based detector that can be used by the object detection engine 902 is a Cifar-10 neural network based detector. FIG. 21 is a diagram illustrating an example of the Cifar-10 neural network 2100. In some cases, the Cifar-10 neural network can be trained to classify persons and cars only. As shown, the Cifar-10 neural network 2100 includes various convolutional layers (Conv1 layer 2102, Conv2/Relu2 layer 2108, and Conv3/Relu3 layer 2114), numerous pooling layers (Pool1/Relu1 layer 2104, Pool2 layer 2110, and Pool3 layer 2116), and rectified linear unit layers mixed therein. Normalization layers Norm1 2106 and Norm2 2112 are also provided. A final layer is the ip1 layer 2118.

Figure 22A:
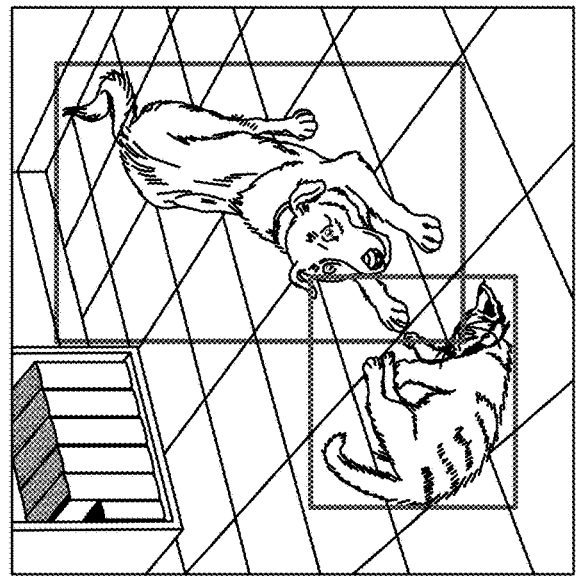
FIG. 22A-FIG. 22C are diagrams illustrating an example of a single-shot object detector, in accordance with some examples.
Figure 22B:
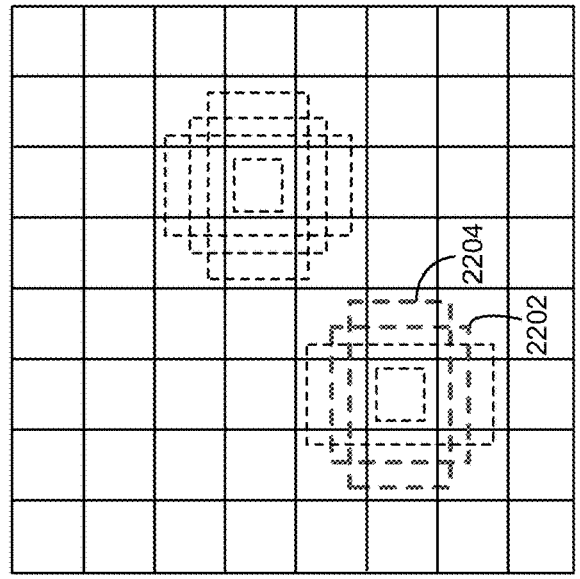
Figure 22C:
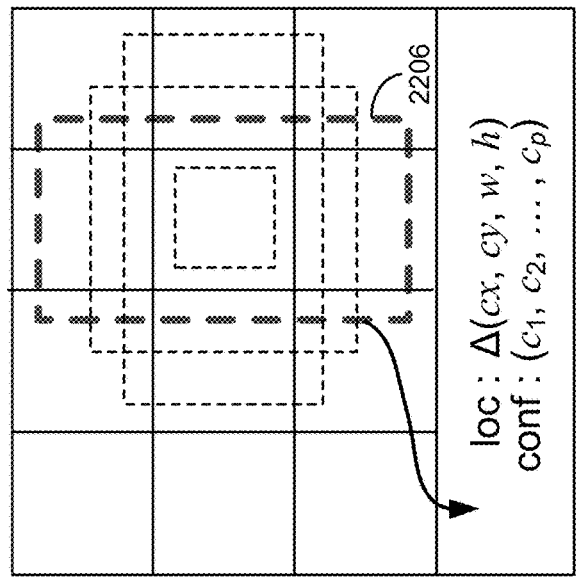

Another deep learning-based detector that can be used by the object detection engine 902 to detect or classify objects in images includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 22A includes an image and FIG. 22B and FIG. 22C include diagrams illustrating how an SSD detector (with the VGG deep network base model) operates. For example, SSD matches objects with default boxes of different aspect ratios (shown as dashed rectangles in FIG. 22B and FIG. 22C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (the box 2202 and the box 2204 in FIG. 22B) are matched with the cat, and one of the 4×4 boxes (box 2206 in FIG. 22C) is matched with the dog. SSD has multiple features maps, with each feature map being responsible for a different scale of objects, allowing it to identify objects across a large range of scales. For example, the boxes in the 8×8 feature map of FIG. 22B are smaller than the boxes in the 4×4 feature map of FIG. 22C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 22A, all probability labels would indicate the background class with the exception of the three matched boxes (two for the cat, one for the dog).

Figure 23A:
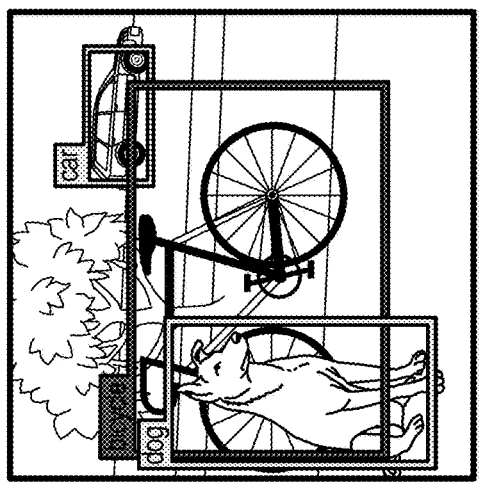
FIG. 23A-FIG. 23C are diagrams illustrating an example of a You Only Look Once (YOLO) detector, in accordance with some examples.
Figure 23B:
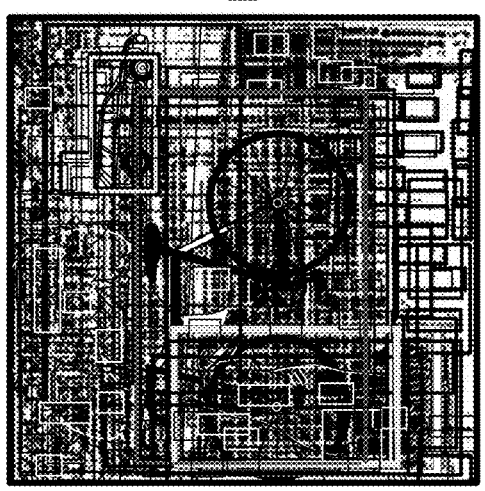

Another deep learning-based detector that can be used by the object detection engine 902 to detect or classify objects in images includes the You only look once (YOLO) detector, which is an alternative to the SSD object detection system. FIG. 23A includes an image and FIG. 23B and FIG. 23C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 23A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 23B. The boxes with higher confidence scores have thicker borders.

Figure 23C:
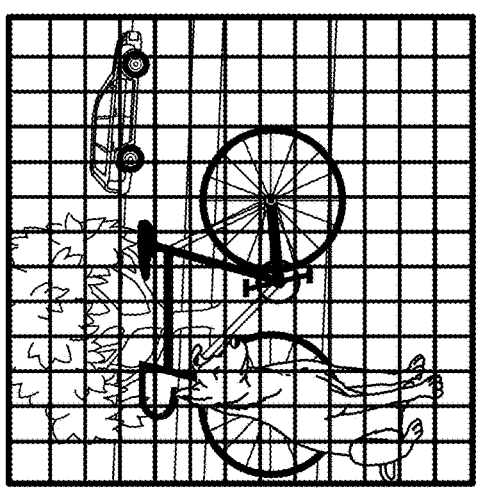

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 23B is 85% sure it contains the object class "dog." There are 169 grid cells (13×13) and each cell predicts 5 bounding boxes, resulting in 845 bounding boxes in total. Many of the bounding boxes will have very low scores, in which case only the boxes with a final score above a threshold (e.g., above a 30% probability, 40% probability, 50% probability, or other suitable threshold) are kept. FIG. 23C shows an image with the final predicted bounding boxes and classes, including a dog, a bicycle, and a car. As shown, from the 845 total bounding boxes that were generated, only the three bounding boxes shown in FIG. 23C were kept because they had the best final scores.

Figure 24A:
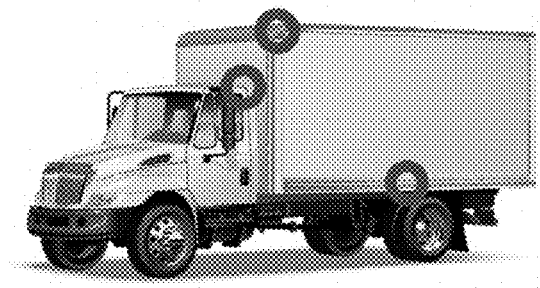
FIG. 24A-FIG. 24E are diagrams illustrating examples of appearance properties of various objects used for defining keypoints, in accordance with some examples.
Figure 24B:
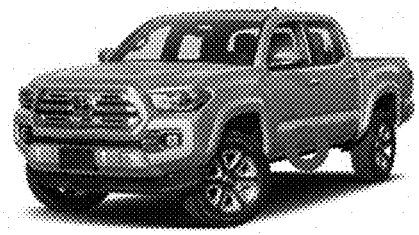
Figure 24C:
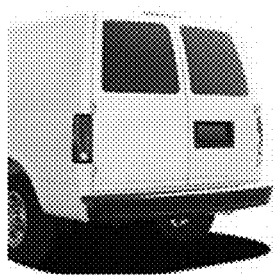
Figure 24D:
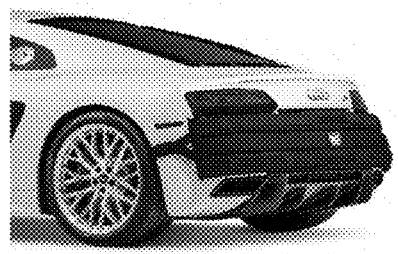
Figure 24E:
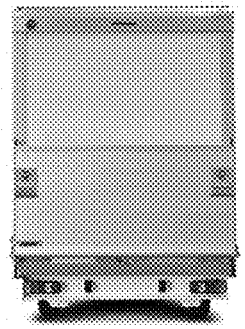

FIG. 24A-FIG. 24E are diagrams illustrating examples of appearance properties of various objects used for defining keypoints. For sample point/keypoint localization, shape and position can be more important than texture. In some cases, keypoint training of a neural network or other model does not depend on the object scale. The appearance properties shown in FIG. 24A-FIG. 24E can be considered for defining keypoint. FIG. 24A is an image of a truck with three keypoints identified at various locations on the truck. FIG. 24B is an image of another truck with a single keypoint identified on the bottom-edge of the truck, FIG. 24C is an image of the rear shape of a van. FIG. 24D is an image of the rear shape of a car, and FIG. 24E is an image of the rear shape of a large truck. As can be seen from FIG. 24C, FIG. 24D, and FIG. 24E, different vehicles can have largely differing features, which can be used to determine the pose of the vehicles using the techniques described herein.

Figure 25A:
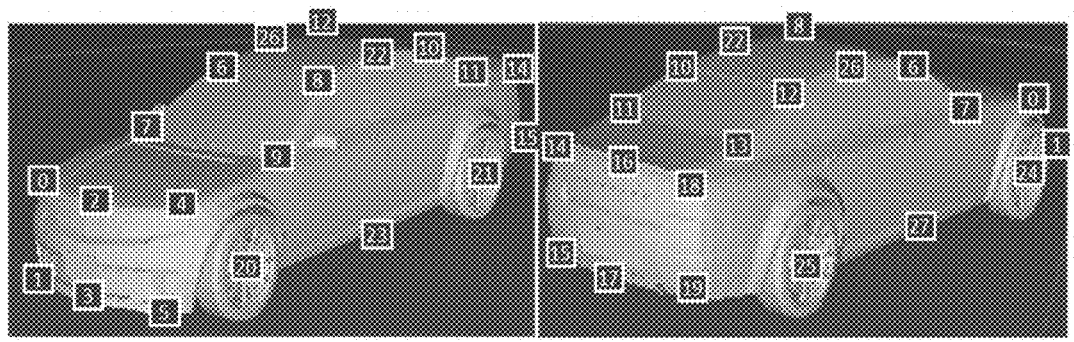
FIG. 25A-FIG. 25D are diagrams illustrating examples of keypoints defined for various objects, in accordance with some examples.
Figure 25B:
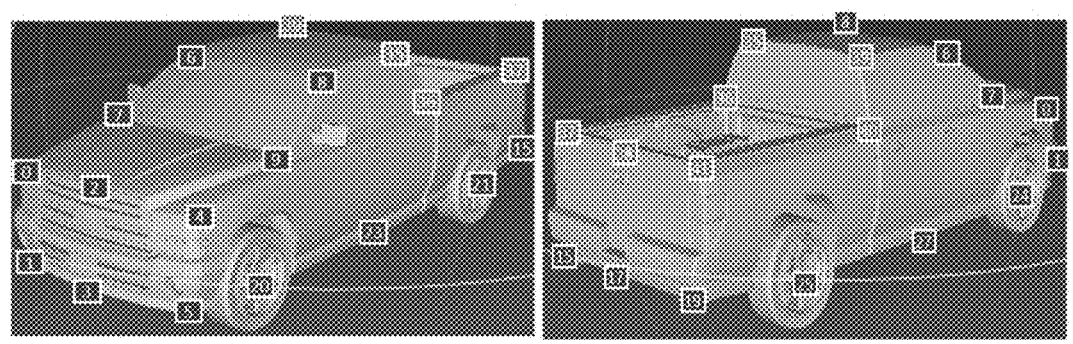
Figure 25C:
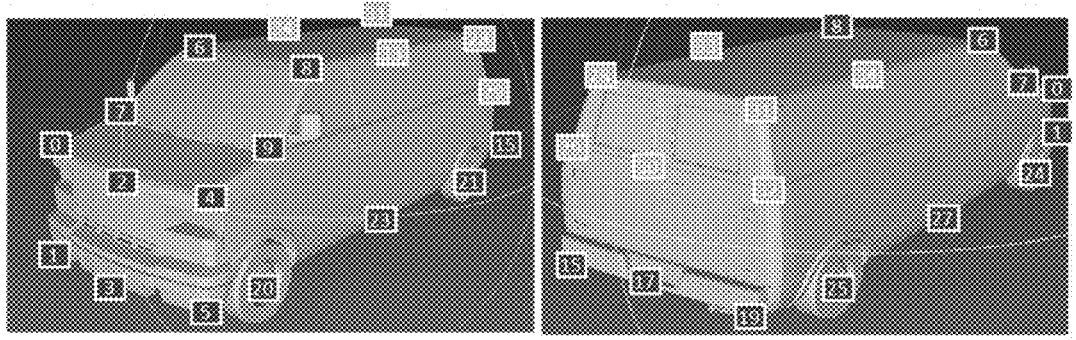
Figure 25D:
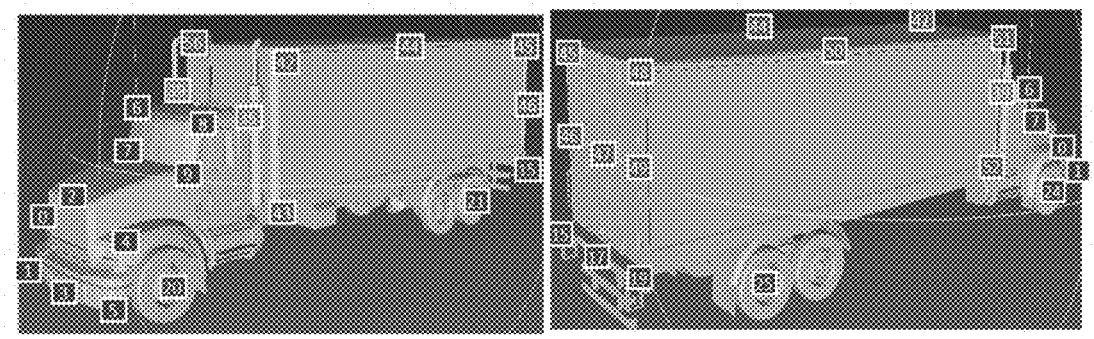

For keypoint/sample point and class definition, 53 keypoints for 4 super classes are empirically defined. Some keypoints are unique for each of the classes and some keypoints are partially shared with each other. To cover more challenging vehicle shapes, a car can be assigned 28 keypoints, a van-bus can be assigned 26 keypoints, a pick-up truck can be assigned 26 keypoints, and a box truck can be assigned 30 keypoints. FIG. 25A is a diagram illustrating examples of 2D keypoints defined for a car. FIG. 25B is a diagram illustrating examples of 2D keypoints defined for a pickup truck. FIG. 25C is a diagram illustrating examples of 2D keypoints defined for a van-bus. FIG. 25D is a diagram illustrating examples of 2D keypoints defined for a box truck.

Figure 26A:
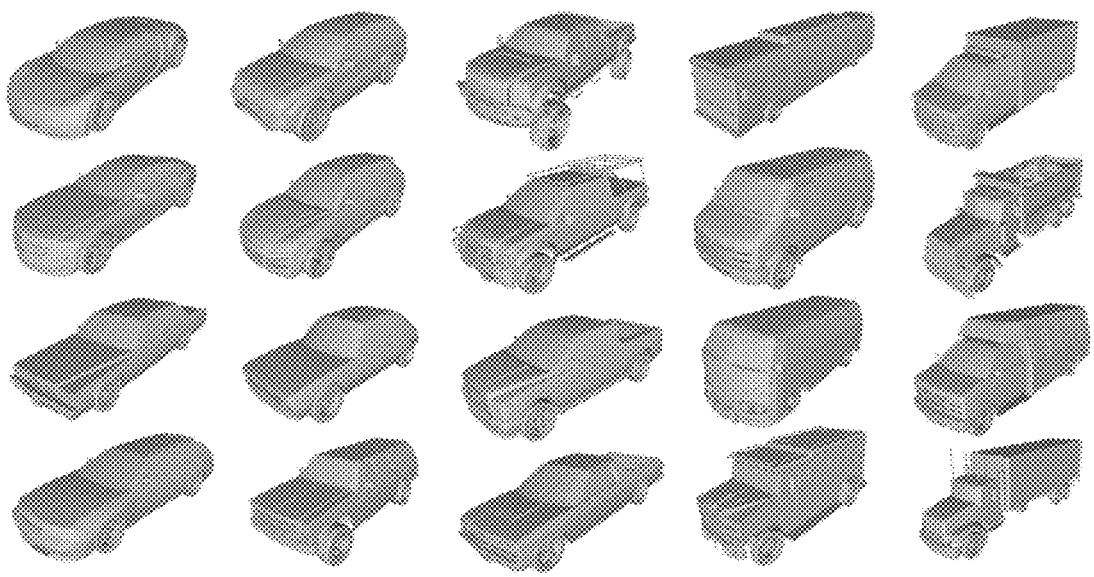
FIG. 26A is a diagram illustrating examples of three-dimensional models used for various objects, in accordance with some examples.
Figures 26B, 26C:
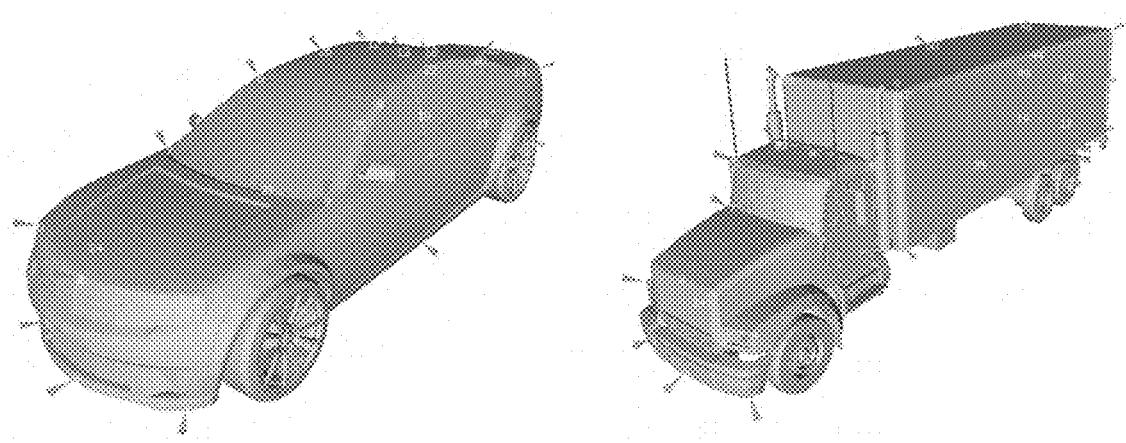
FIG. 26B and FIG. 26C are diagrams illustrating examples of three-dimensional keypoints defined for objects from FIG. 26A, in accordance with some examples.

FIG. 26A is a diagram illustrating an example of three-dimensional models from GTA model samples of various objects. FIG. 26B and FIG. 26C are diagrams illustrating examples of 3D keypoints defined for objects from FIG. 26A. The 3D keypoint tagging can be done manually or can be automated by a system.

The various 2D keypoints shown in FIG. 25A-FIG. 25D, the models shown in FIG. 26A, and the 3D keypoints shown in FIG. 26B and FIG. 26C can be used by the system 900 and the associated processes described herein to determine poses of objects detected in images.

Figures 27A, 27B, 27C:
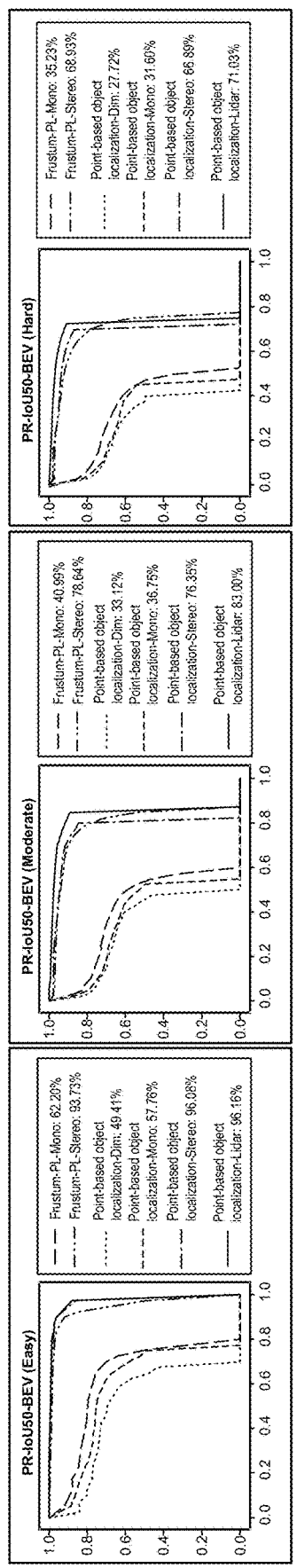
FIG. 27A-FIG. 27C are diagrams illustrating examples of results achieved using the techniques described herein compared with an alternative method, in accordance with some examples.
Figures 28A, 28B, 28C:
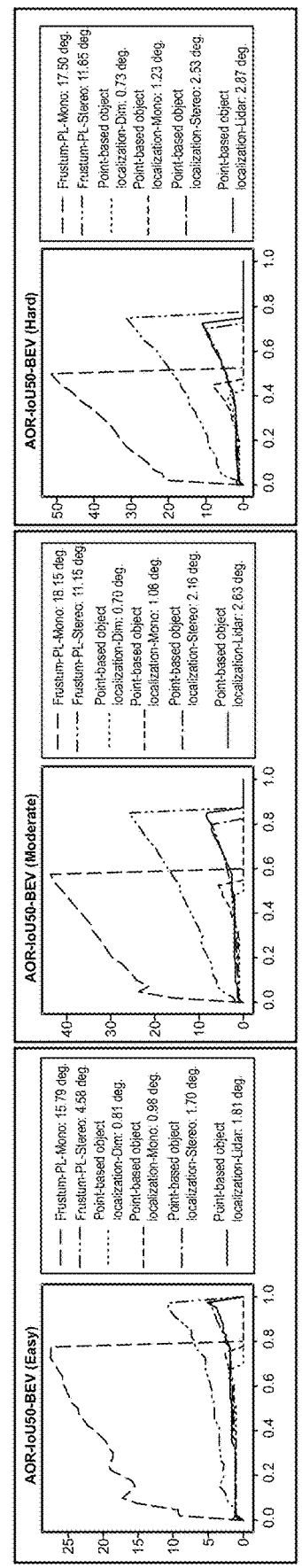
FIG. 28A-FIG. 28C are diagrams illustrating examples of results achieved using the techniques described herein compared with an alternative method, in accordance with some examples.

FIG. 27A-FIG. 27C are diagrams illustrating examples of results achieved using the techniques described herein compared with an alternative method. The examples shown in FIG. 27A, FIG. 27B, and FIG. 27C are results from a bird's eye view evaluation (IoU50), and are compared with a pseudo-lidar (PL)-based method. FIG. 28A-FIG. 28C are diagrams illustrating examples of results achieved using the techniques described herein compared with the alternative method. The results shown in FIG. 28A, FIG. 28B, and FIG. 28C show an evaluation of average orientation (AO).

Figures 29A, 29B, 29C:
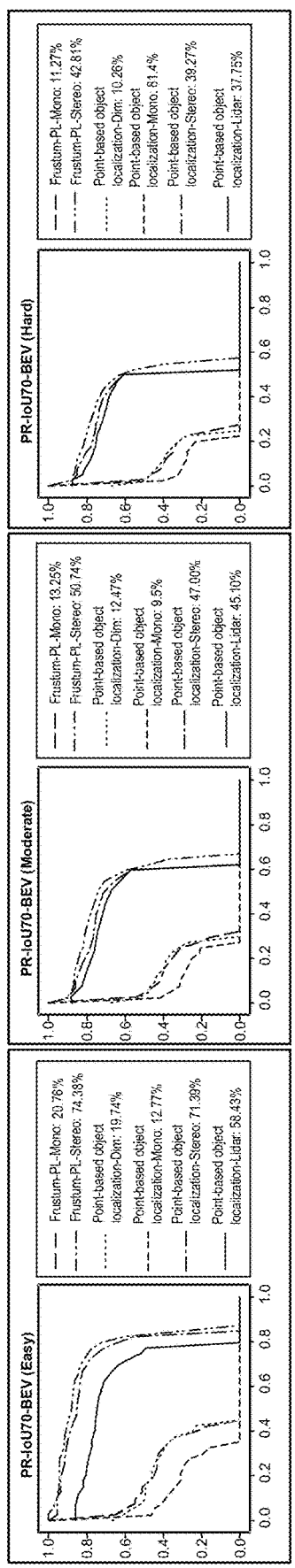
FIG. 29A-FIG. 29C are diagrams illustrating examples of results achieved using the techniques described herein compared with an alternative method, in accordance with some examples.
Figures 30A, 30B, 30C:
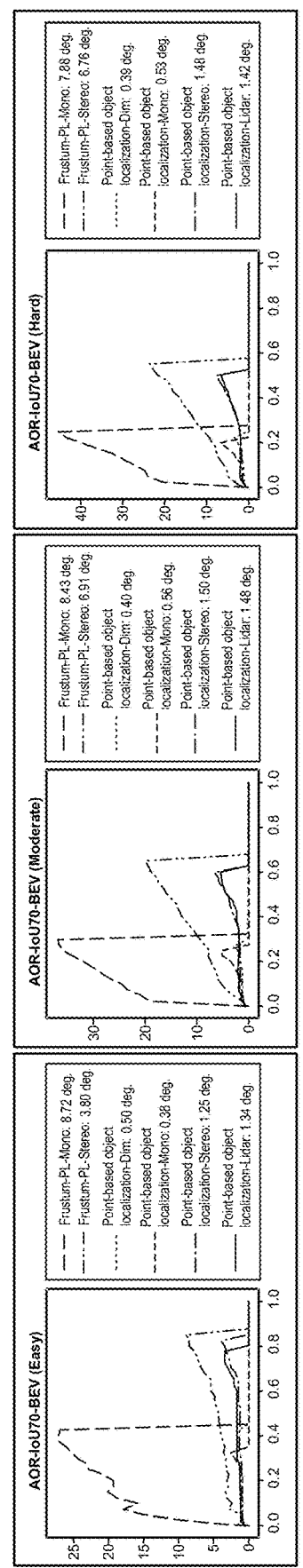
FIG. 30A-FIG. 30C are diagrams illustrating examples of results achieved using the techniques described herein compared with an alternative method, in accordance with some examples.

FIG. 29A-FIG. 29C are diagrams illustrating examples of results achieved using the techniques described herein compared with an alternative method. The examples shown in FIG. 29A, FIG. 29B, and FIG. 29C are results from a bird's eye view evaluation (IoU70), and are compared with a PL-based method. FIG. 30A-FIG. 30C are diagrams illustrating examples of results achieved using the techniques described herein compared with the alternative method. The results shown in FIG. 30A, FIG. 30B, and FIG. 30C show an evaluation of AO.

Figures 31A, 31B, 31C:
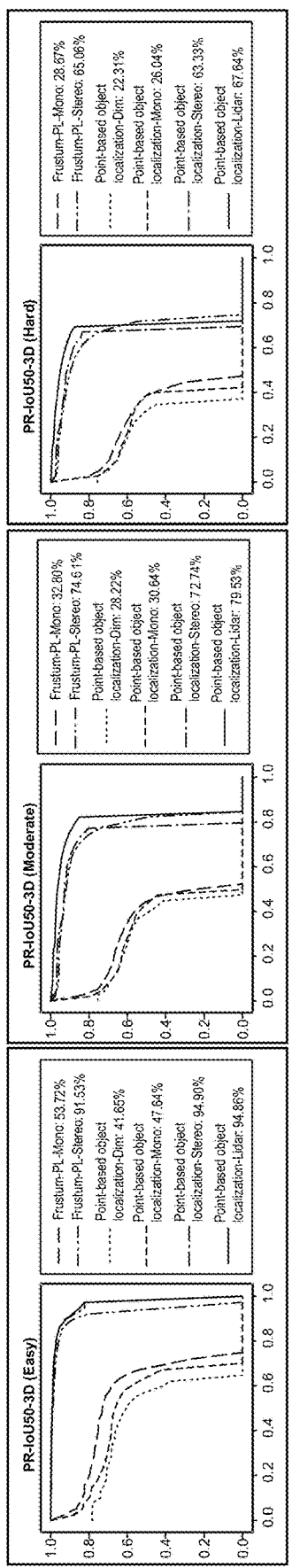
FIG. 31A-FIG. 31C are diagrams illustrating examples of results achieved using the techniques described herein compared with an alternative method, in accordance with some examples.
Figures 32A, 32B, 32C:
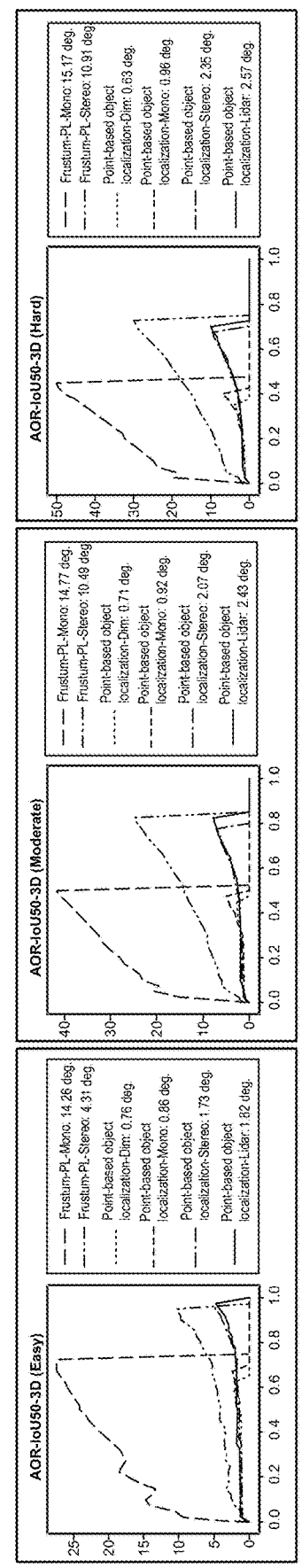
FIG. 32A-FIG. 32C are diagrams illustrating examples of results achieved using the techniques described herein compared with an alternative method, in accordance with some examples.

FIG. 31A-FIG. 31C are diagrams illustrating examples of results achieved using the techniques described herein compared with an alternative method. The examples shown in FIG. 31A, FIG. 31B, and FIG. 31C are results from a 3D object detection evaluation (IoU50), and are compared with a PL-based method. FIG. 32A-FIG. 32C are diagrams illustrating examples of results achieved using the techniques described herein compared with the alternative method. The results shown in FIG. 32A, FIG. 32B, and FIG. 32C show an evaluation of AO.

Figures 33A, 33B, 33C:
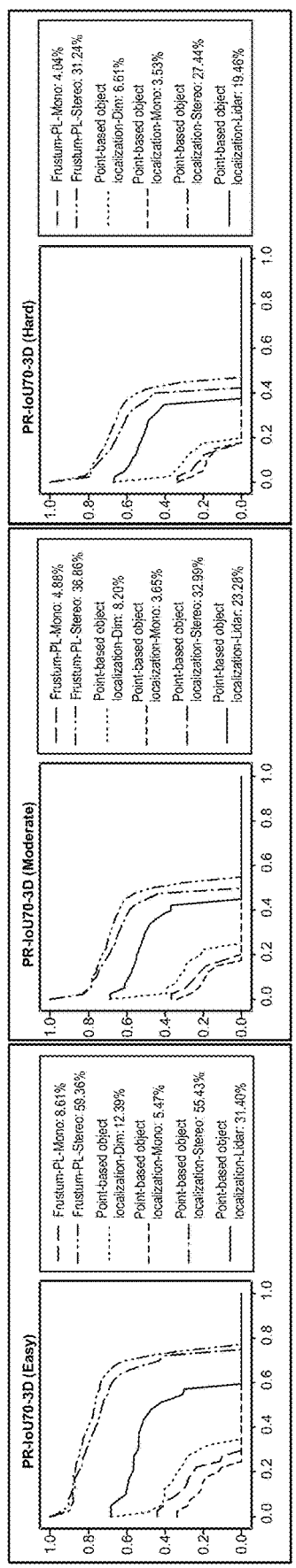
FIG. 33A-FIG. 33C are diagrams illustrating examples of results achieved using the techniques described herein compared with an alternative method, in accordance with some examples.
Figures 34A, 34B, 34C:
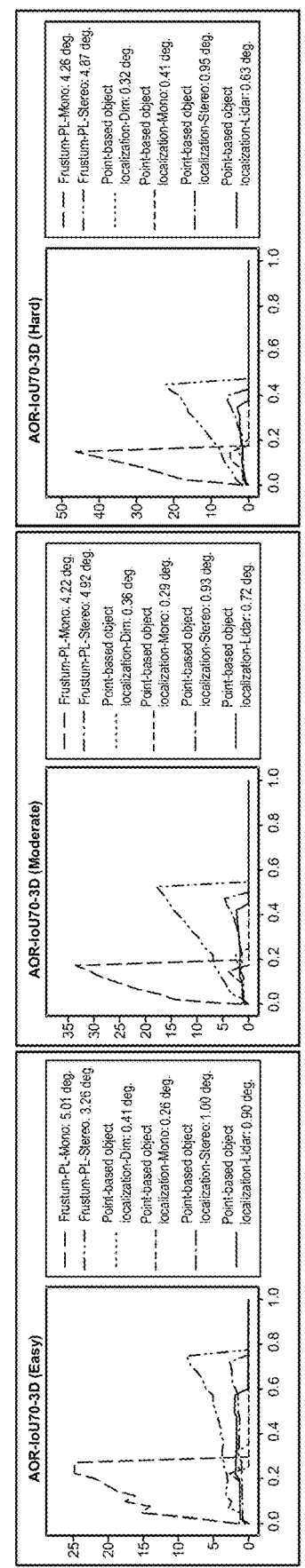
FIG. 34A-FIG. 34C are diagrams illustrating examples of results achieved using the techniques described herein compared with an alternative method, in accordance with some examples.

FIG. 33A-FIG. 33C are diagrams illustrating examples of results achieved using the techniques described herein compared with an alternative method. The examples shown in FIG. 33A, FIG. 33B, and FIG. 33C are results from a 3D object detection evaluation (IoU70), and are compared with a PL-based method. FIG. 34A-FIG. 34C are diagrams illustrating examples of results achieved using the techniques described herein compared with the alternative method. The results shown in FIG. 324A, FIG. 34B, and FIG. 34C show an evaluation of AO.

Figure 35:
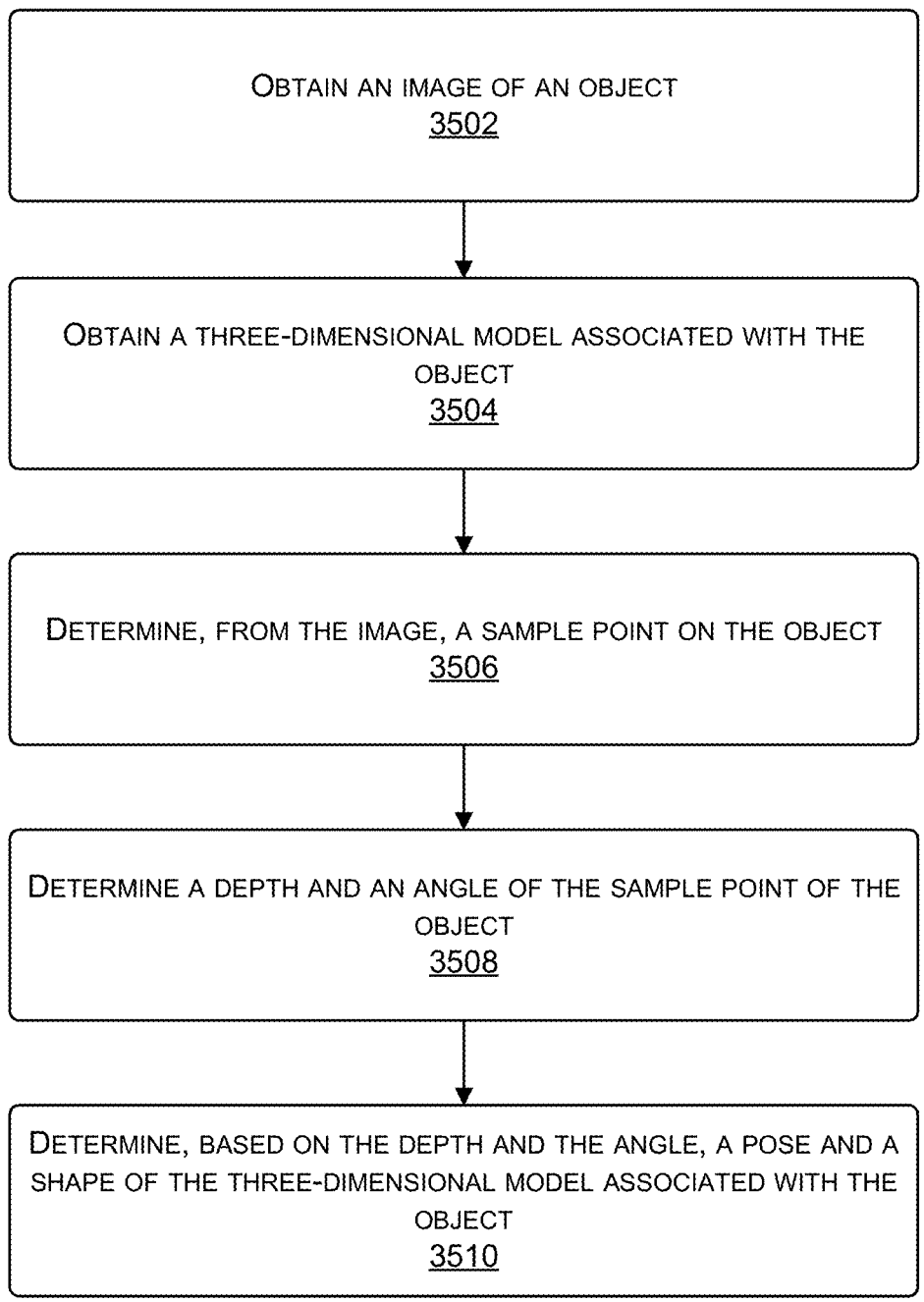
FIG. 35 is a flowchart illustrating an example of a process of determining features of one or more objects in one or more images using the techniques described herein, in accordance with some examples.

FIG. 35 is a flowchart illustrating an example of a process 3500 of performing object verification using radar images using the object verification techniques described herein. At block 3502, the process 3500 includes obtaining an image of an object. At block 3504, the process 3500 includes obtaining a three-dimensional model associated with the object. The three-dimensional model can be obtained from the 3D models 907.

At block 3506, the process 3500 includes determining, from the image, a sample point on the object. The sample point can be determined by the sample point selection engine 904. At block 3508, the process 3500 includes determining a depth and an angle of the sample point of the object. In some examples, the depth and the angle of the object in the image are determined using the sample point (a single point) and no other sample points of the object. In some cases, the angle indicates an orientation of the object relative to a directional vector from a center of a camera used to capture the image to the sample point. In some cases, the angle includes a yaw angle, as described above. In some examples, the depth includes distance from a center of a camera used to capture the image to the sample point.

At block 3510, the process 3500 includes determining, based on the depth and the angle, a pose and a shape of the three-dimensional model associated with the object. In some examples, the process 3500 includes obtaining a two-dimensional bounding region for the object in the image, and determining the sample point from within the two-dimensional bounding region in the image. In some examples, the process 3500 includes obtaining a two-dimensional bounding region for the object in the image, and aligning a projection of a three-dimensional bounding region to back-projected rays of at least two sides of the two-dimensional bounding region of the object.

In some examples, the process 3500 includes determining a first three-dimensional vector defining a forward direction of a camera used to capture the image, determining a second three-dimensional vector from the camera to a first corner point of the two-dimensional bounding region, determining a third three-dimensional vector from the camera to a second corner point of the two-dimensional bounding region, and determining a fourth three-dimensional vector from the camera to the sample point. In some cases, the first corner point includes a top-left corner point of the two-dimensional bounding region, and the second corner point includes a bottom-right corner point of the two-dimensional bounding region. In some cases, the first corner point includes a bottom-left corner point of the two-dimensional bounding region, and the second corner point includes a top-right corner point of the two-dimensional bounding region.

In some examples, the process 3500 includes obtaining a pitch angle relative to the camera. The pitch angle indicates an angle between a ground plane and a forward direction of a camera used to capture the image. The process 3500 can include determining, using the pitch angle, a first two-dimensional directional vector for the first three-dimensional vector, determining, using the pitch angle, a second two-dimensional directional vector for the second three-dimensional vector, determining, using the pitch angle, a third two-dimensional directional vector for the third three-dimensional vector, and determining, using the pitch angle, a fourth two-dimensional directional vector for the fourth three-dimensional vector.

In some examples, the process 3500 includes determining, using the pitch angle, a first rotation matrix from the ground plane to a coordinate system of the camera. The first two-dimensional directional vector, the second two-dimensional directional vector, the third two-dimensional directional vector, and the fourth two-dimensional directional vector are determined using the first rotation matrix.

In some examples, the process 3500 includes determining a first angle between the first two-dimensional directional vector and the fourth two-dimensional directional vector, determining a second angle between the second two-dimensional directional vector and the fourth two-dimensional directional vector, determining a third angle between the third two-dimensional directional vector and the fourth two-dimensional directional vector, determining a fourth angle between the first corner point of the two-dimensional bounding region and a forward direction of the object, determining a fifth angle between the second corner point of the two-dimensional bounding region and a forward direction of the object, determining a first distance from the first corner point of the two-dimensional bounding region to the sample point, and determining a second distance from the second corner point of the two-dimensional bounding region to the sample point. In some examples, the process 3500 includes determining the depth and an angle of the object in the image using the first angle, the second angle, the third angle, the fourth angle, the fifth angle, the first distance, and the second distance.

In some examples, determining, based on the depth and the angle, the pose of the three-dimensional model associated with the object includes determining a second rotation matrix using the angle of the sample point, determining a three-dimensional location of the sample point, and computing a pose parameter for the three-dimensional model using the depth of the sample point, the first rotation matrix, the second rotation matrix, and the three-dimensional location of the sample point.

In some examples, the process 3500 includes determining, based on the pose and the shape, a three-dimensional bounding region for the object. The process 3500 can include outputting the three-dimensional bounding region for display with the image.

In some examples, the processes described herein (e.g., process 3500 and/or other process described herein) may be performed by a computing device or apparatus, such as a computing device implementing the system 900 of FIG. 9. In some examples, the computing device can include the architecture of the computing device 3600 shown in FIG. 36.

In one example, the process 3500 can be performed by the computing device 3600 implementing the system 900 shown in FIG. 9. The computing device can include any suitable device, such as an autonomous vehicle, a robotic device, a mobile device (e.g., a mobile phone), a desktop computing device, a tablet computing device, a wearable device (e.g., a VR headset, an AR headset, AR glasses, a network-connected watch or smartwatch, or other wearable device), and/or any other computing device with the resource capabilities to perform the processes described herein, including process 3500. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 3500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 36:
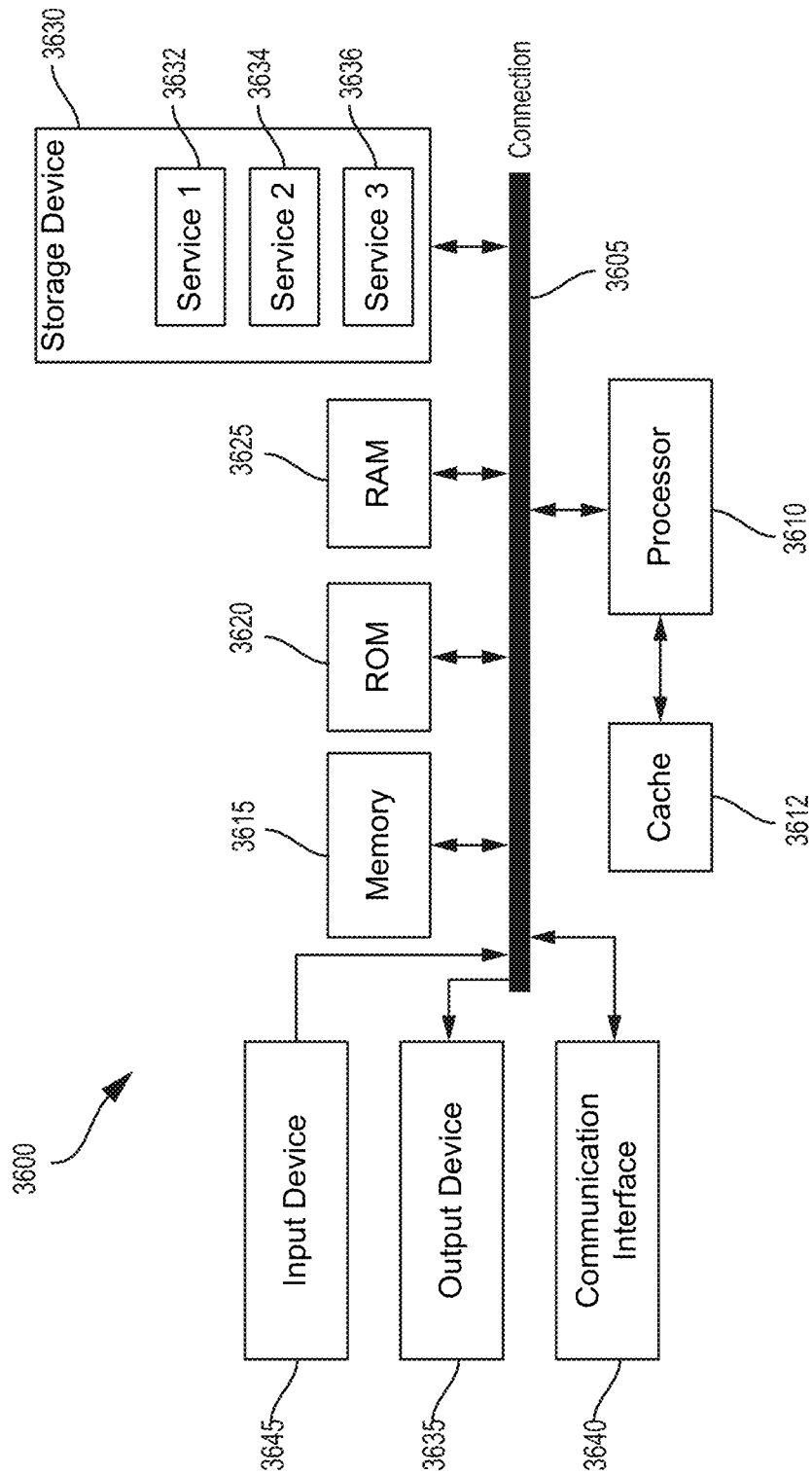
FIG. 36 is a block diagram of an exemplary computing device that may be used to implement some aspects of the technology described herein, in accordance with some examples.

FIG. 36 illustrates an example computing device architecture 3600 of an example computing device which can implement the various techniques described herein. For example, the computing device architecture 3600 can implement the system 900 shown in FIG. 9. The components of computing device architecture 3600 are shown in electrical communication with each other using connection 3605, such as a bus. The example computing device architecture 3600 includes a processing unit (CPU or processor) 3610 and computing device connection 3605 that couples various computing device components including computing device memory 3615, such as read only memory (ROM) 3620 and random access memory (RAM) 3625, to processor 3610.

Computing device architecture 3600 can include a cache of high-speed memory connected directly with, in close proximity to, or integrated as part of processor 3610. Computing device architecture 3600 can copy data from memory 3615 and/or the storage device 3630 to cache 3612 for quick access by processor 3610. In this way, the cache can provide a performance boost that avoids processor 3610 delays while waiting for data. These and other modules can control or be configured to control processor 3610 to perform various actions. Other computing device memory 3615 may be available for use as well. Memory 3615 can include multiple different types of memory with different performance characteristics. Processor 3610 can include any general purpose processor and a hardware or software service, such as service 1 3632, service 2 3634, and service 3 3636 stored in storage device 3630, configured to control processor 3610 as well as a special-purpose processor where software instructions are incorporated into the processor design. Processor 3610 may be a self-contained system, containing multiple cores or processors, a bus, memory controller, cache, etc. A multi-core processor may be symmetric or asymmetric.

To enable user interaction with the computing device architecture 3600, input device 3645 can represent any number of input mechanisms, such as a microphone for speech, a touch-sensitive screen for gesture or graphical input, keyboard, mouse, motion input, speech and so forth. Output device 3635 can also be one or more of a number of output mechanisms known to those of skill in the art, such as a display, projector, television, speaker device, etc. In some instances, multimodal computing devices can enable a user to provide multiple types of input to communicate with computing device architecture 3600. Communication interface 3640 can generally govern and manage the user input and computing device output. There is no restriction on operating on any particular hardware arrangement and therefore the basic features here may easily be substituted for improved hardware or firmware arrangements as they are developed.

Storage device 3630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 3625, read only memory (ROM) 3620, and hybrids thereof. Storage device 3630 can include services 3632, 3634, 3636 for controlling processor 3610. Other hardware or software modules are contemplated. Storage device 3630 can be connected to the computing device connection 3605. In one aspect, a hardware module that performs a particular function can include the software component stored in a computer-readable medium in connection with the necessary hardware components, such as processor 3610, connection 3605, output device 3635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure are provided as follows:

Aspect 1: A method of determining features of one or more objects in one or more images, the method comprising: obtaining an image of an object; obtaining a three-dimensional model associated with the object; determining, from the image, a sample point on the object; determining a depth and an angle of the sample point of the object; and determining, based on the depth and the angle, a pose and a shape of the three-dimensional model associated with the object.

Aspect 2: The method of claim 1, wherein the depth and the angle of the sample point are determined using the sample point and no other sample points of the object.

Aspect 3: The method of any one of claims 1 to 2, wherein the angle indicates an orientation of the object relative to a directional vector from a center of a camera used to capture the image to the sample point.

Aspect 4: The method of claim 3, wherein the angle includes a yaw angle.

Aspect 5: The method of any one of claims 1 to 4, wherein the depth includes distance from a center of a camera used to capture the image to the sample point.

Aspect 6: The method of any one of claims 1 to 5, further comprising: obtaining a two-dimensional bounding region for the object in the image; and determining the sample point from within the two-dimensional bounding region in the image.

Aspect 7: The method of any one of claims 1 to 6, further comprising: obtaining a two-dimensional bounding region for the object in the image; and aligning a projection of a three-dimensional bounding region to back-projected rays of at least two sides of the two-dimensional bounding region of the object.

Aspect 8: The method of any one of claims 1 to 7, further comprising: determining a first three-dimensional vector defining a forward direction of a camera used to capture the image; determining a second three-dimensional vector from the camera to a first corner point of the two-dimensional bounding region; determining a third three-dimensional vector from the camera to a second corner point of the two-dimensional bounding region; and determining a fourth three-dimensional vector from the camera to the sample point.

Aspect 9: The method of claim 8, wherein the first corner point includes a top-left corner point of the two-dimensional bounding region, and wherein the second corner point includes a bottom-right corner point of the two-dimensional bounding region.

Aspect 10: The method of claim 8, wherein the first corner point includes a bottom-left corner point of the two-dimensional bounding region, and wherein the second corner point includes a top-right corner point of the two-dimensional bounding region.

Aspect 11: The method of any one of claims 8 to 10, further comprising: obtaining a pitch angle relative to the camera, the pitch angle indicating an angle between a ground plane and a forward direction of a camera used to capture the image; determining, using the pitch angle, a first two-dimensional directional vector for the first three-dimensional vector; determining, using the pitch angle, a second two-dimensional directional vector for the second three-dimensional vector; determining, using the pitch angle, a third two-dimensional directional vector for the third three-dimensional vector; and determining, using the pitch angle, a fourth two-dimensional directional vector for the fourth three-dimensional vector.

Aspect 12: The method of claim 11, further comprising: determining, using the pitch angle, a first rotation matrix from the ground plane to a coordinate system of the camera; wherein the first two-dimensional directional vector, the second two-dimensional directional vector, the third two-dimensional directional vector, and the fourth two-dimensional directional vector are determined using the rotation matrix.

Aspect 13: The method of any one of claims 11 to 12, further comprising: determining a first angle between the first two-dimensional vector and the fourth two-dimensional directional vector; determining a second angle between the second two-dimensional vector and the fourth two-dimensional directional vector; determining a third angle between the third two-dimensional vector and the fourth two-dimensional directional vector; determining a fourth angle between the first corner point of the two-dimensional bounding region and a forward direction of the object; determining a fifth angle between the second corner point of the two-dimensional bounding region and a forward direction of the object; determining a first distance from the first corner point of the two-dimensional bounding region to the sample point; and determining a second distance from the second corner point of the two-dimensional bounding region to the sample point.

Aspect 14: The method of claim 13, further comprising: determining the depth and the angle of the sample point using the first angle, the second angle, the third angle, the fourth angle, the fifth angle, the first distance, and the second distance.

Aspect 15: The method of any one of claims 12 to 14, wherein determining, based on the depth and the angle, the pose of the three-dimensional model associated with the object includes: determining a second rotation matrix using the angle of the sample point; determining a three-dimensional location of the sample point; computing a pose parameter for the three-dimensional model using the depth of the sample point, the first rotation matrix, the second rotation matrix, and the three-dimensional location of the sample point.

Aspect 16: The method of any one of claims 1 to 15, further comprising: determining, based on the pose and the shape, a three-dimensional bounding region for the object; and outputting the three-dimensional bounding region for display with the image.

Aspect 17: An apparatus for determining features of one or more objects in one or more images, comprising: a memory configured to store at least one image; and a processor implemented in circuitry and configured to: obtain an image of an object; obtain a three-dimensional model associated with the object; determine, from the image, a sample point on the object; determine a depth and an angle of the sample point of the object; and determine, based on the depth and the angle, a pose and a shape of the three-dimensional model associated with the object.

Aspect 18: The apparatus of claim 17, wherein the depth and the angle sample point are determined using the sample point and no other sample points of the object.

Aspect 19: The apparatus of any one of claims 17 to 18, wherein the angle indicates an orientation of the object relative to a directional vector from a center of a camera used to capture the image to the sample point.

Aspect 20: The apparatus of claim 19, wherein the angle includes a yaw angle.

Aspect 21: The apparatus of any one of claims 17 to 20, wherein the depth includes distance from a center of a camera used to capture the image to the sample point.

Aspect 22: The apparatus of any one of claims 17 to 21, wherein the processor is configured to: obtain a two-dimensional bounding region for the object in the image; and determine the sample point from within the two-dimensional bounding region in the image.

Aspect 23: The apparatus of any one of claims 17 to 22, wherein the processor is configured to: obtain a two-dimensional bounding region for the object in the image; and align a projection of a three-dimensional bounding region to back-projected rays of at least two sides of the two-dimensional bounding region of the object.

Aspect 24: The apparatus of any one of claims 17 to 23, wherein the processor is configured to: determine a first three-dimensional vector defining a forward direction of a camera used to capture the image; determine a second three-dimensional vector from the camera to a first corner point of the two-dimensional bounding region; determine a third three-dimensional vector from the camera to a second corner point of the two-dimensional bounding region; and determine a fourth three-dimensional vector from the camera to the sample point.

Aspect 25: The apparatus of claim 24, wherein the first corner point includes a top-left corner point of the two-dimensional bounding region, and wherein the second corner point includes a bottom-right corner point of the two-dimensional bounding region.

Aspect 26: The apparatus of claim 24, wherein the first corner point includes a bottom-left corner point of the two-dimensional bounding region, and wherein the second corner point includes a top-right corner point of the two-dimensional bounding region.

Aspect 27: The apparatus of any one of claims 24 to 26, wherein the processor is configured to: obtain a pitch angle relative to the camera, the pitch angle indicating an angle between a ground plane and a forward direction of a camera used to capture the image; determine, using the pitch angle, a first two-dimensional directional vector for the first three-dimensional vector; determine, using the pitch angle, a second two-dimensional directional vector for the second three-dimensional vector; determine, using the pitch angle, a third two-dimensional directional vector for the third three-dimensional vector; and determine, using the pitch angle, a fourth two-dimensional directional vector for the fourth three-dimensional vector.

Aspect 28: The apparatus of claim 27, wherein the processor is configured to: determine, using the pitch angle, a first rotation matrix from the ground plane to a coordinate system of the camera; wherein the first two-dimensional directional vector, the second two-dimensional directional vector, the third two-dimensional directional vector, and the fourth two-dimensional directional vector are determined using the rotation matrix.

Aspect 29: The apparatus of any one of claims 27 to 28, wherein the processor is configured to: determine a first angle between the first two-dimensional vector and the fourth two-dimensional directional vector; determine a second angle between the second two-dimensional vector and the fourth two-dimensional directional vector; determine a third angle between the third two-dimensional vector and the fourth two-dimensional directional vector; determine a fourth angle between the first corner point of the two-dimensional bounding region and a forward direction of the object; determine a fifth angle between the second corner point of the two-dimensional bounding region and a forward direction of the object; determine a first distance from the first corner point of the two-dimensional bounding region to the sample point; and determine a second distance from the second corner point of the two-dimensional bounding region to the sample point.

Aspect 30: The apparatus of claim 29, wherein the processor is configured to: determine the depth and the angle of the sample point using the first angle, the second angle, the third angle, the fourth angle, the fifth angle, the first distance, and the second distance.

Aspect 31: The apparatus of any one of claims 17 to 30, wherein, to determine based on the depth and the angle the pose of the three-dimensional model associated with the object, the processor is configured to: determine a second rotation matrix using the angle of the sample point; determine a three-dimensional location of the sample point; and compute a pose parameter for the three-dimensional model using the depth of the sample point, the first rotation matrix, the second rotation matrix, and the three-dimensional location of the sample point.

Aspect 32: The apparatus of any one of claims 17 to 31, wherein the processor is configured to: determine, based on the pose and the shape, a three-dimensional bounding region for the object; and output the three-dimensional bounding region for display with the image.

Aspect 33: The apparatus of any one of claims 17 to 32, wherein the apparatus is a vehicle.

Aspect 34: The apparatus of any one of claims 17 to 32, wherein the apparatus is a robot.

Aspect 35: A computer-readable storage medium storing instructions that, when executed by one or more processors, cause the one or more processors of a device to perform any of the operations of aspects 1 to 34.

Aspect 36: An apparatus for determining features of one or more objects in one or more images, comprising means for performing any of the operations of aspects 1 to 34.

What is claimed is:

1. A method of determining features of one or more objects in one or more images, the method comprising:
   obtaining an image of an object;
   obtaining a three-dimensional model associated with the object;
   obtaining a two-dimensional bounding region associated with the object in the image;
   determining a sample point on the object in the two-dimensional bounding region;
   determining a depth and an angle associated with the sample point of the object determined in the two-dimensional bounding region; and
   determining, based on the depth and the angle, a pose and a shape of the three-dimensional model associated with the object.

2. The method of claim 1, wherein the depth and the angle associated with the sample point are determined using the sample point and no other sample points of the object.

3. The method of claim 1, wherein the angle indicates an orientation of the object relative to a directional vector from a center of a camera used to capture the image to the sample point.

4. The method of claim 3, wherein the angle includes a yaw angle.

5. The method of claim 1, wherein the depth includes a distance from a center of a camera used to capture the image to the sample point.

6. The method of claim 1, further comprising:
   aligning a projection of a three-dimensional bounding region to back-projected rays of at least two sides of the two-dimensional bounding region of the object.

7. The method of claim 1, further comprising:
   determining a first three-dimensional vector defining a forward direction of a camera used to capture the image;
   determining a second three-dimensional vector from the camera to a first corner point of the two-dimensional bounding region;
   determining a third three-dimensional vector from the camera to a second corner point of the two-dimensional bounding region; and
   determining a fourth three-dimensional vector from the camera to the sample point.

8. The method of claim 7, wherein the first corner point includes a top-left corner point of the two-dimensional bounding region, and wherein the second corner point includes a bottom-right corner point of the two-dimensional bounding region.

9. The method of claim 7, wherein the first corner point includes a bottom-left corner point of the two-dimensional bounding region, and wherein the second corner point includes a top-right corner point of the two-dimensional bounding region.

10. The method of claim 7, further comprising:
    obtaining a pitch angle relative to the camera, the pitch angle indicating an angle between a ground plane and a forward direction of a camera used to capture the image;
    determining, using the pitch angle, a first two-dimensional directional vector for the first three-dimensional vector;
    determining, using the pitch angle, a second two-dimensional directional vector for the second three-dimensional vector;
    determining, using the pitch angle, a third two-dimensional directional vector for the third three-dimensional vector; and
    determining, using the pitch angle, a fourth two-dimensional directional vector for the fourth three-dimensional vector.

11. The method of claim 10, further comprising:
    determining a first angle between the first two-dimensional directional vector and the fourth two-dimensional directional vector;
    determining a second angle between the second two-dimensional directional vector and the fourth two-dimensional directional vector;
    determining a third angle between the third two-dimensional directional vector and the fourth two-dimensional directional vector;
    determining a fourth angle between the first corner point of the two-dimensional bounding region and a forward direction of the object;
    determining a fifth angle between the second corner point of the two-dimensional bounding region and a forward direction of the object;

determining a first distance from the first corner point of the two-dimensional bounding region to the sample point; and determining a second distance from the second corner point of the two-dimensional bounding region to the sample point.

12. The method of claim 11, further comprising:
determining the depth and the angle associated with the sample point using the first angle, the second angle, the third angle, the fourth angle, the fifth angle, the first distance, and the second distance.

13. The method of claim 10, further comprising:
determining, using the pitch angle, a first rotation matrix from the ground plane to a coordinate system of the camera;
wherein the first two-dimensional directional vector, the second two-dimensional directional vector, the third two-dimensional directional vector, and the fourth two-dimensional directional vector are determined using the first rotation matrix.

14. The method of claim 13, wherein determining, based on the depth and the angle, the pose of the three-dimensional model associated with the object includes:
determining a second rotation matrix using the angle associated with the sample point;
determining a three-dimensional location of the sample point; and
computing a pose parameter for the three-dimensional model using the depth of the sample point, the first rotation matrix, the second rotation matrix, and the three-dimensional location of the sample point.

15. The method of claim 1, further comprising:
determining, based on the pose and the shape, a three-dimensional bounding region for the object; and
outputting the three-dimensional bounding region for display with the image.

16. The method of claim 1, wherein the depth and the angle associated with the sample point of the object are determined based at least in part on one or more vectors determined between the two-dimensional bounding region and a point associated with a camera used to capture the image and a vector determined between the sample point and the point associated with the camera.

17. An apparatus for determining features of one or more objects in one or more images, comprising:
a memory configured to store at least one image; and
a processor implemented in circuitry and configured to:
obtain an image of an object;
obtain a three-dimensional model associated with the object;
obtain a two-dimensional bounding region associated with the object in the image;
determine a sample point on the object in the two-dimensional bounding region;
determine a depth and an angle associated with the sample point of the object determined in the two-dimensional bounding region; and
determine, based on the depth and the angle, a pose and a shape of the three-dimensional model associated with the object.

18. The apparatus of claim 17, wherein the processor is configured to determine the depth and the angle associated with the sample point using the sample point and no other sample points of the object.

19. The apparatus of claim 17, wherein the angle indicates an orientation of the object relative to a directional vector from a center of a camera used to capture the image to the sample point.

20. The apparatus of claim 19, wherein the angle includes a yaw angle.

21. The apparatus of claim 17, wherein the depth includes distance from a center of a camera used to capture the image to the sample point.

22. The apparatus of claim 17, wherein the processor is configured to:
align a projection of a three-dimensional bounding region to back-projected rays of at least two sides of the two-dimensional bounding region of the object.

23. The apparatus of claim 17, wherein the processor is configured to:
determine a first three-dimensional vector defining a forward direction of a camera used to capture the image;
determine a second three-dimensional vector from the camera to a first corner point of the two-dimensional bounding region;
determine a third three-dimensional vector from the camera to a second corner point of the two-dimensional bounding region; and
determine a fourth three-dimensional vector from the camera to the sample point.

24. The apparatus of claim 23, wherein the first corner point includes a top-left corner point of the two-dimensional bounding region, and wherein the second corner point includes a bottom-right corner point of the two-dimensional bounding region.

25. The apparatus of claim 23, wherein the first corner point includes a bottom-left corner point of the two-dimensional bounding region, and wherein the second corner point includes a top-right corner point of the two-dimensional bounding region.

26. The apparatus of claim 23, wherein the processor is configured to:
obtain a pitch angle relative to the camera, the pitch angle indicating an angle between a ground plane and a forward direction of a camera used to capture the image;
determine, using the pitch angle, a first two-dimensional directional vector for the first three-dimensional vector;
determine, using the pitch angle, a second two-dimensional directional vector for the second three-dimensional vector;
determine, using the pitch angle, a third two-dimensional directional vector for the third three-dimensional vector; and
determine, using the pitch angle, a fourth two-dimensional directional vector for the fourth three-dimensional vector.

27. The apparatus of claim 26, wherein the processor is configured to:
determine, using the pitch angle, a rotation matrix from the ground plane to a coordinate system of the camera;
wherein the first two-dimensional directional vector, the second two-dimensional directional vector, the third two-dimensional directional vector, and the fourth two-dimensional directional vector are determined using the rotation matrix.

28. The apparatus of claim 17, wherein the processor is configured to:
determine, based on the pose and the shape, a three-dimensional bounding region for the object; and output the three-dimensional bounding region for display with the image.

29. The apparatus of claim 17, wherein the apparatus is one of a vehicle or a robot.

30. The apparatus of claim 17, wherein the processor is configured to determine the depth and the angle associated with the sample point of the object based at least in part on one or more vectors determined between the two-dimensional bounding region and a point associated with a camera used to capture the image and a vector determined between the sample point and the point associated with the camera.

* * * * *